(12) United States Patent
Holman et al.

(10) Patent No.: US 9,078,089 B2
(45) Date of Patent: Jul. 7, 2015

(54) SYSTEMS AND METHODS FOR PROVIDING ONE OR MORE FUNCTIONALITIES TO A WEARABLE COMPUTING DEVICE

(71) Applicant: Elwha LLC, Bellevue, WA (US)

(72) Inventors: Pablos Holman, Seattle, WA (US); Roderick A. Hyde, Redmond, WA (US); Royce A. Levien, Lexington, MA (US); Richard T. Lord, Tacoma, WA (US); Robert W. Lord, Seattle, WA (US); Mark A. Malamud, Seattle, WA (US); Clarence T. Tegreene, Mercer Island, WA (US)

(*) Notice: Subject to any disclaimer, the term of this patent is extended or adjusted under 35 U.S.C. 154(b) by 59 days.

(21) Appl. No.: 13/961,187

(22) Filed: Aug. 7, 2013

(65) Prior Publication Data

US 2015/0031291 A1    Jan. 29, 2015

Related U.S. Application Data

(63) Continuation-in-part of application No. 13/950,926, filed on Jul. 25, 2013.

(51) Int. Cl.
*H04B 7/00* (2006.01)
*H04W 4/00* (2009.01)
*H04B 1/3827* (2015.01)
*H04B 7/26* (2006.01)

(52) U.S. Cl.
CPC .............. *H04W 4/008* (2013.01); *H04B 1/385* (2013.01); *H04B 7/26* (2013.01); *H04B 2001/3861* (2013.01); *H04B 2001/3866* (2013.01)

(58) Field of Classification Search
CPC ...... H04W 8/005; H04W 4/008; H04B 1/385; H04B 7/26; H04B 2001/3861; H04B 2001/3866

USPC ........ 455/41.2, 41.1, 556.1, 557, 63.4, 550.1, 455/66.1, 334
See application file for complete search history.

(56) References Cited

U.S. PATENT DOCUMENTS 6,711,414 B1 * 3/2004 Lightman et al. ............. 455/517
6,771,224 B2    8/2004 Apostolos
(Continued)

OTHER PUBLICATIONS

Brown, Michael, "Meet 60GHz Wi-Fi, the insanely fast future of wireless networking," PC World, Mar. 6, 2013, 4 pages, http://www.pcworld.com/article/2030041/meet-60ghz-wi-fi-the-insanely-fast-future-of-wireless-networking.html.

(Continued)

*Primary Examiner* — Marceau Milord

(57) ABSTRACT

Computationally implemented methods and systems include detecting presence of one or more electronic devices near a wearable computing device, the wearable computing device being a computing device designed to be worn by a user; determining which of the one or more electronic devices that are detected as being near the wearable computing device are at least designed to provide one or more specific functionalities that are being sought by the wearable computing device; and acquiring, by the wearable computing device based at least, in part, on said detecting and said determining, one or more specific functionalities that are available through at least one electronic device that was detected as being near the wearable computing device and that was determined to provide the one or more specific functionalities. In addition to the foregoing, other aspects are described in the claims, drawings, and text.

42 Claims, 32 Drawing Sheets

(56) References Cited

U.S. PATENT DOCUMENTS

| | | | |
|---|---|---|---|
| 6,995,723 B1 | 2/2006 | Adams | |
| 7,500,747 B2 * | 3/2009 | Howell et al. | 351/158 |
| 7,715,873 B1 * | 5/2010 | Biere et al. | 455/557 |
| 7,929,914 B2 | 4/2011 | Tegreene | |
| 8,184,983 B1 * | 5/2012 | Ho et al. | 398/130 |
| 8,340,658 B2 | 12/2012 | Tsui et al. | |
| 8,430,310 B1 | 4/2013 | Ho et al. | |
| 8,442,542 B2 | 5/2013 | Brisebois et al. | |
| 8,489,546 B2 | 7/2013 | Rappaport | |
| 8,493,353 B2 | 7/2013 | Blanchflower et al. | |
| 8,493,849 B2 | 7/2013 | Fuste Vilella et al. | |
| 2009/0069045 A1 | 3/2009 | Cheng | |
| 2012/0194399 A1 | 8/2012 | Bily et al. | |
| 2012/0195464 A1 | 8/2012 | Ahn | |
| 2012/0250615 A1 | 10/2012 | Gupta et al. | |
| 2013/0044130 A1 * | 2/2013 | Geisner et al. | 345/633 |
| 2013/0080616 A1 | 3/2013 | Tsui et al. | |
| 2013/0165138 A1 | 6/2013 | Bahl et al. | |
| 2014/0241540 A1 * | 8/2014 | Hodges et al. | 381/74 |
| 2015/0031286 A1 | 1/2015 | Holman et al. | |
| 2015/0031290 A1 | 1/2015 | Holman et al. | |
| 2015/0031291 A1 | 1/2015 | Holman et al. | |
| 2015/0031292 A1 | 1/2015 | Holman et al. | |
| 2015/0031293 A1 | 1/2015 | Holman et al. | |
| 2015/0031294 A1 | 1/2015 | Holman et al. | |
| 2015/0031295 A1 | 1/2015 | Holman et al. | |
| 2015/0031296 A1 | 1/2015 | Holman et al. | |
| 2015/0031297 A1 | 1/2015 | Holman et al. | |
| 2015/0031298 A1 | 1/2015 | Holman et al. | |
| 2015/0031299 A1 | 1/2015 | Holman et al. | |
| 2015/0031300 A1 | 1/2015 | Holman et al. | |
| 2015/0031301 A1 | 1/2015 | Holman et al. | |

OTHER PUBLICATIONS

Experton Group, "Bluetooth to Decide on 60GHZ Standard this Month," Experton Group, Apr. 19, 2010, 1 page, http://www.experton-group.com/nc/home/itnews/itnewsarticle/article/bluetooth-to-decide-on-60ghz-standard-this-month.html.

mmWAVES, "60GHz Wireless Technology Overview," 2013, 4 pages, http://www.mmwaves.com/products.cfm/product/20-194-0.htm, accessed Jul. 25, 2013.

Stevens et al., "White Paper: The Benefits of 60 GHz Unlicensed Wireless Communications," Dec. 2011, 10 pages, Sub10 Systems Limited, http://www.sub10systems.com/wp-content/uploads/2011/03/White-Paper-Benefits-of-60GHz.pdf.

University of California, Berkely, "60 GHz Short-Range Wireless Communication," Connectivity Lab, Feb. 2008, 1 page, http://connectivitylab.eecs.berkeley.edu/brochures/60ghz.pdf.

PCT International Search Report; International App. No. PCT/US2014/048167; Nov. 4, 2014; pp. 1-3.

* cited by examiner

14 Computing
Watch

16 Computing
Bracelet

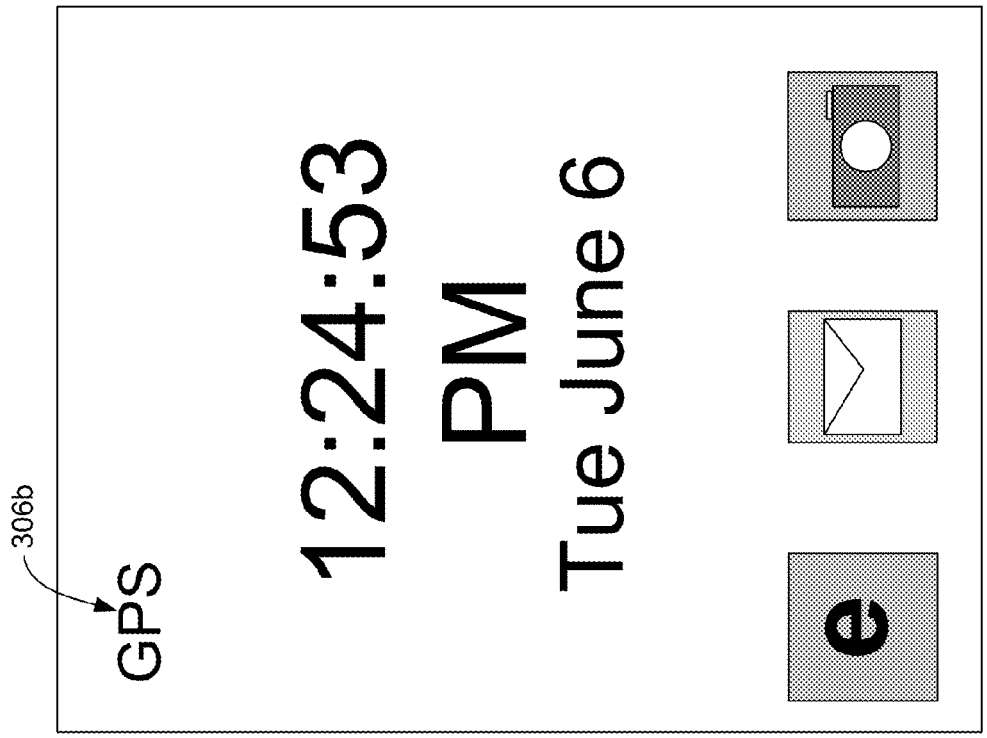
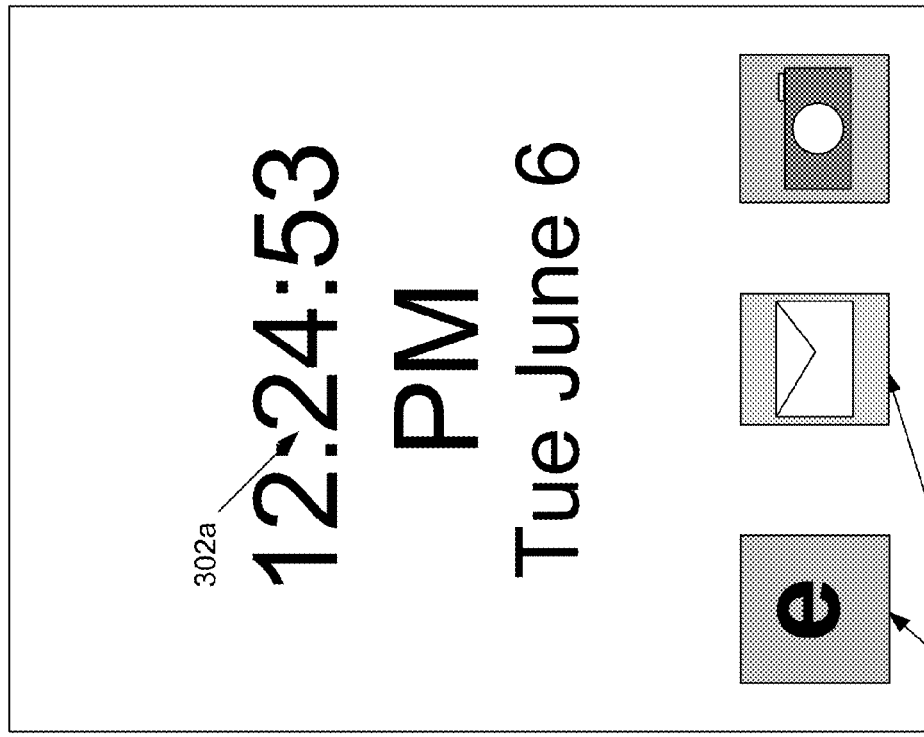

GUI 300c

GUI 300d

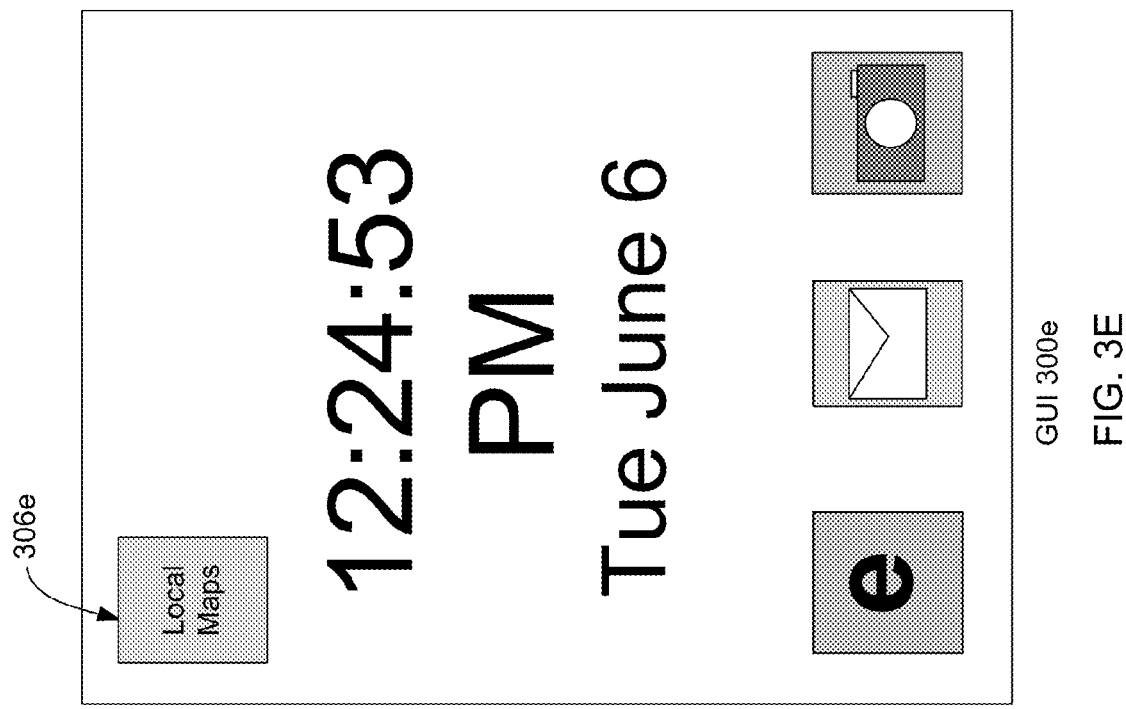

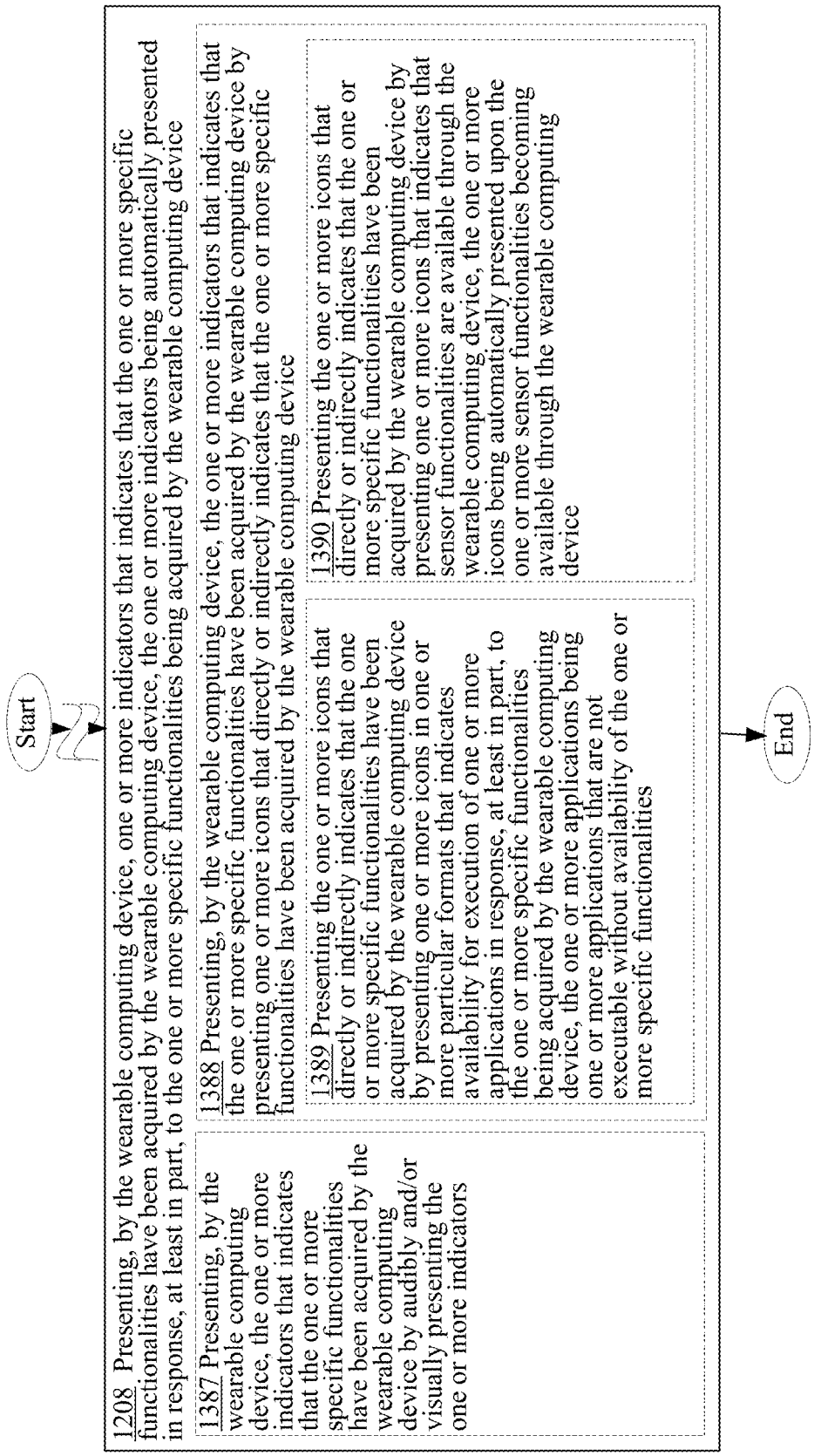

SYSTEMS AND METHODS FOR PROVIDING ONE OR MORE FUNCTIONALITIES TO A WEARABLE COMPUTING DEVICE

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority application(s)). In addition, the present application is related to the "Related applications," if any, listed below.

PRIORITY APPLICATIONS

The present application constitutes a continuation-in-part of U.S. patent application Ser. No. 13/950,926, entitled SYSTEMS AND METHODS FOR PROVIDING ONE OR MORE FUNCTIONALITIES TO A WEARABLE COMPUTING DEVICE WITH SMALL FORM FACTOR, naming Pablos Holman, Roderick A. Hyde; Royce A. Levien; Richard T. Lord; Robert W. Lord; Mark A. Malamud; Clarence T. Tegreene as inventors, filed 25, Jul., 2013, which is currently co-pending or is an application of which a currently co-pending application is entitled to the benefit of the filing date.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority applications section of the ADS and to each application that appears in the Priority applications section of this application.

All subject matter of the Priority applications and the Related applications and of any and all parent, grandparent, great-grandparent, etc. applications of the Priority applications and the Related applications, including any priority claims, is incorporated herein by reference to the extent such subject matter is not inconsistent herewith.

SUMMARY

In one or more various aspects, a method includes but is not limited to detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user, determining which of the one or more electronic devices that are detected as being within the spatial pod of the wearable computing device are at least designed to provide one or more specific functionalities that are being sought by the wearable computing device; and acquiring, by the wearable computing device based at least, in part, on said detecting and said determining, one or more specific functionalities that are available through at least one electronic device that was detected within the spatial pod of the wearable computing device and that was determined to provide the one or more specific functionalities. In some implementations, at least one of the detecting, determining, or acquiring being performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user, means for determining which of the one or more electronic devices that are detected as being within the spatial pod of the wearable computing device are at least designed to provide one or more specific functionalities that are being sought by the wearable computing device, and means for acquiring, by the wearable computing device based at least, in part, on said detecting and said determining, one or more specific functionalities that are available through at least one electronic device that was detected within the spatial pod of the wearable computing device and that was determined to provide the one or more specific functionalities. In addition to the foregoing, other system aspects are described in the claims, drawings, and text forming a part of the disclosure set forth herein.

In one or more various aspects, a system includes, but is not limited to, circuitry for detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user, circuitry for determining which of the one or more electronic devices that are detected as being within the spatial pod of the wearable computing device are at least designed to provide one or more specific functionalities that are being sought by the wearable computing device, and circuitry for acquiring, by the wearable computing device based at least, in part, on said detecting and said determining, one or more specific functionalities that are available through at least one electronic device that was detected within the spatial pod of the wearable computing device and that was determined to provide the one or more specific functionalities. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user, determining which of the one or more electronic devices that are detected as being within the spatial pod of the wearable computing device are at least designed to provide one or more specific functionalities that are being sought by the wearable computing device, and acquiring, by the wearable computing device based at least, in part, on said detecting and said determining, one or more specific functionalities that are available through at least one electronic device that was detected within the spatial pod of the wearable computing device and that was determined to provide the one or more specific functionalities. In addition to the foregoing, other computer program product aspects are described in the claims, drawings, and text forming a part of the disclosure set forth herein.

In one or more various aspects, a wearable computing device includes, but is not limited to a nearby device sensing module configured to sense presence of one or more electronic devices near the wearable computing device that are within a spatial pod surrounding the wearable computing device, the spatial pod surrounding the wearable computing device being a spatial volume that includes the wearable computing device and being enclosed by an enveloping boundary, where low-power wireless signals generated by the wearable computing device being discernible over background noise within the enveloping boundary and not discernible over background noise outside the enveloping boundary; a functionally designed device ascertaining module configured to ascertain which of the one or more electronic devices that were sensed as being within the spatial pod of the wearable computing device are at least designed to provide one or more specific functionalities that are being sought by the wearable computing device; a functionality obtaining module configured to obtain one or more specific functionalities that are available through at least one electronic device that was sensed by the nearby device sensing module as being within the spatial pod of the wearable computing device and that was ascertained by the functionally designed device ascertaining module as providing the one or more specific functionalities; and one or more components for coupling to a user.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIGS. 3A, 3B, 3C, 3D, and 3E show exemplary Graphical User Interfaces (GUIs) that may be displayed by the wearable computing device 10* of FIG. 1.

FIG. 13 is a high-level logic flowchart of a process depicting alternate implementations of the indicator presenting operation 1208 of FIG. 10.

DETAILED DESCRIPTION

Figure 1:
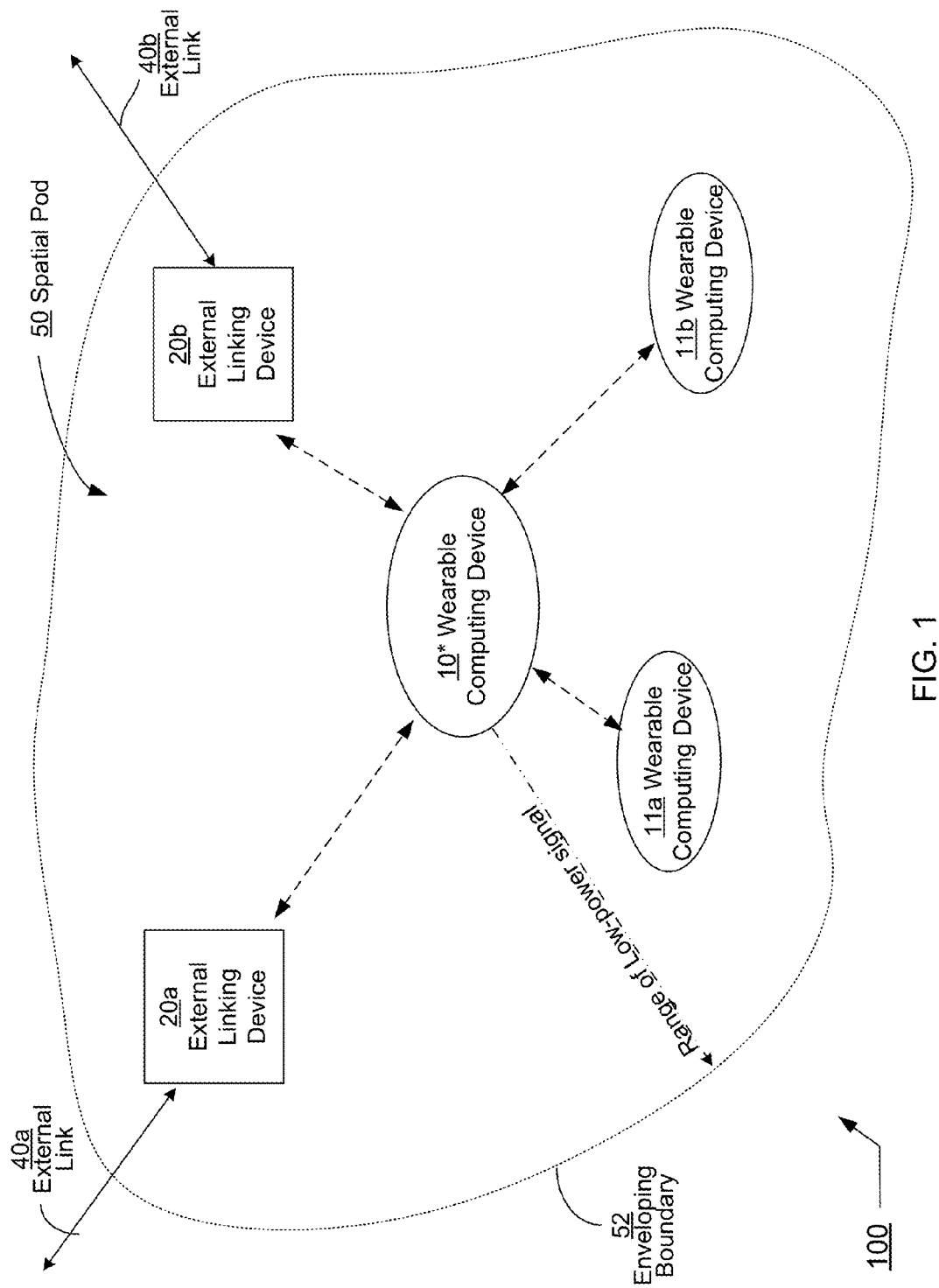
FIG. 1 is a high-level block diagram of a wearable computing device 10* operating in an exemplary environment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users maybe shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The rapid advancement and miniaturization of integrated circuitry and microelectronics over the last three decades have greatly facilitated those in the mobile computing industry to develop amazingly sleek and functionally powerful computing/communication devices, from the original clunky brick-sized portable telephones to today's sleek cellular telephones and Smartphones, and from yesterday's bulky laptops to today's sleek tablet computers and e-readers. One recent trend in the evolution of mobile computing is the development of wearable computing devices. That is, there are currently multiple efforts by various high-tech groups to develop computing/communication devices in the form of wearable computing devices. Such devices having very small form-factors, are designed to be worn by people, and can provide various functionalities beyond simple time/chronograph functionalities including, for example, at least some communication capabilities (e.g., connectivity to Wi-Fi or cellular networks) and capabilities for executing applications (e.g., software programs). Examples of such wearable computing devices include, for example, augmented reality (AR) devices having the form of glasses or goggles (herein "computing glasses"), and computerized watches (herein "computing watches")

Although the recent advancements in the fields of integrated circuitry and microelectronics (e.g., microprocessors) make the eventual implementation of wearable computing devices a likely inevitability, developers of such devices still face a number of hurdles that may prevent such devices from being able to provide the same type of functionalities that larger mobile devices (e.g., Smartphones, tablet computers, and so forth) can provide. One of the problems faced by developers of wearable computing devices is to try to cram into such small form-factor devices all of the components that may be necessary in order to provide the same functionalities provided by larger mobile devices. That is, because a wearable computing device (e.g., an AR device or a Smartwatch) is designed to be worn by a user, it is generally preferable that such a device have a relatively small form-factor and be relatively lightweight. As a result, such a device may only accommodate small and/or limited number of core components including a power storage device (e.g., batteries) that is relatively small (and as a result, with limited power storage capabilities) and light, and a relatively small communication system (e.g., a communication system that employs a small and/or limited number of antennas).

For example, and in contrast, larger mobile devices such as Smartphones and tablet computers typically have multiple antennas for various functionalities including, for example, an antenna for global positioning system (GPS), an antenna for Wi-Fi connectivity, and an antenna for cellular network connectivity. It may not be practical, if not impossible, to include multiple antennas into a small form-factor wearable computing device such as a computing watch or a computing glasses. Also, because such wearable computing devices will be located somewhere on or adjacent to the body of a user, it will be generally desirable to employ a communication system that emits relatively low electromagnetic radiation at least towards the user's body.

In various embodiments, systems, articles of manufacture and methods are provided herein that allows a wearable computing device (herein simply "wearable computing device") to have an extremely small form-factor while seamlessly providing the same or similar functionalities as those that may be provided by larger mobile computing devices by allowing the wearable computing device to "piggy-back" off (e.g., utilizing) functionalities provided by one or more nearby electronic devices. For these embodiments, the systems, articles of manufacture and methods may seek out or find one or more electronic devices that are located near the wearable computing device, determine which, if any, of the one or more nearby electronic devices provides one or more specific functionalities that are being sought by the wearable computing device, and obtain from at least one of the nearby electronic devices that were determined to provide the one or more specific functionalities, at least one of the specific functionalities. In some embodiments, the wearable computing device may be in the form of a watch or in the form of eyewear such as glasses or goggles.

Referring now to FIG. 1, which is a block diagram of an environment 100 in which a wearable computing device 10* in accordance with various embodiments may communicate with one or more nearby electronic devices (e.g., one or more external linking devices 20* and/or one or more other wearable computing devices 11*) that are within a spatial pod 50 of the wearable computing device 10* in order to, for example, utilize one or more specific functionalities available through the one or more nearby electronic devices. Note that in the following, "*" represents a wildcard. Thus, references in the following description to, for example, "wearable computing device 10*" may be in reference to the wearable computing device 10* of FIG. 1, as well as to the wearable computing device 10' of FIG. 4A or to the wearable computing device 10" of FIG. 4B, which are two different implementations of the wearable computing device 10* of FIG. 1.

In order to minimize the size of the wearable computing device 10*, the wearable computing device 10* may lack one or more functionalities that are typically found in larger computing devices but which may be accessed or obtained from nearby electronic devices (e.g., one or more external linking devices 20* and/or one or more other wearable computing devices 11*). For example, in some embodiments, the wearable computing device 10* may only include a single antenna (e.g., an omnidirectional or directional antenna) that may be used for communicating using low-power signals with nearby electronic devices that are within the spatial pod 50 of the wearable computing device 10*. The wearable computing device 10* may also lack a GPS system, which typically requires its own separate antenna (e.g., separate from an antenna that may be used for Wi-Fi or cellular network communication). The wearable computing device 10* may also lack other components such as various sensors (e.g., audio and/or visual sensors such as cameras and microphones, accelerometers, etc.) commonly found in larger computing devices.

In various embodiments, a wearable computing device 10* may be a computing device that can be worn by a user. For these embodiments, a wearable computing device 10* may be wearable when the wearable computing device 10* includes at least one component for coupling the wearable computing device 10* to at least one portion of a person's body or one or more components (e.g., one or more clips 207 of FIG. 2A) for coupling to a device (e.g., the frame of a pair of glasses including rim 209 and a pair of temple pieces 208a and 208b) that allows the wearable computing device 10*(e.g., the electronics housing 206 of FIG. 2A, the electronics included in the electronic housing 206, the see-through display 202, and so forth) to be coupled to a portion of a user. For example, if the wearable computing device 10* of FIG. 1 is in the form of computing glasses 12 (see FIG. 2A), which in some cases may be an augmented reality (AR) device, then it may include two temple pieces 208* for extending over and around ears of a user. Alternatively, the wearable computing device 10* may merely be the electronic housing 206 (see FIG. 2A) including the electronics housed in the electronic housing 206 and the see-through display 202 of an AR device that clips (via clip 207) onto the frame (e.g., rim 209 and temples 208*) of computing glasses 12 (see FIG. 2A) On the other hand, if the wearable computing device 10* is in the form of a computing watch 14 (see FIG. 2B), then it may include a wristband 212 for wrapping around the wrist/arm of the user. Alternatively, the wearable computing device 10* may merely be the watch portion of a watch (without the wristband 212) along with a feature for attaching the watch portion to the wristband 212 (see FIG. 2B).

As briefly described above, in some embodiments, the wearable computing device 10* may employ only a single antenna that may be used to communicate with one or more nearby electronic devices. In various embodiments, the single antenna that may be employed may be any one of a variety of antenna types. In some cases, the wearable computing device 10* may employ an omnidirectional antenna such as a dipole antenna (e.g., a folded dipole, short dipole, cage dipole, and bow-tie antenna), a monopole antenna such as a Rubber Ducky antenna, halo antenna, a microstrip antenna including a patch antenna, a patch array antenna, a collinear antenna, a metamaterial antenna, and so forth. In alternative embodiments, the wearable computing device 10* may employ a directional antenna such as a metamaterial antenna (see, for example, U.S. Patent Application Pub. No. 2012/0194399, which is hereby incorporated by reference), Yagi-Uda antenna, log-periodic antenna, corner reflector antenna, and so forth. Each type of antenna provides different advantages. For example, omnidirectional antennas are often easier and cheaper to construct and are simpler to operate. On the other hand, a directional antenna may, in some cases, require less power for transmitting signals to nearby devices once the location or direction of the nearby devices relative the directional antenna have been determined.

In various embodiments, the wearable computing device 10* may wirelessly communicate with one or more electronic devices that are located with spatial pod 50 of the wearable computing device 10* via one or more signals from at least one of a variety of frequency bands. For example, in some embodiments, the wearable computing device 10* may communicate with nearby electronic devices via one or more signals from the 2.4 GHz industrial, scientific and medical (ISM) frequency band, which has a frequency range from 2.4 GHz to 2.4835 GHz. Alternatively, the wearable computing device 10* may communicate with nearby electronic devices via one or more signals from the 5 GHz ISM frequency band or the 5 GHz U-NII (Unlicensed National Information Infrastructure) frequency band with a frequency range between 5.180 GHz and 5.825 GHz. In still other alternative embodiments, the wearable computing device 10* may communicate with nearby electronic devices via one or more signals from the 60 GHz band (e.g., millimeter waveband or mmWave band with a frequency range between 57 and 64 GHz (U.S) or between 57 and 66 GHz (Japan and Europe)).

In various embodiments, the one or more nearby electronic devices that may communicate with the wearable computing device 10* may be one or more external linking devices 20* and/or one or more other wearable computing devices 11*. An external linking device 20* may be any communication device that may be located within a spatial pod 50 of a wearable computing device 10* and that can communicate with the wearable computing device 10*, as well as communicate beyond the spatial pod 50 via, for example, one or more external links 40*(e.g., Wi-Fi links, cellular network links, Ethernet, optical links, and so forth). That is, an external linking device 20* may be a computing/communication device that can act as a bridge or link for a wearable computing device 10* for communicating beyond (outside) the spatial pod 50 that surrounds the wearable computing device 10*. In various embodiments, an external linking device 20* may be any one of a variety of communication devices that may be found within a spatial pod 50 that surrounds a wearable computing device 10* and that can communicate beyond the spatial pod 50 including, for example, a mobile device such as a Smartphone or a cellular phone, a tablet computer, a laptop or desktop computer, a router, a repeater, an access point, etc.

In various embodiments, the spatial pod 50 of the wearable computing device 10* may be a spatial volume that includes the wearable computing device 10* and that is defined or enclosed by an enveloping boundary 52, where low-power wireless signals generated by the wearable computing device 10* being discernible over background noise (e.g., background electromagnetic radiation noise) within the enveloping boundary 52 and not discernible over background noise outside the enveloping boundary 52. In some embodiments, references in the following to "low-power wireless signals" may be in reference to wireless signals having power that is substantially less than the 1 milliwatt signals typically generated by Bluetooth devices. In some cases, low-power wireless signals may be, for example, 0.8 milliwatt, 0.5 milliwatt, 0.3 milliwatt, or less than 0.3 milliwatt wireless signals.

In various embodiments, the low-power wireless signals that define the enveloping boundary 52 of the spatial pod 50 may be the maximum low-power wireless signals that may be allowed to be generated by the wearable computing device 10*. That is, in order to keep the size of the spatial pod 50 of the wearable computing device 10* relatively small (e.g., a spatial pod 50 with an enveloping boundary 52 that is no greater than 16 feet away from the wearable computing device 10* in some cases) and to keep power consumption relatively low, the logic endowed in the wearable computing device 10* may restrict the transmission power of wireless signals transmitted by the wearable computing device 10*.

In some embodiments, the spatial pod 50 of the wearable computing device 10* that surrounds the wearable computing device 10* may be defined by distance. For example, in some embodiments, the spatial pod 50 of the wearable computing device 10* may be a spatial volume surrounding the wearable computing device 10* that is being defined or enclosed by an enveloping boundary 52, where distance between the wearable computing device 10* and any point along the enveloping boundary 52 is not greater than 24 feet. For example, in some cases, the distance between the wearable computing device 10* and the enveloping boundary 52 is not greater than 16 feet, or alternatively not greater than 12 feet. In alternative cases, the distance between the computing device 10* and the enveloping boundary 52 is not greater than 6 feet.

In some embodiments, the size and shape of a spatial pod 50 of a wearable computing device 10* may be dictated by the presence of one or more spatial objects (e.g., a wall, the interior surface of a passenger cabin of a room, a cubical, a car, a bus, a boat, a plane, and so forth) in the proximity of the wearable computing device 10*. That is, wireless signals tend to be attenuated by various solids, semi-solids, and even gaseous materials at different rates (note that the rate of attenuation of wireless signals will also typically depend on the frequency of the wireless signals be transmitted). Of course, and regardless of the material, the more "material" that a wireless signal has to travel through the greater the attenuation of the wireless signal.

In some embodiments, the size of the spatial pod 50 of the wearable computing device 10* may be minimized in order to, for example, reduce communication power requirements of the wearable computing device 10* for communicating with the spatial pod 50. In some cases, the size of the spatial pod 50 of the wearable computing device 10* may be minimized by reducing or minimizing the power (e.g., minimizing to less than 0.5 milliwatt) of the wireless signals transmitted by the wearable computing device 10*.

In order to more efficiently acquire one or more specific functionalities that may be needed by the wearable computing device 10* from one or more electronic devices that may be located near the wearable computing device 10*, the wearable computing device 10*  may be designed to initially detect presence of one or more electronic devices near the wearable computing device 10*  within the spatial pod 50 of the wearable computing device 10*. In some embodiments, such an operation may be implemented by, for example, transmitting or broadcasting one or more low-power "soliciting" wireless signals for soliciting responding signals from one or more nearby electronic devices (e.g., one or more external linking devices 20*  and/or one or more other wearable computing devices 11*) that detects the one or more low-power (e.g., 7 milliwatt or less) soliciting wireless signals transmitted by the wearable computing device 10*. After transmitting the one or more low-power soliciting wireless signals, the wearable computing device 10*  may be designed to monitoring for reception of the one or more responding signals from one or more nearby electronic devices (e.g., one or more external linking devices 20*  and/or one or more other wearable computing devices 11*) that transmits the one or more responding signals in response to detecting the one or more low-power soliciting wireless signals transmitted by the wearable computing device 10*.

In some embodiments, the wearable computing device 10*  may be further designed to transmit low-power soliciting wireless signals for soliciting one or more responding signals from one or more nearby electronic devices at different levels of low-power. That is, by incrementally adjusting the power levels of the low-power soliciting wireless signals, and then monitoring for responding signals after each adjustment, a determination may be made as to which nearby electronic devices are nearest to the wearable computing device 10*  or at least the amount of power that will be needed by the wearable computing device 10*  in order to communicate with those nearby electronic devices. In order to implement such operations, the wearable computing device 10*  may, for example, initially transmit one or more first soliciting wireless signals at a first low-power level (e.g., 0.1 milliwatt) for soliciting one or more first responding signals from one or more nearby electronic devices that detects the one or more first soliciting wireless signals, then monitoring at the wearable computing device 10*  for reception of the one or more first responding signals transmitted by the one or more nearby electronic devices that detects the one or more first low-power (0.1 milliwatt) soliciting wireless signals.

The wearable computing device 10*  may then transmit one or more second soliciting wireless signals at a second low-power level (e.g., 0.2 milliwatt) for soliciting one or more second responding signals from one or more nearby electronic devices that detects the one or more second soliciting wireless signals, then monitoring at the wearable computing device 10*  for reception of the one or more second responding signals transmitted by the one or more nearby electronic devices that detects the one or more second low-power (0.2 milliwatt) wireless signals. These operations may then be repeated by incrementally increasing the power level (e.g., 0.3 milliwatt, 0.4 milliwatt, and so forth) of the low-power soliciting wireless signals to be transmitted by the wearable computing device 10*  and then monitoring at the wearable computing device 10*, following each transmission of the soliciting wireless signals at each low-power level, for reception of one or more responding signals transmitted by one or more nearby electronic devices in response to the one or more nearby electronic devices detecting the different levels of low-power soliciting wireless signals transmitted by the wearable computing device 10*. In various embodiments, such operations may facilitate in determining which nearby electronic devices are nearest to the wearable computing device 10*  or at least facilitate in identifying one or more nearby electronic devices that requires the least amount of power for communicating with by the wearable computing device 10*.

In various embodiments, in addition to being designed to detect the presence of the one or more electronic devices near the wearable computing device 10*  within the spatial pod 50 of the wearable computing device 10*, the wearable computing device 10*  may be designed to determine which of the one or more electronic devices (e.g., one or more external linking devices 20*  and/or one or more other wearable computing devices 11*) that were detected as being near the wearable computing device 10*  within the spatial pod 50 of the wearable computing device 10*  are at least designed to provide one or more specific functionalities that are being sought (e.g., needed) by the wearable computing device 10*. In some embodiments, the wearable computing device 10*  may make such a determination by querying each of one or more nearby electronic devices that were determined to be within the spatial pod 50 of the wearable computing device 10*  to determine which of the one or more nearby electronic devices provides the one or more specific functionalities being sought by the wearable computing device 10*. For these embodiments, the querying of each of the one or more nearby electronic devices may be by transmitting one or more queries.

In various embodiments, the wearable computing device 10*  may be designed to query one or more nearby electronic devices (e.g., electronic devices within the spatial pod 50 of the wearable computing device 10*) in order to determine which, if any, of the one or more nearby electronic devices provides communication functionalities (e.g., Wi-Fi and/or cellular network links) beyond the spatial pod 50. In some embodiments, the wearable computing device 10*  may be designed to query the one or more nearby electronic devices in order to determine which, if any, of the one or more nearby electronic devices provides global positioning system (GPS) functionalities. In the same or alternative embodiments, the wearable computing device 10*  may be designed to query the one or more nearby electronic devices in order to determine which, if any, of the one or more nearby electronic devices provides one or more sensor functionalities (e.g., audio and/or visual sensors such as microphones and/or cameras, movement sensors such as accelerometers, and so forth). In the same or alternative embodiments, the wearable computing device 10*  may be designed to query the one or more nearby electronic devices in order to determine which, if any, of the one or more nearby electronic devices provides access to one or more specific applications (e.g., messaging applications such as email applications or Voice over Internet Protocol or VoIP applications, gaming applications, and so forth).

In various embodiments, when multiple nearby electronic devices (e.g., electronic devices that are within the spatial pod 50 of the wearable computing device 10*) are determined to provide the one or more common functionalities, then the wearable computing device 10*  may select or designate at least one of the nearby electronic devices for providing the one or more common functionalities based on one or more factors. For example, in some embodiments, the wearable computing device 10*  may be designed to select or designate at least one of the nearby electronic devices for providing the one or more common functionalities based on a determination as to which of the nearby electronic devices is nearest to the wearable computing device 10*(e.g., requires the least amount of power to communicate with by the wearable computing device 10*). In some cases, such a selection or designation may be alternatively or additionally based on other factors such as determining which of the nearby electronic devices are associated with the user wearing the wearable computing device 10*, which of the nearby electronic devices provides earliest access to the one or more common functionalities, which of the nearby electronic devices provides access to one or more applications (e.g., specific browser or email application) that supports the one or more common functionalities (e.g., Wi-Fi or Internet access), and/or which of the nearby electronic devices are preferred electronic devices based on user preferences (e.g., user prefers Wi-Fi devices as opposed to cellular data network devices).

In various embodiments, the wearable computing device 10* may be further designed to acquire or obtain one or more specific functionalities from one or more nearby electronic devices that were detected to be near the wearable computing device 10* within the spatial pod 50 of the wearable computing device 10* and that were determined to provide the one or more specific functionalities. In some embodiments, the one or more specific functionalities may be acquired or obtained by the wearable computing device 10* when the wearable computing device 10* transmits to the one or more nearby electronic devices one or more commands and/or one or more requests for at least accessing the one or more specific functionalities. In the same or alternative embodiments, the one or more specific functionalities may be acquired or obtained by the wearable computing device 10* when the wearable computing device 10* transmits to the one or more nearby electronic devices input data (e.g., text for an email, application or device commands, user preferences, and so forth).

In various embodiments, the wearable computing device 10* may acquire or obtain from the one or more nearby electronic devices one or more of a variety of functionalities including, for example, communication functionalities beyond the spatial pod 50, GPS functionalities, sensor functionalities, application functionalities, and so forth. As a result of acquiring the one or more specific functionalities, the wearable computing device 10* may be able to obtain the results of utilizing the one or more specific functionalities. For example, the wearable computing device 10* upon obtaining the one or more specific functionalities may obtain GPS data, sensor data (visual, audio, and/or movement data), data as a result of executing an application, and so forth.

In some embodiments, the wearable computing device 10* may be designed to receive data indicative of hand/arm gestures of a user based on the one or more specific functionalities obtained from one or more nearby electronic devices. For these embodiments, the data to be obtained may be in the form of visual data (e.g., based on data collected through one or more cameras), movement data (e.g., based on data collected form one or more movement sensors), and/or electrical impulse data that is based on electrical impulses sensed from the arm of a user, and so forth. In various embodiments, the data that is received that is indicative of the hand/gestures of a user may be used in order to control the wearable computing device 10*(e.g., may be used to control one or more applications being executed by the wearable computing device 10*).

Figure 2A:
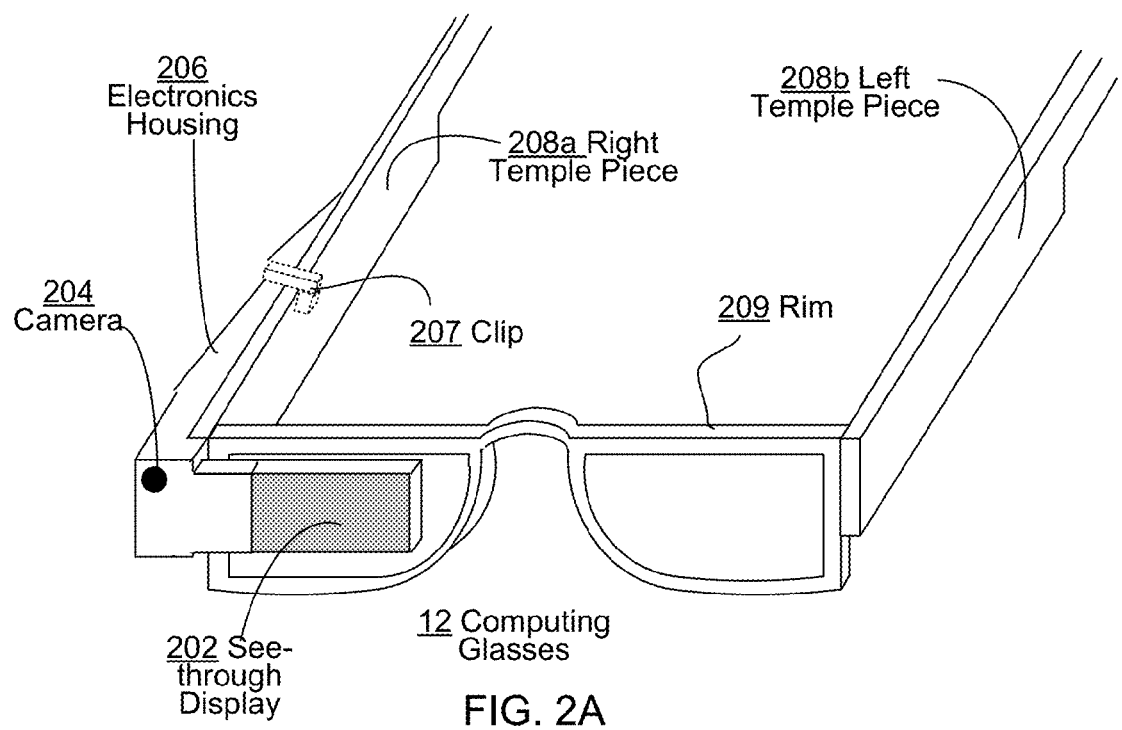
FIG. 2A shows exemplary computing glasses 12 that the wearable computing device 10* of FIG. 1 may be in the form of in accordance with various embodiments.

Referring now to FIG. 2A, which illustrates exemplary computing glasses 12, which is one form of the wearable computing device 10* of FIG. 1 in accordance with various embodiments. The computing glasses 12, in various embodiments, may be an augmented reality (AR) system or device. The computing glasses 12 may comprise a see-through display 202, a camera 204, an electronic housing 206 (which houses the electronics), and/or a frame that comprises a right temple piece 208a, a left temple piece 208b, and a rim 209. The right temple piece 208a and the left temple piece 208b are designed to extend to and wrap around the ears of the user and to couple the computing glasses 12 to the head of the user. Note that in alternative implementations, the wearable computing device 10* may take on the form of computing goggles rather than computing glasses 12, where the computing goggles employ a "regular" display such as a light emitting diode (LED) display rather than a see-through display 202. Note further that in some cases, the wearable computing device 10* may comprise merely the electronic housing 206 and the electronics housed by the electronic housing 206, the see-through display 202, the camera 204, and a coupling component such as a clip 207 for coupling to a frame (e.g., the rim 209 and the right temple piece 208a and the left temple piece 208b).

Figure 2B:
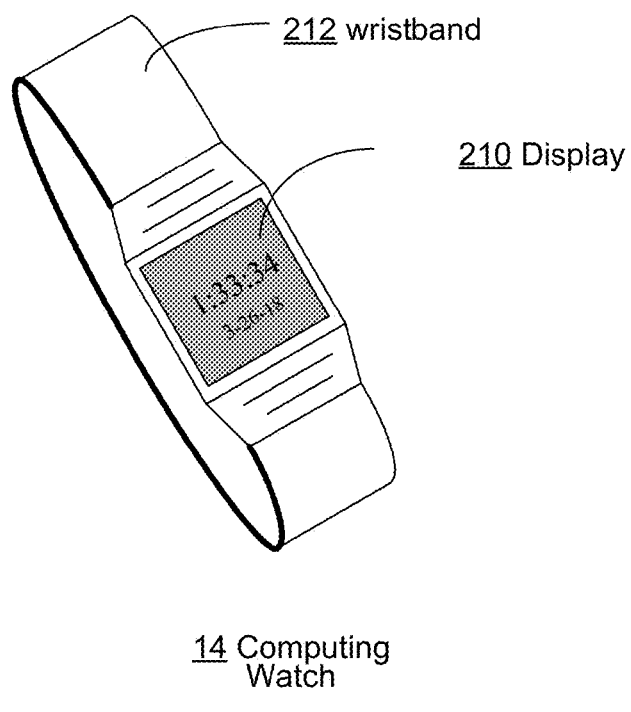
FIG. 2B shows an exemplary computing watch 14 that the wearable computing device 10* of FIG. 1 may be in the form of in accordance with various embodiments.

FIG. 2B illustrates an exemplary computing watch 14, which is another form of the wearable computing device 10* of FIG. 1 in accordance with various embodiments. The computing watch 14 includes at least a display 210 and a wristband 212 for wrapping around the wrist/arm of a user (e.g., coupling with the limb of the user). The display 210 may be a variety of displays including, for example, an LED display or liquid crystal display (LCD). In some embodiments, the wearable computing device 10* may comprise merely the watch portion of the computing watch 14 without the wristband 212 and one or more coupling components that couples with the wristband 212 (e.g., the wristband 212 portion of the computing watch is optional).

Figure 2C:
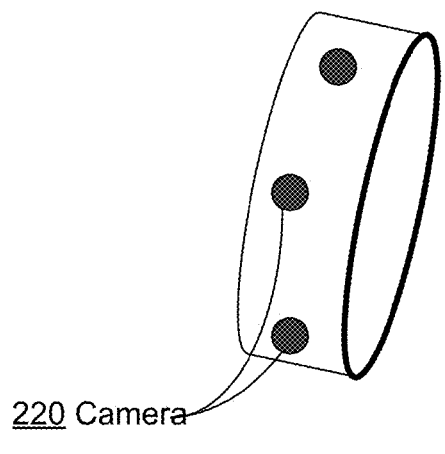
FIG. 2C shows an exemplary computing bracelet 16 in accordance with various embodiments.

FIG. 2C illustrates an exemplary computing bracelet 16. The computing bracelet 16 may be one of the other wearable computing devices 11* of FIG. 1 that the wearable computing device 10* may communicate with in the spatial pod 50 of the wearable computing device 10*. The computing bracelet 16 may be designed to provide various sensor data to other devices such as to the wearable computing device 10* of FIG. 1. In various embodiments, the computing bracelet 16 may include one or more cameras 220 and/or electrical impulse sensors such as one or more myoelectric sensors for detecting electrical impulses generated by muscle/tendon movements. The various sensors may be used in order to sense, for example, hand/arm gestures of the user wearing the computing bracelet 16. For example, if the computing bracelet 16 is being worn on the right arm/wrist of the user, than the one or more cameras 220 may be used to capture images of hand/arm gestures made by the left hand/arm of the user. If the computing bracelet 16 indeed includes electrical impulse sensors, then the hand/arm gestures made by the right hand/arm of the user may be sensed. Although not depicted, the computing bracelet 16 may further include various other components such a power source (e.g., battery), a communication system such as a transceiver and an antenna, and logic for collecting, processing, and/or communicating sensor data.

Figure 3C:
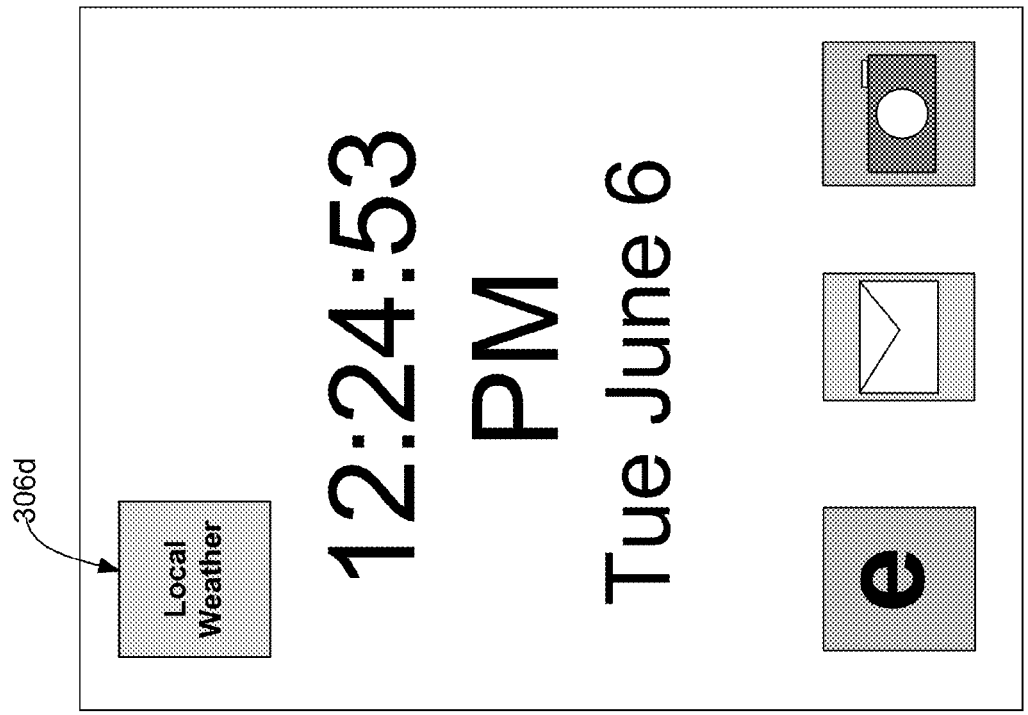
Figure 3D:
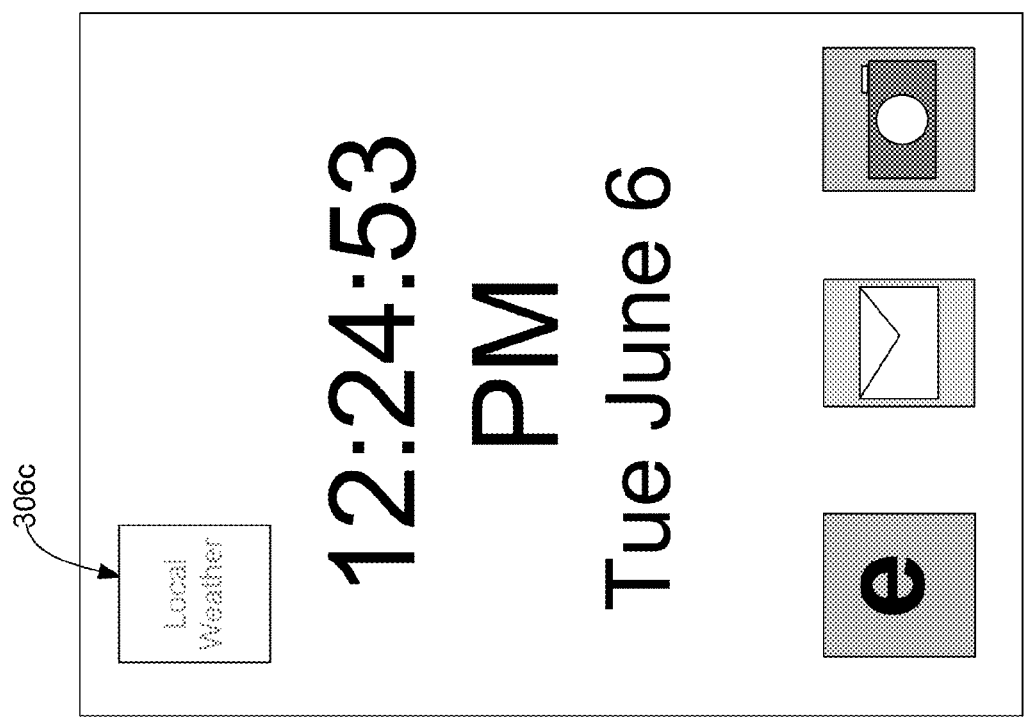

Turning now to FIGS. 3A, 3B, 3C, 3D, and 3E, which illustrates exemplary graphical user interfaces (GUIs) that the wearable computing device 10* may present through a display device when the wearable computing device 10* is in the form of a computing watch 14. Turning particularly now to FIG. 3A, which illustrates an exemplary GUI 300a that includes three icons 304 representing three different applications that may be available through the wearable computing device 10*. Note that at least some of the applications (e.g., browser or email application) that may be available through the wearable computing device 10* may only be available if certain functionalities (e.g., access to the Internet) are obtained or acquired from a nearby electronic device.

FIG. 3B illustrates an exemplary GUI 300b that may be displayed by the wearable computing device 10* after the wearable computing device 10* acquires a particular functionality, in this case GPS functionality, from a nearby electronic device. In particular, the GUI 300b includes icon 306b that indicates availability of the GPS functionality.

FIG. 3C illustrates an exemplary GUI 300c that may be displayed by the wearable computing device 10*. In particular, the exemplary GUI 300c includes an icon 306c that represents an application (e.g., local weather reporting application) and that is being displayed in a first format (e.g., semi-transparent) that indicates that the application is disabled. That is, the associated application (e.g., local weather reporting application) may be fully executable only if the wearable computing device 10* has obtained access to specific functionalities such as access to the Internet and/or GPS functionalities. In contrast, the GUI 300d of FIG. 3D may be displayed by the wearable computing device 10* once the specific functionalities (e.g., Internet access and/or GPS functionalities) has been acquired by the wearable computing device 10*. The GUI 300d includes icon 306d, which is similar or the same as icon 306c of FIG. 3C except that icon 306d being in a second format (e.g., bolded) that indicates that the associated application (e.g., local weather reporting application) is functional or executable.

FIG. 3E illustrates yet another exemplary GUI 300e that may be displayed by the wearable computing device 10*. In particular, the GUI 300e includes an icon 306e that represents an application (e.g., a navigation/maps application) and that is only displayed only when certain functionalities (e.g., GPS functionalities) are acquired by the wearable computing device.

Figure 4A:
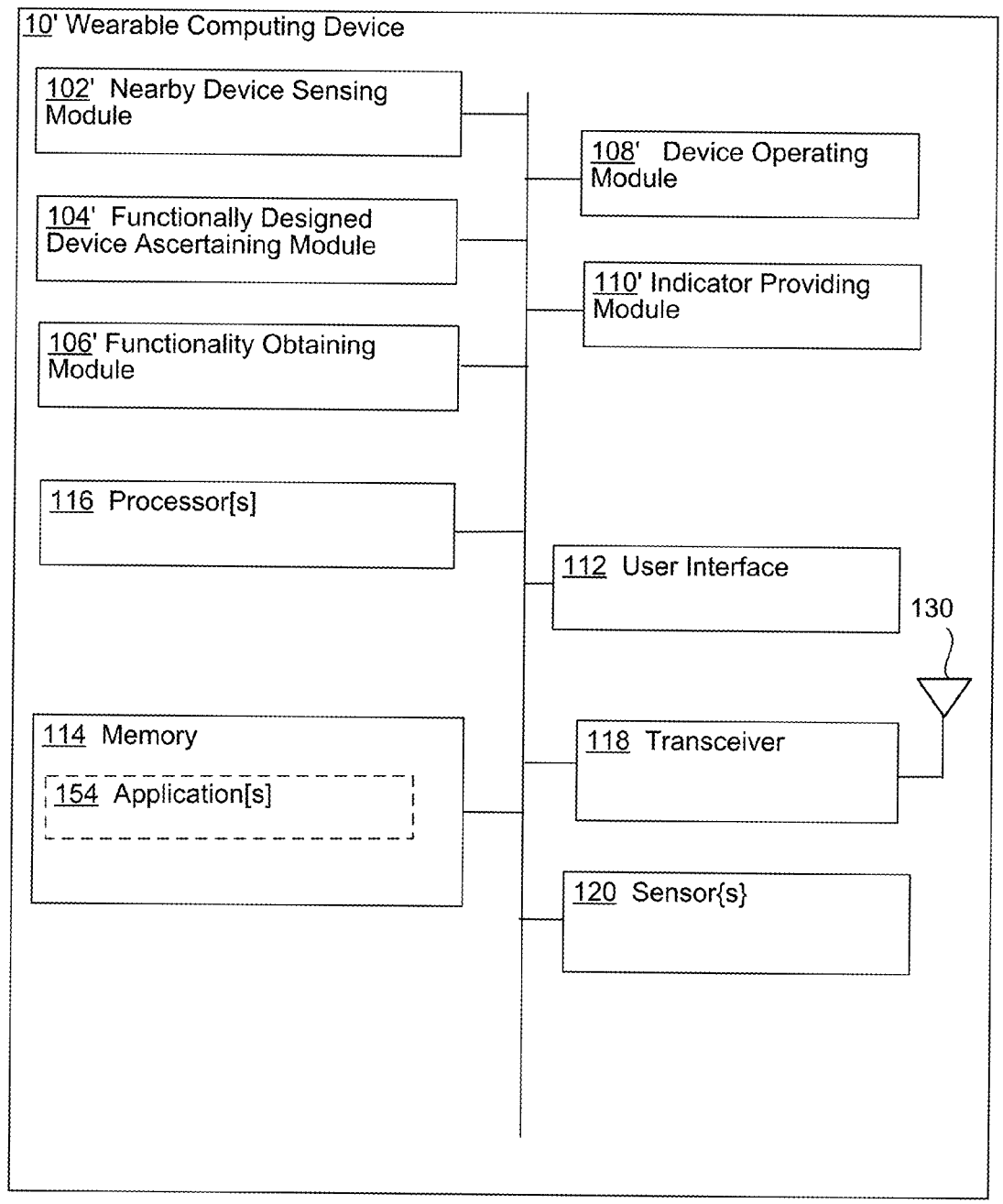
FIG. 4A shows a block diagram of particular implementation of the wearable computing device 10* of FIG. 1.
Figure 4B:
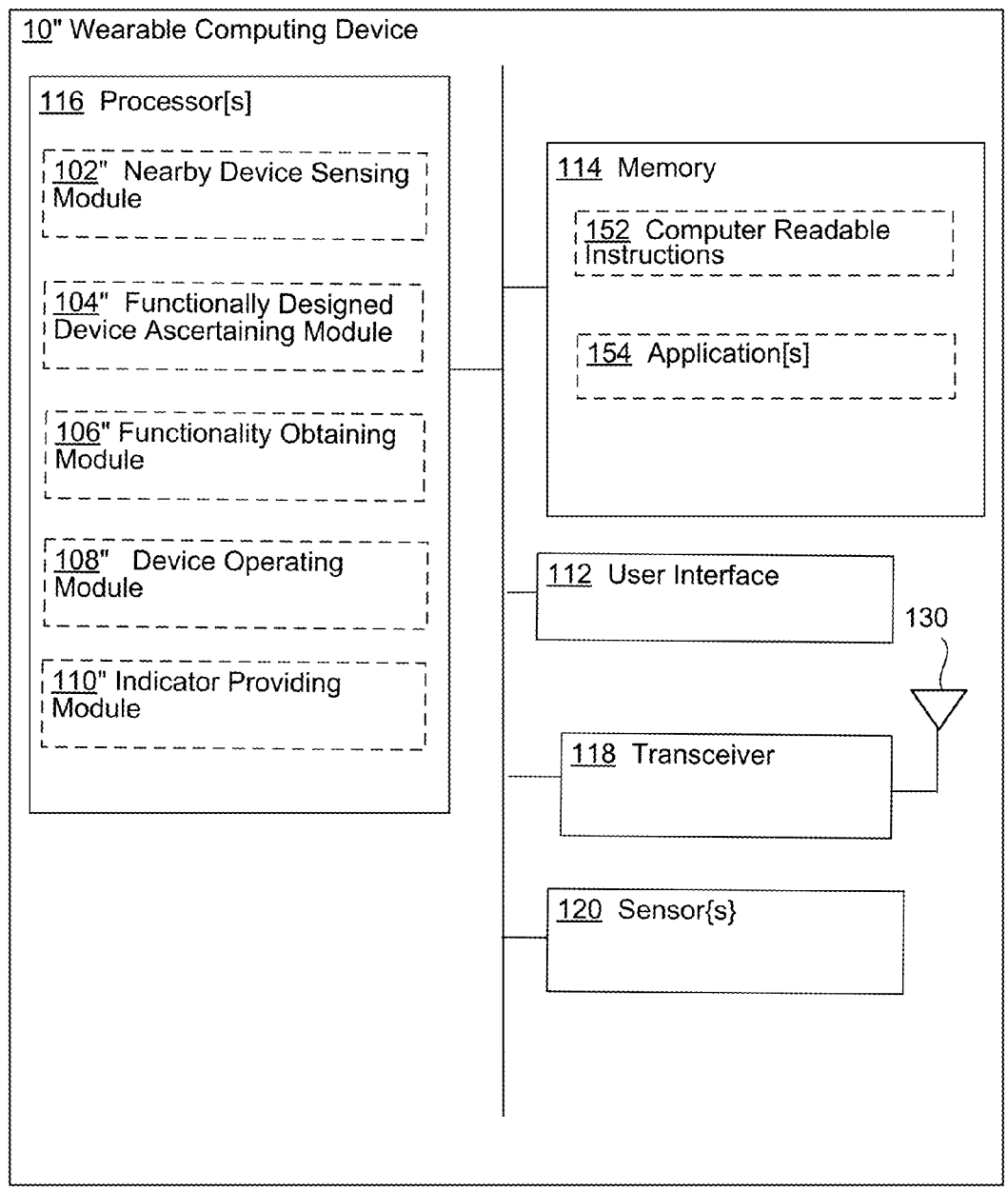
FIG. 4B shows a block diagram of another implementation of the wearable computing device 10* of FIG. 1

Referring now to FIGS. 4A and 4B, illustrating two block diagrams representing two different implementations of the wearable computing device 10* of FIG. 1 and that are designed to execute the operations and processes to be described herein. In particular, and as will be further described herein, FIG. 4A illustrates a wearable computing device 10' that is the "hardwired" or "hard" implementation of a small form-factor wearable device that can implement the operations and processes to be described herein. The wearable computing device 10' may comprise certain logic modules including, for example, a nearby device sensing module 102', a functionally designed device ascertaining module 104', a functionality obtaining module 106', a device operating module 108', and/or an indicator providing module 110' that are implemented using purely hardware or circuitry components (e.g., application specific integrated circuit or "ASIC"). In contrast, FIG. 4B illustrates a wearable computing device 10" that is the "soft" implementation of a small form-factor wearable device that can implement the operations and processes to be described herein. In various embodiments, the wearable computing device 10" may also include certain logic modules including, for example, a nearby device sensing module 102", a functionally designed device ascertaining module 104", a functionality obtaining module 106", a device operating module 108", and/or an indicator providing module 110" that are implemented using electronic circuitry (e.g., one or more processors 116 including one or more microprocessors, controllers, etc.) executing one or more programming instructions (e.g., software in the form of computer readable instructions 152—see FIG. 3B).

The embodiments of the wearable computing device 10* illustrated in FIGS. 4A and 4B are two extreme implementations of a small form-factor wearable system in which all of the logic modules (e.g., the nearby device sensing module 102', the functionally designed device ascertaining module 104', the functionality obtaining module 106', the device operating module 108', and the indicator providing module 110') are implemented using purely hardware solutions (e.g., circuitry such as ASIC) as illustrated in, for example, FIG. 4A or in which all of the logic modules (e.g., the nearby device sensing module 102", the functionally designed device ascertaining module 104", the functionality obtaining module 106", the device operating module 108", and the indicator providing module 110") are implemented using software solutions (e.g., programmable instructions in the form of computer readable instructions 152 being executed by hardware such as one or more processors 116) as illustrated in, for example, FIG. 4B. Since there are many ways of combining hardware, software, and/or firmware in order to implement the various logic modules (e.g., the nearby device sensing module 102*, the functionally designed device ascertaining module 104*, the functionality obtaining module 106*, the device operating module 108*, and the indicator providing module 110*), only the two extreme implementations (e.g., the purely hardware solution as illustrated in FIG. 4A and the software solution of FIG. 4B) are illustrated here. It should be noted here that with respect to the "soft" implementation illustrated in FIG. 4B, hardware in the form of circuitry such as one or more processors 116 are still needed in order to execute the software. Further details related to the two implementations of the wearable computing device 10* illustrated in FIGS. 4A and 4B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 4A, which illustrates a block diagram of an wearable computing device 10' that includes a nearby device sensing module 102', a functionally designed device ascertaining module 104', a functionality obtaining module 106', a device operating module 108', an indicator providing module 110', a memory 114, user interface 112 (e.g., a display, a speaker, and so forth), one or more processors 116 (e.g., one or more microprocessors), transceiver 118, one or more sensors 120, and/or one or more antenna[s] 130. In various embodiments, the memory 114 may store one or more applications (e.g., communication applications such as email, instant messaging, text messaging, and VoIP applications, personal information manager application such as Microsoft Outlook, gaming application, and so forth). The one or more sensors 120 that may be included in the wearable computing device 10' may include, for example, one or more audio sensors (e.g., microphones), one or more visual sensors (e.g., cameras), one or more myoelectric sensors, and so forth.

In various embodiments, the nearby device sensing module 102' of FIG. 4A is a logic module that may be designed to, among other things, sense or detect presence of one or more electronic devices (e.g., one or more external linking devices 20* and/or one or more other wearable computing devices 11*) near the wearable computing device 10' that are within a spatial pod 50 surrounding the wearable computing device 10', the spatial pod 50 surrounding the wearable computing device 10' being a spatial volume that includes the wearable computing device 10' and being enclosed by an enveloping boundary 52, where low-power wireless signals generated by the wearable computing device 10' being discernible over background noise within the enveloping boundary 52 and not discernible over background noise outside the enveloping boundary 52. In contrast, the functionally designed device ascertaining module 104' of FIG. 4A is a logic module that may be configured to ascertain (e.g., determine) which of the one or more electronic devices that were sensed as being within the spatial pod 50 of the wearable computing device 10' are at least designed to provide one or more specific functionalities that are being sought by the wearable computing device 10'.

The functionality obtaining module 106' of FIG. 4A, on the other hand, is a logic module that may be configured to obtain one or more specific functionalities that are available through at least one electronic device that was sensed by the nearby device sensing module 102' as being within the spatial pod 50 of the wearable computing device 10' and that was ascertained by the functionally designed device ascertaining module 104' as providing the one or more specific functionalities. The device operating module 108' of FIG. 4A, in contrast, is a logic module configured to operate the wearable computing device 10' based, at least in part, on data acquired through the one or more specific functionalities obtained by the wearable computing device 10'. Finally, the indicator providing module may be configured to provide one or more indicators that indicate that the one or more specific functionalities have been obtained by the wearable computing device, the one or more indicators being presented in response, at least in part, to the one or more specific functionalities being obtained by the wearable computing device 10'.

Turning now to FIG. 4B, which illustrates a block diagram of another wearable computing device 10" that can implement the operations and processes to be described herein. As indicated earlier, the wearable computing device 10" in FIG. 4B is merely the "soft" version of the wearable computing device 10' of FIG. 4A because the various logic modules: the nearby device sensing module 102", the functionally designed device ascertaining module 104", the functionality obtaining module 106", the device operating module 108", and the indicator providing module 110" are implemented using one or more processors 116 (e.g., one or more microprocessors or controllers) executing software (e.g., computer readable instructions 152) rather than being implemented using purely hardware (e.g., ASIC) solutions as was the case in the wearable computing device 10' of FIG. 4A. Thus, the nearby device sensing module 102", the functionally designed device ascertaining module 104", the functionality obtaining module 106", the device operating module 108", and the indicator providing module 110" of FIG. 4B may be designed to execute the same functions as the nearby device sensing module 102', the functionally designed device ascertaining module 104', the functionality obtaining module 106', the device operating module 108', and the indicator providing module 110' of FIG. 4A. The wearable computing device 10", as illustrated in FIG. 4B, may include other components (e.g., the user interface 112, the transceiver 118, antenna 130, and so forth) that are the same or similar to the other components that may be included in the wearable computing device 10' of FIG. 4A. Note that in the embodiment of the wearable computing device 10" illustrated in FIG. 4B, the various logic modules (e.g., the nearby device sensing module 102", the functionally designed device ascertaining module 104", the functionality obtaining module 106", the device operating module 108", and the indicator providing module 110") may be implemented by the one or more processors 116 (or other types of circuitry such as field programmable gate arrays or FPGAs) executing one or more computer readable instructions 152 stored in memory 114.

In various embodiments, the memory 114 of the wearable computing device 10' of FIG. 4A and the wearable computing device 10" of FIG. 4B may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices.

Figure 5A:
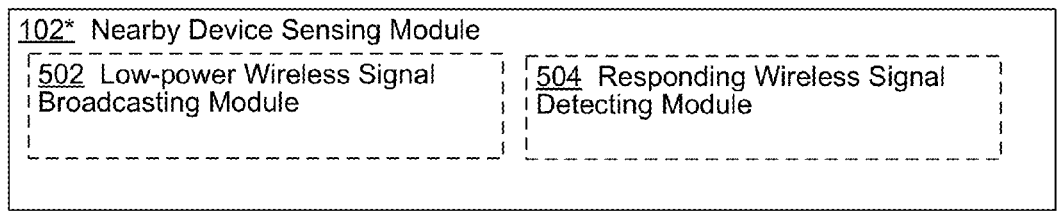
FIG. 5A shows another perspective of the nearby device sensing module 102* of FIGS. 4A and 4B (e.g., the nearby device sensing module 102' of FIG. 4A or the nearby device sensing module 102" of FIG. 4B) in accordance with various implementations.

Turning now to FIG. 5A illustrating a particular implementation of the nearby device sensing module 102* (e.g., the nearby device sensing module 102' or the nearby device sensing module 102") of FIGS. 4A and 4B. As illustrated, the nearby device sensing module 102* may include one or more sub-logic modules in various alternative implementations. For example, in various embodiments, the nearby device sensing module 102* may include a low-power wireless signal broadcasting module 502 and/or a responding wireless signal detecting module 504. Specific details related to the nearby device sensing module 102* as well as the above-described sub-modules of the nearby device sensing module 102* will be provided below with respect to the operations and processes to be described herein.

Figure 5B:
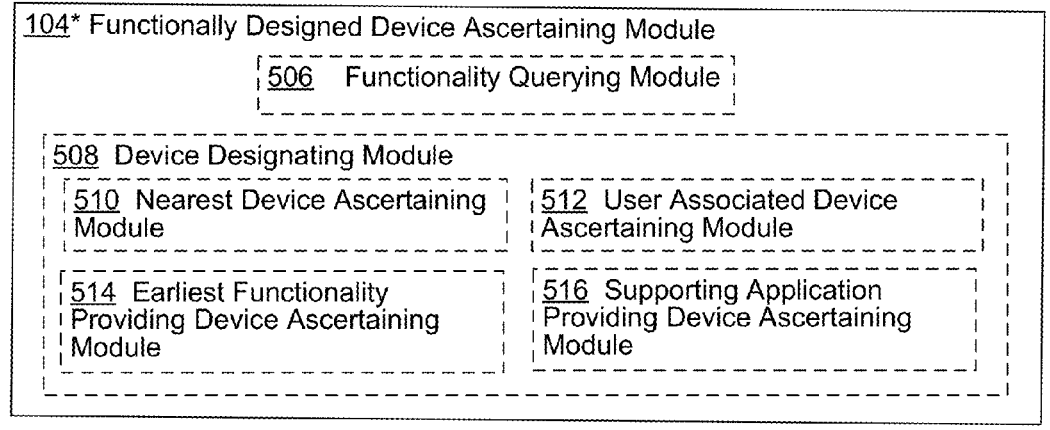
FIG. 5B shows another perspective of the functionally designed device ascertaining module 104* of FIGS. 4A and 4B (e.g., the functionally designed device ascertaining module 104' of FIG. 4A or the functionally designed device ascertaining module 104" of FIG. 4B) in accordance with various implementations.

Turning now to FIG. 5B illustrating a particular implementation of the functionally designed device ascertaining module 104* (e.g., the functionally designed device ascertaining module 104' or the functionally designed device ascertaining module 104") of FIGS. 4A and 4B. As illustrated, the functionally designed device ascertaining module 104* may include one or more sub-logic modules in various alternative implementations. For example, in various embodiments, the functionally designed device ascertaining module 104* may include a functionality querying module 506 and/or a device designating module 508, which may further include a nearest device ascertaining module 510, a user associated device ascertaining module 512, an earliest functionality providing device ascertaining module 514, and/or a supporting application providing device ascertaining module 516. Specific details related to the functionally designed device ascertaining module 104* as well as the above-described sub-modules of the functionally designed device ascertaining module 104* will be provided below with respect to the operations and processes to be described herein.

Figure 5C:
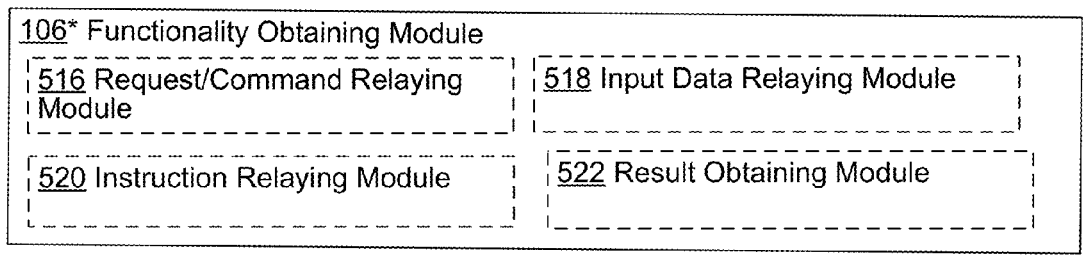
FIG. 5C shows another perspective of the functionality obtaining module 106* of FIGS. 4A and 4B (e.g., the functionality obtaining module 106' of FIG. 4A or the functionality obtaining module 106" of FIG. 4B) in accordance with various implementations.

FIG. 5C illustrates a particular implementation of the functionality obtaining module 106* (e.g., the functionality obtaining module 106' or the functionality obtaining module 106") of FIG. 4A or 4B. As illustrated, the functionality obtaining module 106* may include one or more sub-logic modules in various alternative embodiments. For example, in various embodiments, the functionality obtaining module 106* may include a request/command relaying module 516, an input data relaying module 518, an instruction relaying module 520, and/or a result obtaining module 522. Specific details related to the functionality obtaining module 106*, as well as the above-described sub-modules of the functionality obtaining module 106*, will be provided below with respect to the operations and processes to be described herein.

Figure 5D:
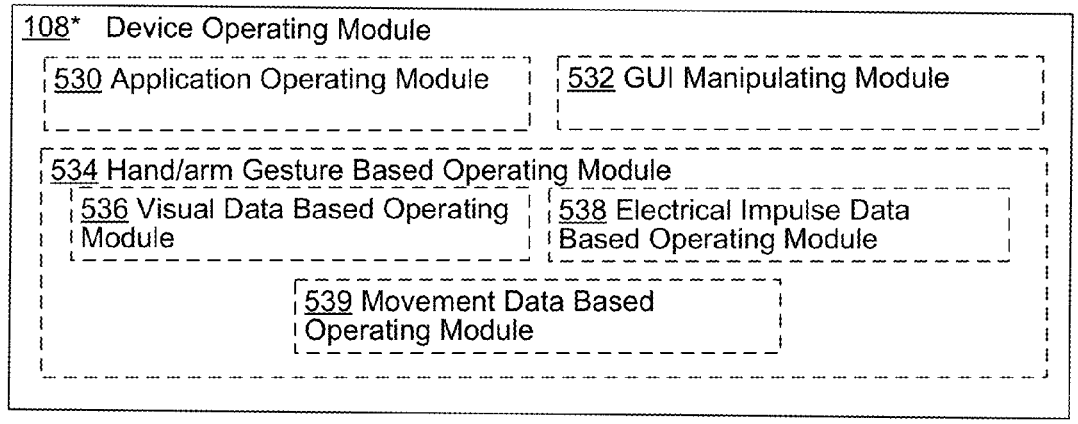
FIG. 5D shows another perspective of the device operating module 108* of FIGS. 4A and 4B (e.g., the device operating module 108' of FIG. 4A or the device operating module 108" of FIG. 4B) in accordance with various implementations.
Figure 5E:
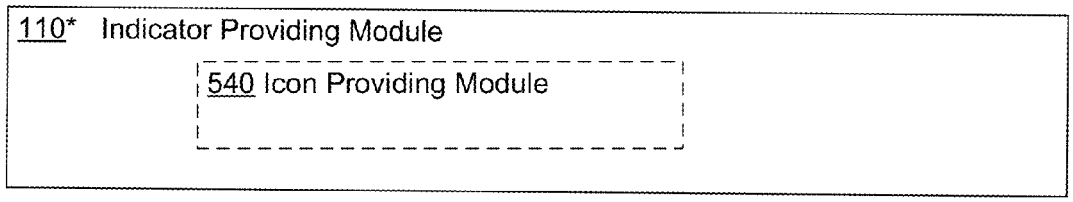
FIG. 5E shows another perspective of the indicator providing module 110* of FIGS. 4A and 4B (e.g., the indicator providing module 110' of FIG. 4A or the indicator providing module 110" of FIG. 4B) in accordance with various implementations.

FIG. 5D illustrates a particular implementation of the device operating module 108* (e.g., the device operating module 108' or the device operating module 108") of FIG. 4A or 4B. As illustrated, the device operating module 108* may include one or more sub-logic modules in various alternative embodiments. For example, in various embodiments, the device operating module 108* may include an application operating module 530, a GUI manipulating module 532, and/or a hand/arm gesture based operating module 534, which may further include a visual data based operating module 536, an electrical impulse data based operating module 538, and/or a movement data based operating module 539. Specific details related to the device operating module 108*, as well as the above-described sub-modules of the device operating module 108*, will be provided below with respect to the operations and processes to be described herein.

FIG. 5D illustrates a particular implementation of the indicator providing module 110* (e.g., the indicator providing module 110' or the indicator providing module 110") of FIG. 4A or 4B. As illustrated, the indicator providing module 110* may include one or more sub-logic modules in various alternative embodiments. For example, in various embodiments, the indicator providing module 110* may further include an icon providing module 540. Specific details related to the indicator providing module 110*, as well as the above-described sub-modules of the indicator providing module 110*, will be provided below with respect to the operations and processes to be described herein.

Figure 6:
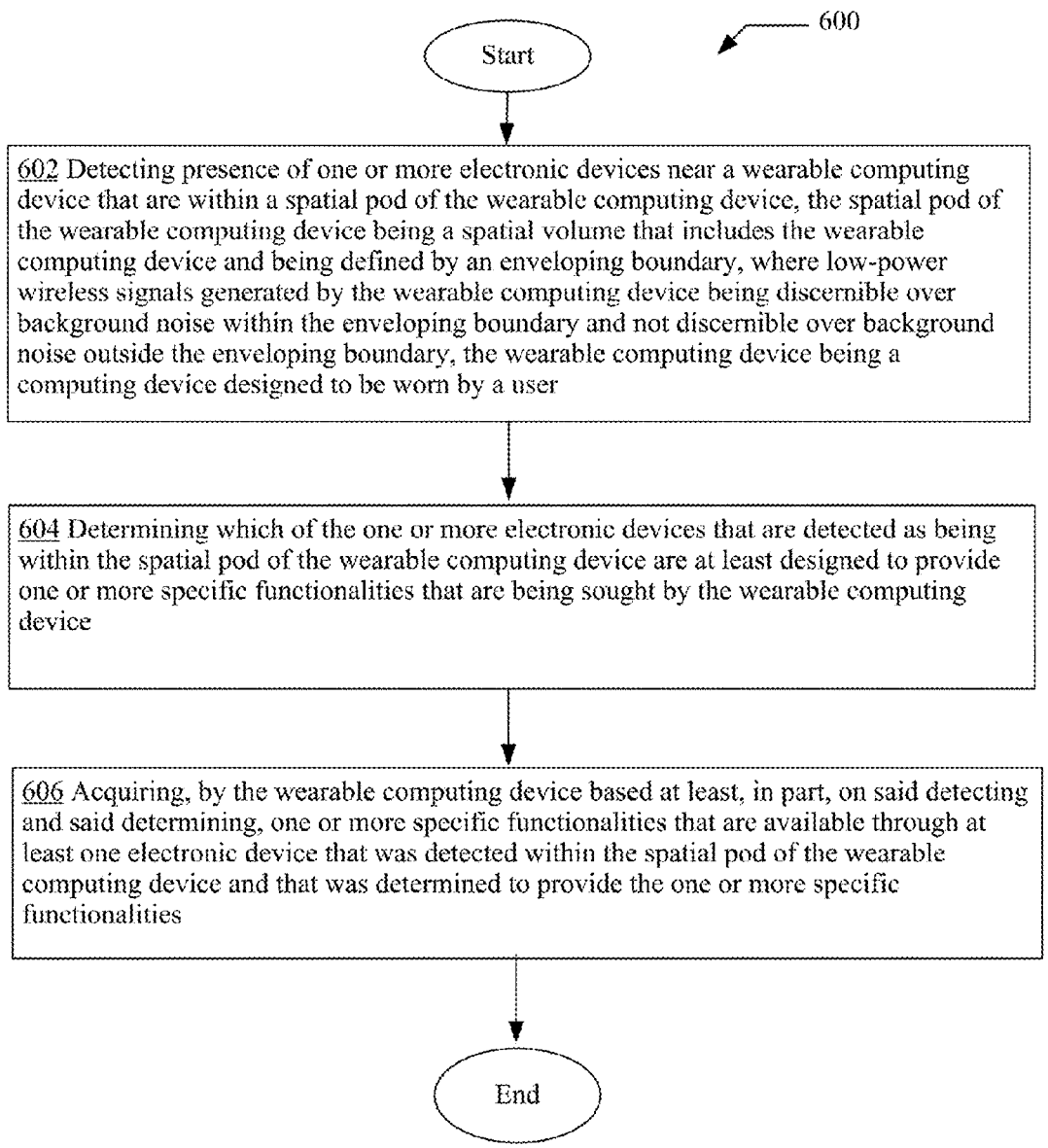
FIG. 6 is a high-level logic flowchart of a process, e.g., operational flow 600, according to some embodiments.

A more detailed discussion related to the wearable computing device 10* (e.g., the wearable computing device 10' of FIG. 4A or the wearable computing device 10" of FIG. 4B) discussed above will now be provided with respect to the processes and operations to be described herein. FIG. 6 illustrates an operational flow 600 representing example operations for, among other things, detecting presence of one or more electronic devices near a wearable computing device 10* that is designed to be worn by a user, determining which of one or more electronic devices detected near the wearable computing device 10* has one or more specific functionalities that are being sought by the wearable computing device 10*, and acquiring, by the wearable computing device 10*, the one or more specific functionalities from at least one of the one or more electronic devices that were detected near the wearable computing device 10* and that were determined to have the one or more specific functionalities. In various implementations, these operations may be implemented by the wearable computing device 10* of FIG. 4A or 4B (as well as FIG. 1).

In FIG. 6 and in the following figures that include various examples of operational flows, discussions and explanations will be provided with respect to the wearable computing device 10* described above and as illustrated in FIGS. 4A, 4B, 5A, 5B, 5C, 5D, 5E, and/or with respect to other examples (e.g., as provided in FIGS. 1, 2A, 2B, 2C, 3A, 3B, 3C, 3D, and 3E) and contexts. However, it should be understood that the operational flows may be executed in a number of other environments and contexts, and/or in modified versions of FIGS. 1, 2A, 2B, 2C, 3A, 3B, 3C, 3D, 3E, 4A, 4B, 5A, 5B, 5C, 5D, and/or 5E. Also, although the various operational flows are presented in the sequence(s) illustrated, it should be understood that the various operations may be performed in orders other than those which are illustrated, or may be performed concurrently.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 600 of FIG. 6 may move to a nearby device detecting operation 602 for detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user. For instance, and as illustration, the nearby device sensing module 102* of the wearable computing device 10* of FIG. 4A or 4B (e.g., the nearby device sensing module 102' of FIG. 4A or the nearby device sensing module 102" of FIG. 4B) detecting or sensing presence of one or more electronic devices (e.g., one or more external linking devices 20* and/or one or more other wearable computing devices 11*) near the wearable computing device 10* that are within a spatial pod 50 of the wearable computing device 10*, the spatial pod 50 of the wearable computing device 10* being a spatial volume that includes the wearable computing device 10* and being defined by an enveloping boundary 52, where low-power wireless signals (e.g., less than 0.7 milliwatt wireless signals transmitted by a directional or omnidirectional antenna) generated by the wearable computing device 10* being discernible over background noise within the enveloping boundary 52 and not discernible over background noise outside the enveloping boundary 52, the wearable computing device 10* being a computing device designed to be worn by a user. In various embodiments, a wearable computing device 10* may be a computing device having one or more components for coupling or attaching the computing device to a portion of a user's body such as the computing glasses 12 of FIG. 2A, which has two temple pieces 208* for extending over and/or behind the ears, or computing watch 14 of FIG. 2B, which includes a wristband 212 for wrapping around a user's wrist. In some embodiments, the nearby device detecting operation 602 of FIG. 6 may be implemented by the wearable computing device 10* as part of a handshaking operation to establish one or more communication links with one or more nearby electronic devices.

Operational flow 600 may also include a functionally designed device determining operation 604 for determining which of the one or more electronic devices that are detected as being within the spatial pod of the wearable computing device are at least designed to provide one or more specific functionalities that are being sought by the wearable computing device. For instance, the functionally designed device ascertaining module 104* (e.g., the functionally designed device ascertaining module 104' of FIG. 4A or the functionally designed device ascertaining module 104" of FIG. 4B) of the wearable computing device 10* of FIG. 4A or 4B determining or ascertaining which of the one or more electronic devices (e.g., one or more external linking devices 20* and/or one or more other wearable computing devices 11*) that are detected as being within the spatial pod 50 of the wearable computing device 10\* are at least designed to provide one or more specific functionalities (e.g., capabilities for communicating beyond the spatial pod 50 of the wearable computing device 10\* or GPS capabilities) that are being sought by the wearable computing device 10\*. In various embodiments, the one or more specific functionalities that are being sought by the wearable computing device 10\* may be sought by the wearable computing device 10\* because such functionalities may not be independently provided by the wearable computing device 10\* (e.g., the wearable computing device 10\* does not independently possess the one or more specific functionalities).

As further illustrated in FIG. 6, operational flow 600 may also include a functionality acquiring operation 606 for acquiring, by the wearable computing device based at least, in part, on said detecting and said determining, one or more specific functionalities that are available through at least one electronic device that was detected within the spatial pod of the wearable computing device and that was determined to provide the one or more specific functionalities. For instance, the functionality obtaining module 106\* (e.g., functionality obtaining module 106' of FIG. 4A or the functionality obtaining module 106" of FIG. 4B) of the wearable computing device 10\* of FIG. 4A or 4B acquiring or obtaining based at least, in part, on said detecting and said determining, one or more specific functionalities that are available through at least one electronic device (e.g., an external linking device 20\* or another wearable computing device 11\*) that was detected within the spatial pod 50 of the wearable computing device 10\* and that was determined to provide the one or more specific functionalities (e.g., communication capabilities for communicating beyond the spatial pod 50 of the wearable computing device 10\*, GPS capabilities, visual or other sensing capabilities not directly available through the wearable computing device 10\*, and so forth).

Figure 7A:
FIG. 7A is a high-level logic flowchart of a process depicting alternate implementations of the nearby device detecting operation 602 of FIG. 6.

As will be described below, the nearby device detecting operation 602, the functionally designed device determining operation 604, and the functionality acquiring operation 606 may be executed in a variety of different ways in various alternative implementations. FIGS. 7A, 7B, 7C, 7D, 7E, and 7F, for example, illustrate at least some of the alternative ways that the nearby device detecting operation 602 of FIG. 6 may be executed in various alternative implementations. In some cases, for example, the nearby device detecting operation 602 may actually include or involve an operation 702 for detecting presence of the one or more electronic devices near the wearable computing device that are within the spatial pod of the wearable computing device by transmitting, via the wearable computing device, one or more low-power wireless signals to solicit one or more responding wireless signals from one or more electronic devices that detect the one or more low-power wireless signals and monitoring at the wearable computing device for reception of the one or more responding wireless signals generated by the one or more electronic devices in response to the one or more electronic devices detecting the one or more low-power wireless signals as illustrated in FIG. 7A. For instance, the nearby device sensing module 102\* including the low-power wireless signal broadcasting module 502 and the responding wireless signal detecting module 504 (see FIG. 5A) of the wearable computing device 10\* (e.g., the wearable computing device 10' of FIG. 4A or the wearable computing device 10" of FIG. 4B) detecting or sensing presence of the one or more electronic devices near the wearable computing device 10\* that are within the spatial pod 50 of the wearable computing device 10\* by transmitting or broadcasting, via the low-power wireless signal broadcasting module 502, one or more low-power wireless signals (e.g., less than 0.5 milliwatt signals from the 2.4 GHz frequency band or 60 GHz frequency band) to solicit one or more responding wireless signals from one or more electronic devices (e.g., one or more external linking devices 20\* and/or one or more other wearable computing devices 11\*) that detect the one or more low-power wireless signals and monitoring or detecting, by the responding wireless signal detecting module 504, for reception of the one or more responding wireless signals generated by the one or more electronic devices in response to the one or more electronic devices detecting the one or more low-power wireless signals.

Figure 7B:
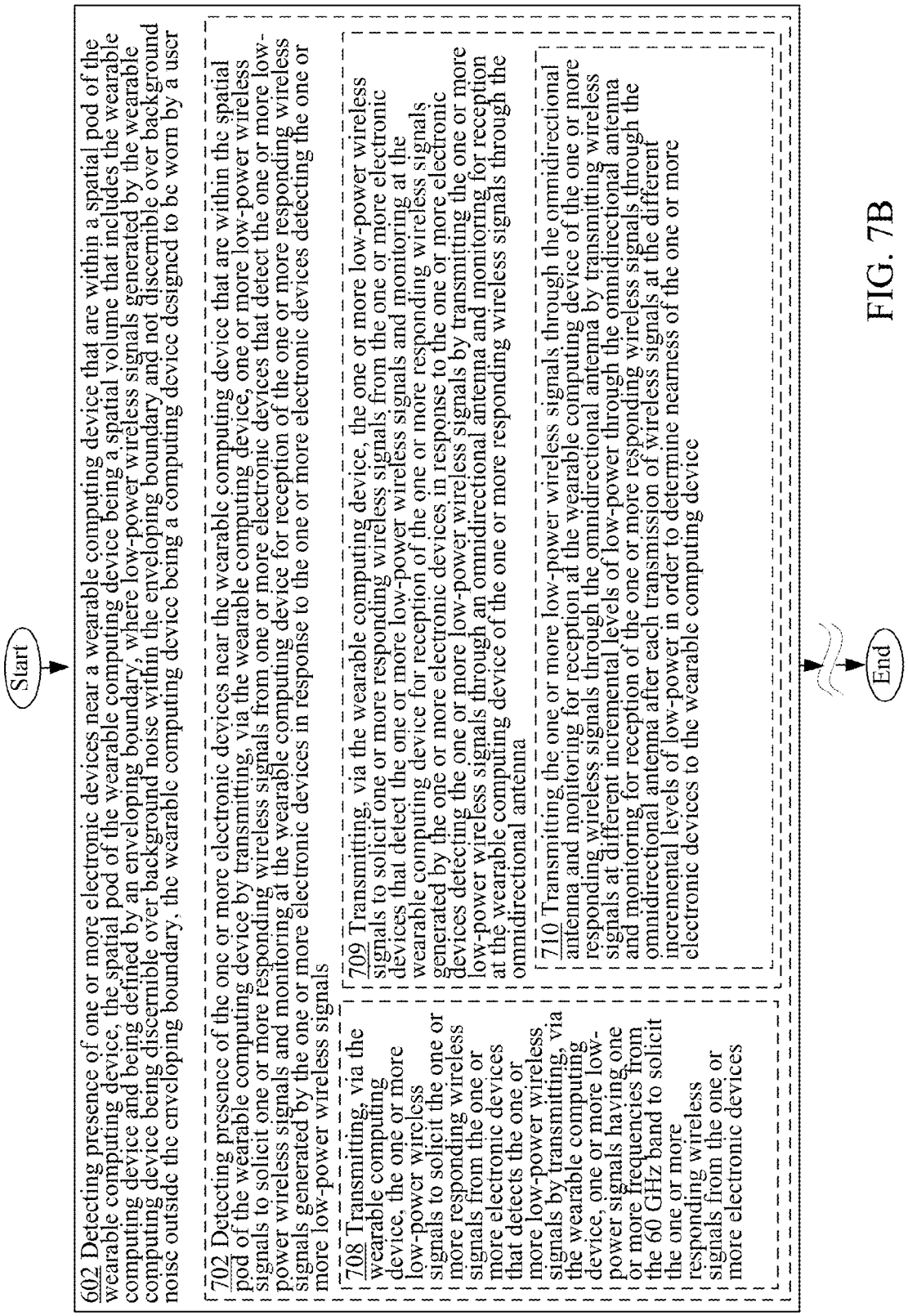
FIG. 7B is a high-level logic flowchart of a process depicting alternate implementations of the nearby device detecting operation 602 of FIG. 6.
Figure 7C:
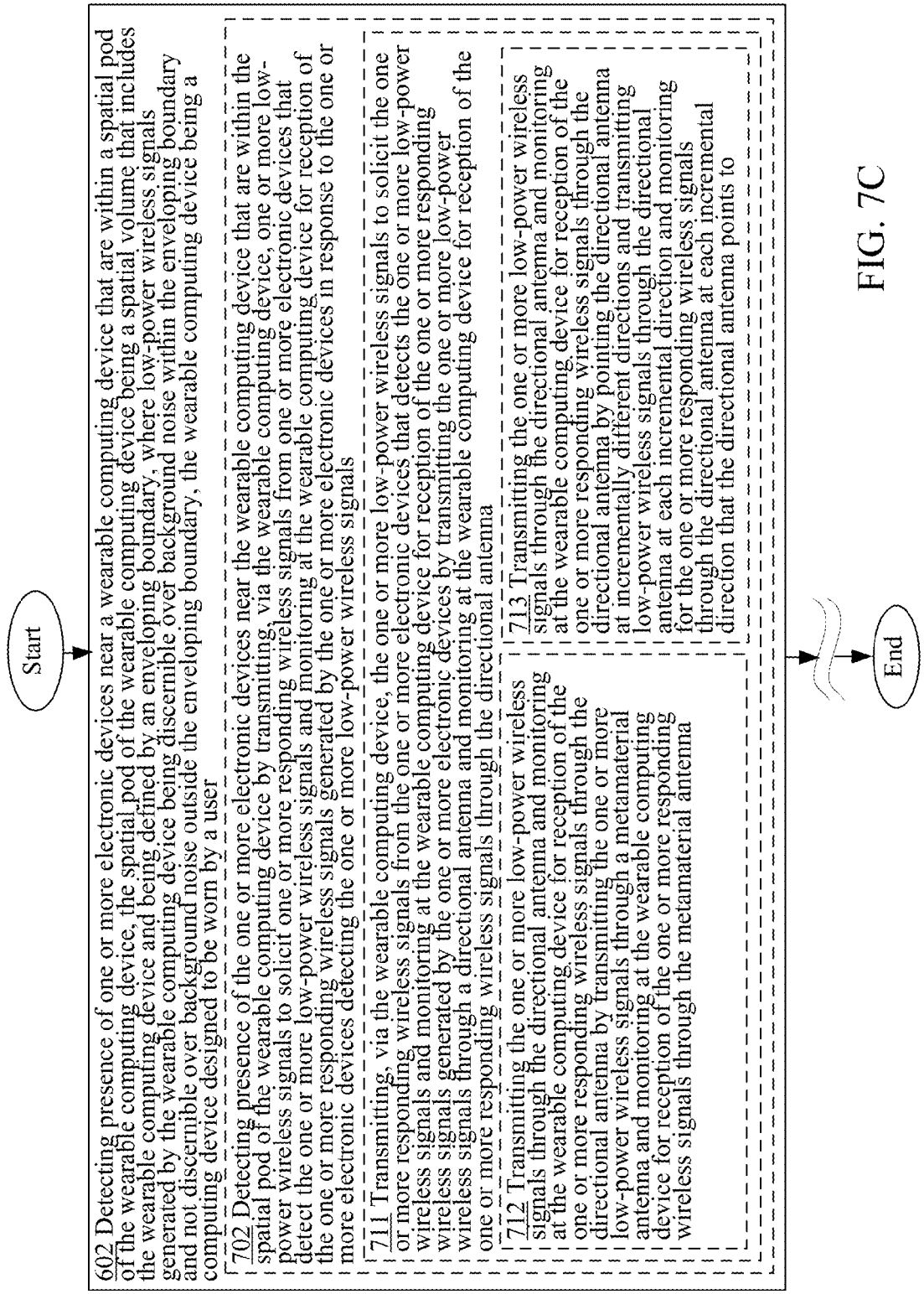
FIG. 7C is a high-level logic flowchart of a process depicting alternate implementations of the nearby device detecting operation 602 of FIG. 6.
Figure 7D:
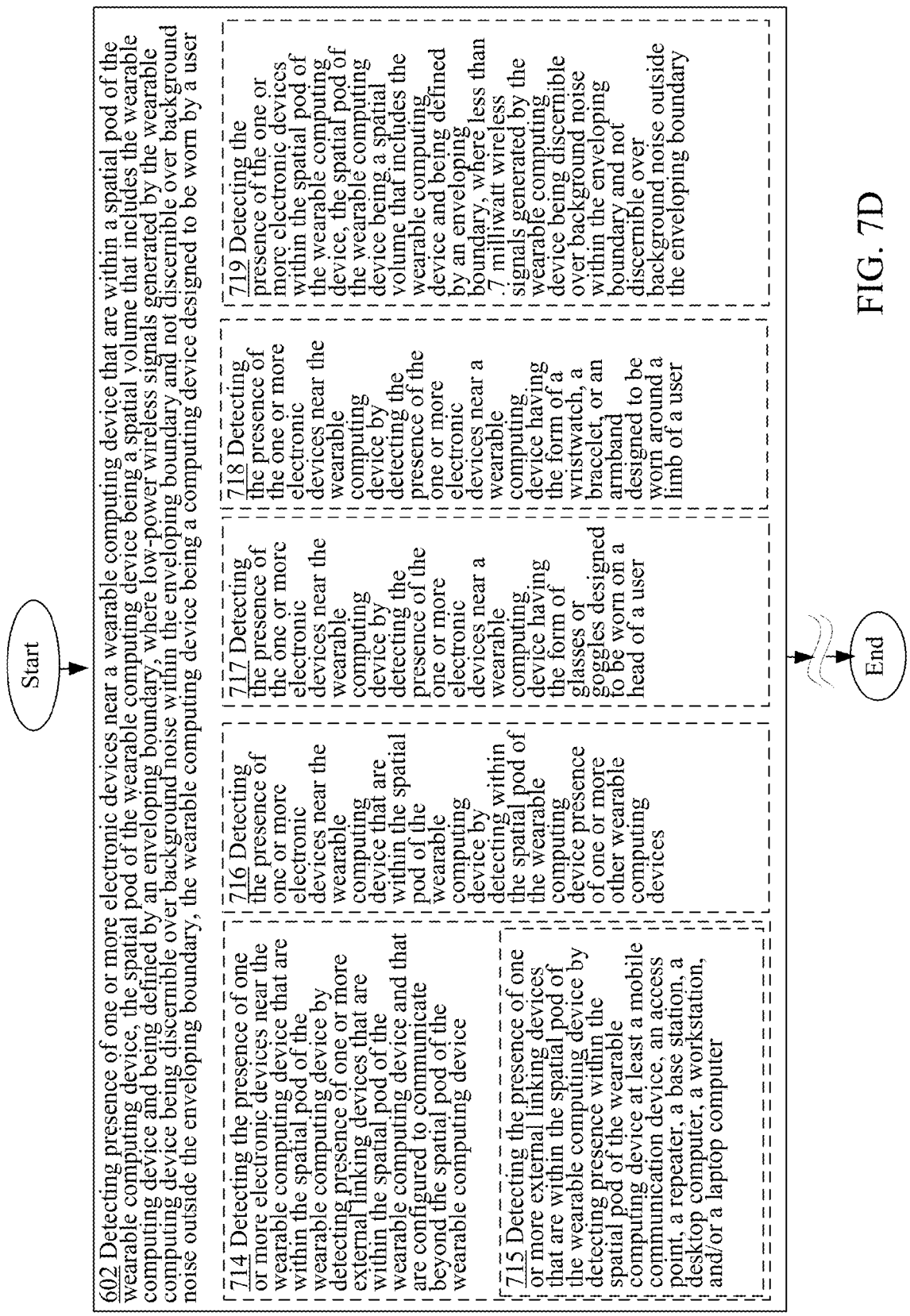
FIG. 7D is a high-level logic flowchart of a process depicting alternate implementations of the nearby device detecting operation 602 of FIG. 6.

As further illustrated in FIGS. 7A, 7B, and 7C, operation 702 may be implemented in a variety of different ways. For example, in some implementations, operation 702 may actually include or involve an operation 703 for transmitting, via the wearable computing device, the one or more low-power wireless signals to solicit the one or more responding wireless signals from the one or more electronic devices that detects the one or more low-power wireless signals by transmitting, via the wearable computing device, less than 0.7 milliwatt wireless signals to solicit the one or more responding wireless signals from the one or more electronic devices. For instance, the low-power wireless signal broadcasting module 502 of the wearable computing device 10\* of FIG. 4A or 4B transmitting the one or more low-power wireless signals to solicit the one or more responding wireless signals from the one or more electronic devices that detects the one or more low-power wireless signals by transmitting or broadcasting less than 0.7 milliwatt wireless signals (e.g., wireless signals from 2.4 GHz frequency band, 5 GHz frequency band, or 60 GHz frequency band) to solicit the one or more responding wireless signals from the one or more electronic devices (e.g., one or more external linking devices 20\* and/or one or more other wearable computing devices 11\*).

As further illustrated in FIG. 7A, in some implementations, operation 703 may further include an operation 704 for transmitting, via the wearable computing device, the less than 0.7 milliwatt wireless signals to solicit the one or more responding wireless signals from the one or more electronic devices by transmitting, via the wearable computing device, less than 0.5 milliwatt wireless signals to solicit the one or more responding wireless signals from the one or more electronic devices. For instance, the low-power wireless signal broadcasting module 502 of the wearable computing device 10\* of FIG. 4A or 4B transmitting the less than 0.7 milliwatt wireless signals to solicit the one or more responding wireless signals from the one or more electronic devices by transmitting or broadcasting, via a directional or omnidirectional antenna, less than 0.5 milliwatt wireless signals to solicit the one or more responding wireless signals from the one or more electronic devices.

In some cases, operation 704 may, in turn, further include an operation 705 for transmitting, via the wearable computing device, the less than 0.5 milliwatt wireless signals to solicit the one or more responding wireless signals from the one or more electronic devices by transmitting, via the wearable computing device, less than 0.3 milliwatt wireless signals to solicit the one or more responding wireless signals from the one or more electronic devices. For instance, the low-power wireless signal broadcasting module 502 of the wearable computing device 10\* of FIG. 4A or 4B transmitting the less than 0.5 milliwatt wireless signals to solicit the one or more responding wireless signals from the one or more electronic devices by transmitting or broadcasting less than 0.3 milliwatt wireless signals (e.g., 0.1 milliwatt wireless signals from the 2.4 GHz frequency band) to solicit the one or more responding wireless signals from the one or more electronic devices (e.g., one or more external linking devices 20*  and/or one or more other wearable computing devices 11*).

In some implementations, operation 702 may actually include or involve an operation 706 for transmitting, via the wearable computing device, the one or more low-power wireless signals to solicit the one or more responding wireless signals from the one or more electronic devices that detects the one or more low-power wireless signals by transmitting, via the wearable computing device, one or more low-power signals having one or more frequencies from the 2.4 GHz band to solicit the one or more responding wireless signals from the one or more electronic devices. For instance, the low-power wireless signal broadcasting module 502 of the wearable computing device 10* of FIG. 4A or 4B transmitting the one or more low-power wireless signals to solicit the one or more responding wireless signals from the one or more electronic devices that detects the one or more low-power wireless signals by transmitting or broadcasting one or more low-power signals having one or more frequencies from the 2.4 GHz band (e.g., 2.4 GHz ISM (industrial, scientific, and medical) frequency band having frequency range between 2.4 GHz and 2.4835 GHz) to solicit the one or more responding wireless signals from the one or more electronic devices.

In some alternative implementations, operation 702 may actually include or involve an operation 707 for transmitting, via the wearable computing device, the one or more low-power wireless signals to solicit the one or more responding wireless signals from the one or more electronic devices that detects the one or more low-power wireless signals by transmitting, via the wearable computing device, one or more low-power signals having one or more frequencies from the 5 GHz band to solicit the one or more responding wireless signals from the one or more electronic devices. For instance, the low-power wireless signal broadcasting module 502 of the wearable computing device 10* of FIG. 4A or 4B transmitting the one or more low-power wireless signals to solicit the one or more responding wireless signals from the one or more electronic devices that detects the one or more low-power wireless signals by transmitting or broadcasting one or more low-power signals having one or more frequencies from the 5 GHz band (e.g., 5 GHz ISM frequency band or 5 GHz U-NII frequency band with a frequency range between 5.180 GHz and 5.825 GHz) to solicit the one or more responding wireless signals from the one or more electronic devices.

In some alternative implementations, operation 702 may actually include or involve an operation 708 for transmitting, via the wearable computing device, the one or more low-power wireless signals to solicit the one or more responding wireless signals from the one or more electronic devices that detects the one or more low-power wireless signals by transmitting, via the wearable computing device, one or more low-power signals having one or more frequencies from the 60 GHz band to solicit the one or more responding wireless signals from the one or more electronic devices as illustrated in FIG. 7B. For instance, the low-power wireless signal broadcasting module 502 of the wearable computing device 10* of FIG. 4A or 4B transmitting the one or more low-power wireless signals to solicit the one or more responding wireless signals from the one or more electronic devices that detects the one or more low-power wireless signals by transmitting or broadcasting one or more low-power signals having one or more frequencies from the 60 GHz band (e.g., millimeter waveband or mmWave band with a frequency range between 57 and 64 GHz (U.S) or between 57 and 66 GHz (Japan and Europe)) to solicit the one or more responding wireless signals from the one or more electronic devices.

In the same or alternative implementations, operation 702 may additionally or alternatively include or involve an operation 709 for transmitting, via the wearable computing device, the one or more low-power wireless signals to solicit one or more responding wireless signals from the one or more electronic devices that detect the one or more low-power wireless signals and monitoring at the wearable computing device for reception of the one or more responding wireless signals generated by the one or more electronic devices in response to the one or more electronic devices detecting the one or more low-power wireless signals by transmitting the one or more low-power wireless signals through an omnidirectional antenna and monitoring for reception at the wearable computing device of the one or more responding wireless signals through the omnidirectional antenna. For instance, the low-power wireless signal broadcasting module 502 and the responding wireless signal detecting module 504 of the wearable computing device 10* of FIG. 4A or 4B transmitting the one or more low-power wireless signals to solicit one or more responding wireless signals from the one or more electronic devices that detect the one or more low-power wireless signals and monitoring for reception of the one or more responding wireless signals generated by the one or more electronic devices in response to the one or more electronic devices detecting the one or more low-power wireless signals when the low-power wireless signal broadcasting module 502 transmits or broadcasts the one or more low-power wireless signals through an omnidirectional antenna (e.g., a dipole antenna (a folded dipole, short dipole, cage dipole, and bowtie antenna), monopole antenna such as a Rubber Ducky antenna, halo antenna, microstrip antenna including a patch antenna, a patch array antenna, a collinear antenna, a metamaterial antenna, and so forth) and when the responding wireless signal detecting module 504 monitors or detects for reception of the one or more responding wireless signals through the omnidirectional antenna.

In some implementations, operation 709 may actually include or involve an operation 710 for transmitting the one or more low-power wireless signals through the omnidirectional antenna and monitoring for reception at the wearable computing device of the one or more responding wireless signals through the omnidirectional antenna by transmitting wireless signals at different incremental levels of low-power through the omnidirectional antenna and monitoring for reception of the one or more responding wireless signals through the omnidirectional antenna after each transmission of wireless signals at the different incremental levels of low-power in order to determine nearness of the one or more electronic devices to the wearable computing device. For instance, the low-power wireless signal broadcasting module 502 and the responding wireless signal detecting module 504 of the wearable computing device 10* of FIG. 4A or 4B transmitting the one or more low-power wireless signals through the omnidirectional antenna and monitoring for reception at the wearable computing device of the one or more responding wireless signals through the omnidirectional antenna when the low-power wireless signal broadcasting module 502 transmits or broadcasts wireless signals at different incremental levels of low-power through the omnidirectional antenna and when the responding wireless signal detecting module 504 monitors (e.g., detects) for reception of the one or more responding wireless signals through the omnidirectional antenna after each transmission of wireless signals at the different incremental levels of low-power in order to determine nearness of the one or more electronic devices to the wearable computing device. For example, the wearable computing device 10* initially transmitting 0.1 milliwatt "soliciting" signals to solicit responding wireless signals from any electronic device that detects the 0.1 milliwatt soliciting signals, and then monitoring at the wearable computing device 10* for reception of the responding wireless signals from one or more electronic devices that detects the 0.1 milliwatt signals. The wearable computing device 10* may next transmit 0.2 milliwatt soliciting signals in order to prompt responding wireless signals from any electronic device that detects the 0.2 milliwatt soliciting signals, and then monitoring at the wearable computing device 10* for reception of the responding wireless signals from one or more electronic devices that detects the 0.2 milliwatt soliciting signals. The wearable computing device 10* may then repeat such operations by incrementally increasing the power levels of the low-power soliciting signals to be transmitted, and then monitoring for responding wireless signals from any electronic device that detects such low-power signals.

Referring now to FIG. 7C, in some implementations, operation 702 may actually involve or include an operation 711 for transmitting, via the wearable computing device, the one or more low-power wireless signals to solicit the one or more responding wireless signals from the one or more electronic devices that detects the one or more low-power wireless signals and monitoring at the wearable computing device for reception of the one or more responding wireless signals generated by the one or more electronic devices by transmitting the one or more low-power wireless signals through a directional antenna and monitoring at the wearable computing device for reception of the one or more responding wireless signals through the directional antenna. For instance, the low-power wireless signal broadcasting module 502 and the responding wireless signal detecting module 504 of the wearable computing device 10* of FIG. 4A or 4B transmitting the one or more low-power wireless signals to solicit the one or more responding wireless signals from the one or more electronic devices that detects the one or more low-power wireless signals and monitoring for reception of the one or more responding wireless signals generated by the one or more electronic devices when the low-power wireless signal broadcasting module 502 transmits (e.g., broadcasts) the one or more low-power wireless signals through a directional antenna (e.g., metamaterial antenna, Yagi-Uda antenna, log-periodic antenna, corner reflector antenna, and so forth) and when the responding wireless signal detecting module 504 monitors (e.g., detects) at the wearable computing device 10* for reception of the one or more responding wireless signals through the directional antenna.

As further illustrated in FIG. 7C, operation 711 in various implementations may further include or involve one or more additional operations including, in some cases, an operation 712 for transmitting the one or more low-power wireless signals through the directional antenna and monitoring at the wearable computing device for reception of the one or more responding wireless signals through the directional antenna by transmitting the one or more low-power wireless signals through a metamaterial antenna and monitoring at the wearable computing device for reception of the one or more responding wireless signals through the metamaterial antenna. For instance, the low-power wireless signal broadcasting module 502 and the responding wireless signal detecting module 504 of the wearable computing device 10* of FIG. 4A or 4B transmitting the one or more low-power wireless signals through the directional antenna and monitoring at the wearable computing device for reception of the one or more responding wireless signals through the directional antenna when the low-power wireless signal broadcasting module 502 transmits the one or more low-power wireless signals through a metamaterial antenna and the responding wireless signal detecting module 504 monitors (e.g., detects) at the wearable computing device for reception of the one or more responding wireless signals through the metamaterial antenna.

In some implementations, operation 711 may additionally or alternatively include an operation 713 for transmitting the one or more low-power wireless signals through the directional antenna and monitoring at the wearable computing device for reception of the one or more responding wireless signals through the directional antenna by pointing the directional antenna at incrementally different directions and transmitting low-power wireless signals through the directional antenna at each incremental direction and monitoring for the one or more responding wireless signals through the directional antenna at each incremental direction that the directional antenna points to. For instance, the low-power wireless signal broadcasting module 502 and the responding wireless signal detecting module 504 of the wearable computing device 10* of FIG. 4A or 4B transmitting the one or more low-power wireless signals through the directional antenna and monitoring at the wearable computing device 10* for reception of the one or more responding wireless signals through the directional antenna when the low-power wireless signal broadcasting module 502 points the directional antenna (e.g., points the beam of the directional antenna) at incrementally different directions and transmits (e.g., broadcasts) low-power wireless signals through the directional antenna at each incremental direction and when the responding wireless signal detecting module 504 monitors (e.g., detects) for the one or more responding wireless signals through the directional antenna at each incremental direction that the directional antenna points to. In some cases, the wireless signals to be transmitted through the directional antenna at each direction may be incrementally adjusted in order to determine closeness of nearby electronic devices to the wearable computing device 10* similar to operation 710.

In various embodiments, the nearby device detecting operation 602 of FIG. 6 may result in detecting of one or more of a variety of electronic devices near the wearable computing device 10*. For example, in some implementations, the nearby device detecting operation 602 may actually include an operation 714 for detecting the presence of one or more electronic devices near the wearable computing device that are within the spatial pod of the wearable computing device by detecting presence of one or more external linking devices that are within the spatial pod of the wearable computing device and that are configured to communicate beyond the spatial pod of the wearable computing device. For instance, the nearby device sensing module 102* of the wearable computing device 10* of FIG. 4A or 4B detecting the presence of one or more electronic devices near the wearable computing device 10* that are within the spatial pod 50 of the wearable computing device 10* by detecting (e.g., sensing) presence of one or more external linking devices 20* that are within the spatial pod 50 of the wearable computing device 10* and that are configured to communicate beyond the spatial pod 50 of the wearable computing device 10* via, for example, a Wi-Fi link, a cellular network link, an Ethernet connection, an optical link, cable, coaxial, and so forth.

In some cases, operation 714 may further include an operation 715 for detecting the presence of one or more external linking devices that are within the spatial pod of the wearable computing device by detecting presence within the spatial pod of the wearable computing device at least a mobile communication device, an access point, a repeater, a base station, a desktop computer, a workstation, and/or a laptop computer.

For instance, the nearby device sensing module 102\* of the wearable computing device 10\* of FIG. 4A or 4B detecting the presence of one or more external linking devices 20\* that are within the spatial pod 50 of the wearable computing device 10\* by detecting presence within the spatial pod 50 of the wearable computing device 10\* at least a mobile communication device (e.g., a cellular telephone, a Smartphone, or a tablet computer), an access point, a repeater, a base station, a desktop computer, a workstation, and/or a laptop computer.

In the same or alternative implementations, the nearby device detecting operation 602 may additionally or alternatively include or involve an operation 716 for detecting the presence of one or more electronic devices near the wearable computing device that are within the spatial pod of the wearable computing device by detecting within the spatial pod of the wearable computing device presence of one or more other wearable computing devices. For instance, the nearby device sensing module 102\* of the wearable computing device 10\* of FIG. 4A or 4B detecting the presence of one or more electronic devices near the wearable computing device 10\* that are within the spatial pod 50 of the wearable computing device 10\* by detecting (e.g., sensing) within the spatial pod 50 of the wearable computing device 10\* presence of one or more other wearable computing devices (e.g., a computing glasses 12, a computing watch 14, or a computing bracelet 16).

In the same or alternative implementations, the nearby device detecting operation 602 may additionally or alternatively include or involve an operation 717 for detecting the presence of the one or more electronic devices near the wearable computing device by detecting the presence of the one or more electronic devices near a wearable computing device having the form of glasses or goggles designed to be worn on a head of a user. For instance, the nearby device sensing module 102\* of the wearable computing device 10\* of FIG. 4A or 4B detecting the presence of the one or more electronic devices near the wearable computing device 10\* by detecting (e.g., sensing) the presence of the one or more electronic devices (e.g., one or more external linking devices 20\* and/or one or more other wearable computing devices 11\*) near a wearable computing device 10\* having the form of glasses or goggles designed (e.g., having a pair of temple pieces 208\* that are design to extend to and wrap around the ears of the user) to be worn on a head of a user.

In some alternative implementations, the nearby device detecting operation 602 may alternatively include or involve an operation 718 for detecting the presence of the one or more electronic devices near the wearable computing device by detecting the presence of the one or more electronic devices near a wearable computing device having the form of a wristwatch, a bracelet, or an armband designed to be worn around a limb of a user. For instance, the nearby device sensing module 102\* of the wearable computing device 10\* of FIG. 4A or 4B detecting the presence of the one or more electronic devices near the wearable computing device 10\* by detecting (e.g., sensing) the presence of the one or more electronic devices near a wearable computing device 10\* having the form of a wristwatch, a bracelet, or an armband designed to be worn around a limb (e.g., arm) of a user.

In some implementations, the nearby device detecting operation 602 may include or involve an operation 719 for detecting the presence of the one or more electronic devices within the spatial pod of the wearable computing device, the spatial pod of the wearable computing device being a spatial volume that includes the wearable computing device and being defined by an enveloping boundary, where less than 0.7 milliwatt wireless signals generated by the wearable computing device being discernible over background noise within the enveloping boundary and not discernible over background noise outside the enveloping boundary. For instance, the nearby device sensing module 102\* of the wearable computing device 10\* of FIG. 4A or 4B detecting (e.g., sensing) the presence of the one or more electronic devices within the spatial pod 50 of the wearable computing device 10\*, the spatial pod 50 of the wearable computing device 10\* being a spatial volume that includes the wearable computing device 10\* and being defined by an enveloping boundary 52, where less than 0.7 milliwatt wireless signals (e.g., low-power wireless signals from the 2.4 GHz frequency band, the 5 GHz frequency band, or the 60 GHz frequency band) generated by the wearable computing device 10\* being discernible over background noise (e.g., electromagnetic background noise) within the enveloping boundary 52 and not discernible over background noise outside the enveloping boundary 52.

Figure 7E:
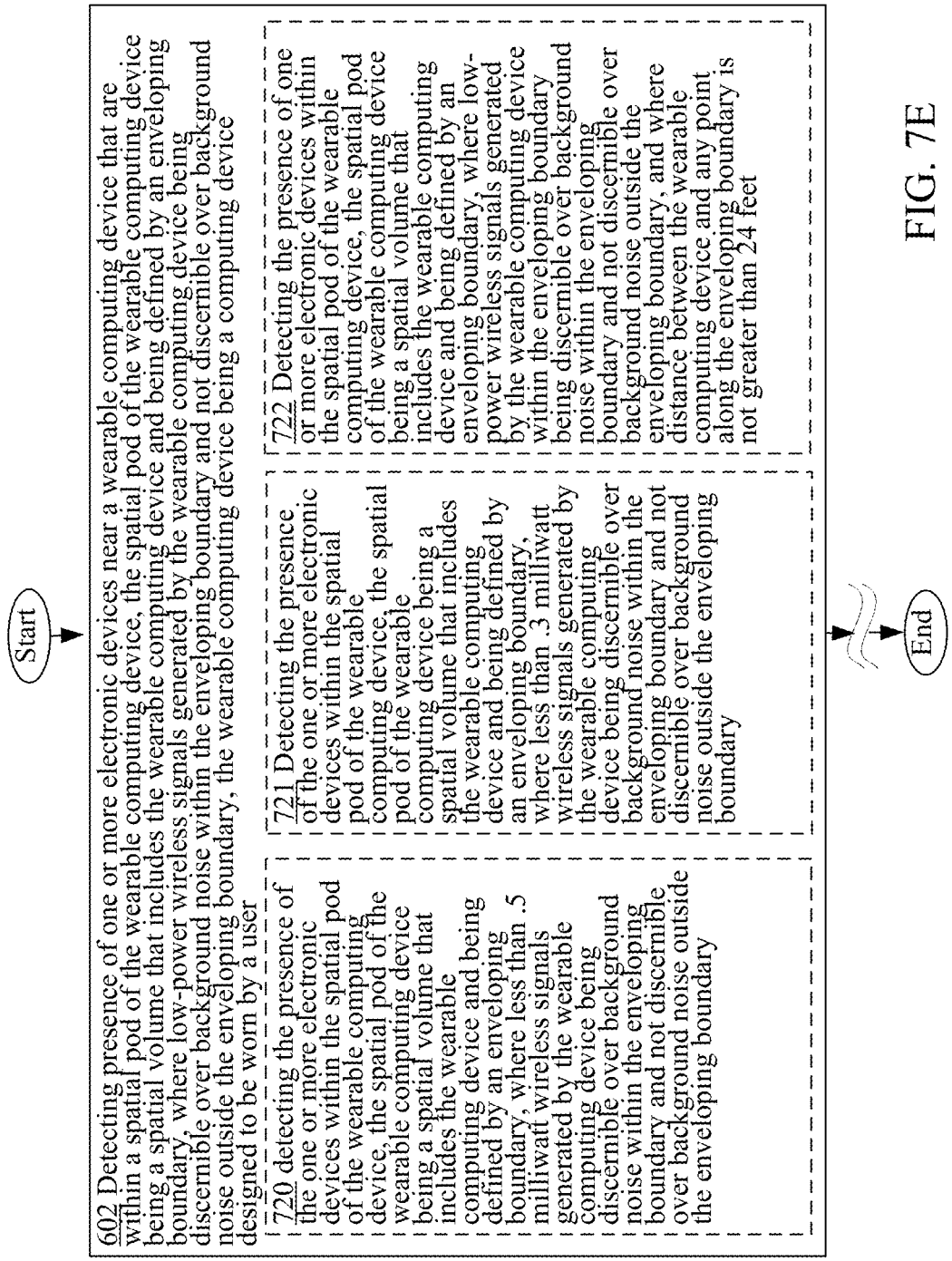
FIG. 7E is a high-level logic flowchart of a process depicting alternate implementations of the nearby device detecting operation 602 of FIG. 6.

In some implementations, the nearby device detecting operation 602 may include or involve an operation 720 for detecting the presence of the one or more electronic devices within the spatial pod of the wearable computing device, the spatial pod of the wearable computing device being a spatial volume that includes the wearable computing device and being defined by an enveloping boundary, where less than 0.5 milliwatt wireless signals generated by the wearable computing device being discernible over background noise within the enveloping boundary and not discernible over background noise outside the enveloping boundary as illustrated in FIG. 7E. For instance, the nearby device sensing module 102\* of the wearable computing device 10\* of FIG. 4A or 4B detecting (e.g., sensing) the presence of the one or more electronic devices within the spatial pod 50 of the wearable computing device 10\*, the spatial pod 50 of the wearable computing device 10\* being a spatial volume that includes the wearable computing device 10\* and being defined by an enveloping boundary 52, where less than 0.5 milliwatt wireless signals (e.g., low-power wireless signals from the 2.4 GHz frequency band, the 5 GHz frequency band, or the 60 GHz frequency band) generated by the wearable computing device 10\* being discernible over background noise (e.g., electromagnetic background noise) within the enveloping boundary 52 and not discernible over background noise outside the enveloping boundary 52.

In some implementations, the nearby device detecting operation 602 may include or involve an operation 721 for detecting the presence of the one or more electronic devices within the spatial pod of the wearable computing device, the spatial pod of the wearable computing device being a spatial volume that includes the wearable computing device and being defined by an enveloping boundary, where less than 0.3 milliwatt wireless signals generated by the wearable computing device being discernible over background noise within the enveloping boundary and not discernible over background noise outside the enveloping boundary. For instance, the nearby device sensing module 102\* of the wearable computing device 10\* of FIG. 4A or 4B detecting (e.g., sensing) the presence of the one or more electronic devices within the spatial pod 50 of the wearable computing device 10\*, the spatial pod 50 of the wearable computing device 10\* being a spatial volume that includes the wearable computing device 10\* and being defined by an enveloping boundary 52, where less than 0.3 milliwatt wireless signals (e.g., low-power wireless signals from the 2.4 GHz frequency band, the 5 GHz frequency band, or the 60 GHz frequency band) generated by the wearable computing device 10\* being discernible over background noise within the enveloping boundary 52 and not discernible over background noise outside the enveloping boundary 52.

In some implementations, the nearby device detecting operation 602 may include or involve an operation 722 for detecting the presence of one or more electronic devices within the spatial pod of the wearable computing device, the spatial pod of the wearable computing device being a spatial volume that includes the wearable computing device and being defined by an enveloping boundary, where low-power wireless signals generated by the wearable computing device within the enveloping boundary being discernible over background noise within the enveloping boundary and not discernible over background noise outside the enveloping boundary, and where distance between the wearable computing device and any point along the enveloping boundary is not greater than 24 feet. For instance, the nearby device sensing module 102* of the wearable computing device 10* of FIG. 4A or 4B detecting (e.g., sensing) the presence of one or more electronic devices within the spatial pod 50 of the wearable computing device 10*, the spatial pod 50 of the wearable computing device 10* being a spatial volume that includes the wearable computing device 10* and being defined by an enveloping boundary 52, where low-power wireless signals generated by the wearable computing device 10* within the enveloping boundary 52 being discernible over background noise within the enveloping boundary 52 and not discernible over background noise outside the enveloping boundary 52, and where distance between the wearable computing device 10* and any point along the enveloping boundary 52 is not greater than 24 feet.

Figure 7F:
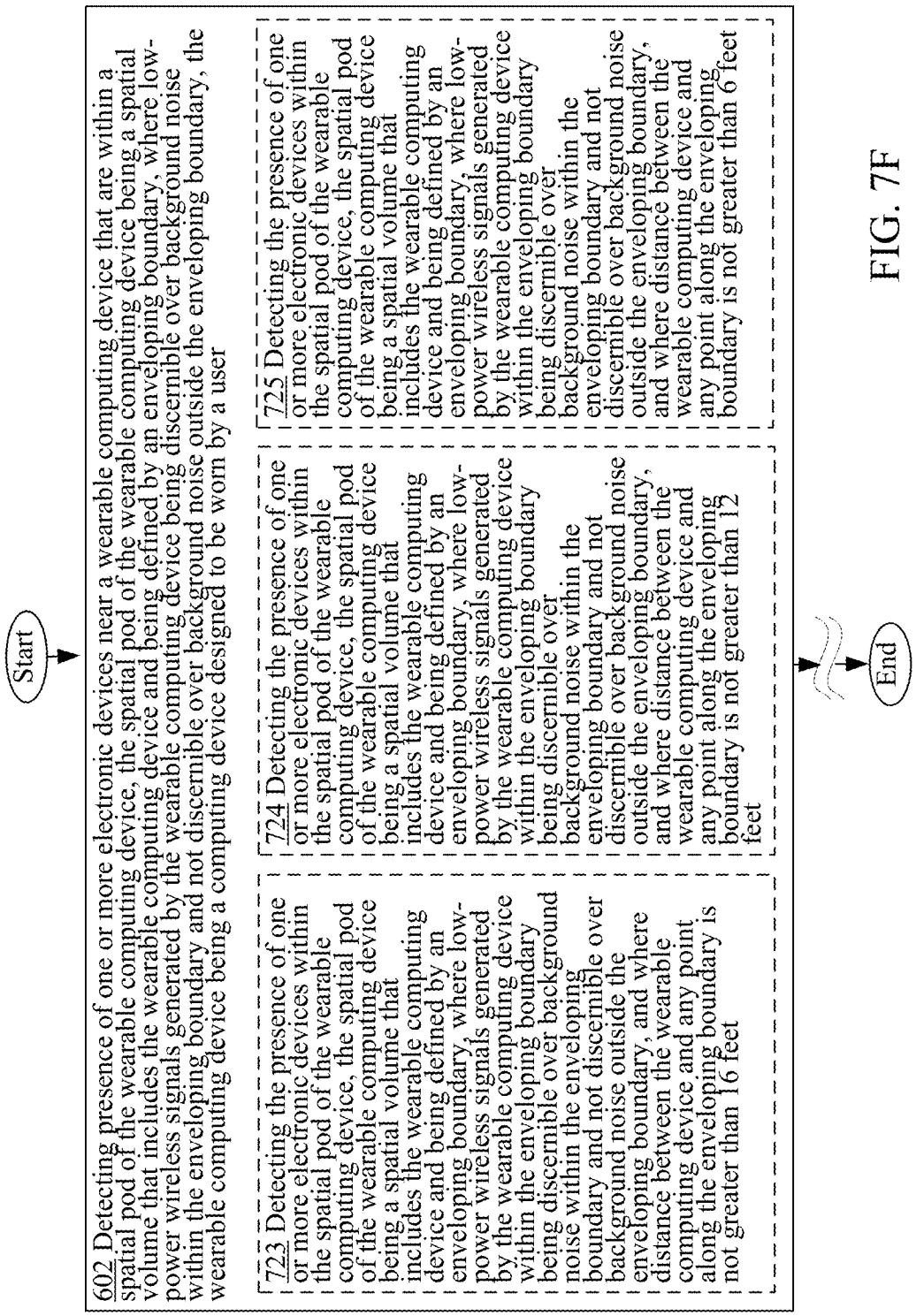
FIG. 7F is a high-level logic flowchart of a process depicting alternate implementations of the nearby device detecting operation 602 of FIG. 6.

Turning now to FIG. 7F, in some implementations, the nearby device detecting operation 602 may include or involve an operation 723 for detecting the presence of one or more electronic devices within the spatial pod of the wearable computing device, the spatial pod of the wearable computing device being a spatial volume that includes the wearable computing device and being defined by an enveloping boundary, where low-power wireless signals generated by the wearable computing device within the enveloping boundary being discernible over background noise within the enveloping boundary and not discernible over background noise outside the enveloping boundary, and where distance between the wearable computing device and any point along the enveloping boundary is not greater than 16 feet. For instance, the nearby device sensing module 102* of the wearable computing device 10* of FIG. 4A or 4B detecting (e.g., sensing) the presence of one or more electronic devices within the spatial pod 50 of the wearable computing device 10*, the spatial pod 50 of the wearable computing device 10* being a spatial volume that includes the wearable computing device 10* and being defined by an enveloping boundary 52, where low-power wireless signals (e.g., less than 0.5 milliwatt wireless signals) generated by the wearable computing device 10* within the enveloping boundary 52 being discernible over background noise (e.g., background electromagnetic radiation) within the enveloping boundary 52 and not discernible over background noise outside the enveloping boundary 52, and where distance between the wearable computing device 10* and any point along the enveloping boundary 52 is not greater than 16 feet.

In some implementations, the nearby device detecting operation 602 may include or involve an operation 724 for detecting the presence of one or more electronic devices within the spatial pod of the wearable computing device, the spatial pod of the wearable computing device being a spatial volume that includes the wearable computing device and being defined by an enveloping boundary, where low-power wireless signals generated by the wearable computing device within the enveloping boundary being discernible over background noise within the enveloping boundary and not discernible over background noise outside the enveloping boundary, and where distance between the wearable computing device and any point along the enveloping boundary is not greater than 12 feet. For instance, the nearby device sensing module 102* of the wearable computing device 10* of FIG. 4A or 4B detecting (e.g., sensing) the presence of one or more electronic devices within the spatial pod 50 of the wearable computing device 10*, the spatial pod 50 of the wearable computing device 10* being a spatial volume that includes the wearable computing device 10* and being defined by an enveloping boundary 52, where low-power wireless signals (e.g., less than 0.3 milliwatt wireless signals) generated by the wearable computing device 10* within the enveloping boundary 52 being discernible over background noise (e.g., background electromagnetic radiation) within the enveloping boundary 52 and not discernible over background noise outside the enveloping boundary 52, and where distance between the wearable computing device 10* and any point along the enveloping boundary 52 is not greater than 12 feet.

In some implementations, the nearby device detecting operation 602 may include or involve an operation 725 for detecting the presence of one or more electronic devices within the spatial pod of the wearable computing device, the spatial pod of the wearable computing device being a spatial volume that includes the wearable computing device and being defined by an enveloping boundary, where low-power wireless signals generated by the wearable computing device within the enveloping boundary being discernible over background noise within the enveloping boundary and not discernible over background noise outside the enveloping boundary, and where distance between the wearable computing device and any point along the enveloping boundary is not greater than 6 feet. For instance, the nearby device sensing module 102* of the wearable computing device 10* of FIG. 4A or 4B detecting (e.g., sensing) the presence of one or more electronic devices within the spatial pod 50 of the wearable computing device 10*, the spatial pod 50 of the wearable computing device 10* being a spatial volume that includes the wearable computing device 10* and being defined by an enveloping boundary 52, where low-power wireless signals (e.g., low-power signals from the 2.4 GHz frequency band, 5 GHz frequency band, or 60 GHz frequency band) generated by the wearable computing device 10* within the enveloping boundary 52 being discernible over background noise within the enveloping boundary 52 and not discernible over background noise outside the enveloping boundary 52, and where distance between the wearable computing device 10* and any point along the enveloping boundary 52 is not greater than 6 feet.

Referring back to the functionally designed device determining operation 604 of FIG. 6, the functionally designed device determining operation 604 similar to the nearby device detecting operation 602 of FIG. 6 may be executed in a number of different ways in various alternative embodiments as illustrated in FIGS. 8A, 8B, 8C, 8D, and 8E. In some implementations, for example, the functionally designed device determining operation 604 may include an operation 826 for determining which of the one or more electronic devices that are detected as being within the spatial pod of the wearable computing device are designed to provide the one or more specific functionalities by querying each of the one or more electronic devices to determine which of the one or more electronic devices provide the one or more specific functionalities. For instance, the functionally designed device ascertaining module 104* including the functionality querying module 506 (see FIG. 5B) of the wearable computing device 10* of FIG. 4A or 4B determining which of the one or more electronic devices that are detected as being within the spatial pod 50 of the wearable computing device 10* are designed to provide the one or more specific functionalities when the functionality querying module 506 queries (e.g., transmitting queries to) each of the one or more electronic devices (e.g., one or more external linking devices 20* and/or one or more other wearable computing devices 11*) to determine which of the one or more electronic devices provide the one or more specific functionalities (e.g., sensing capabilities such as GPS capabilities, communication capabilities to beyond/outside of the spatial pod 50 of the wearable computing device 10*, application functionalities, and so forth).

Figure 8A:
FIG. 8A is a high-level logic flowchart of a process depicting alternate implementations of the functionally designed device determining operation 604 of FIG. 6.
Figure 8B:
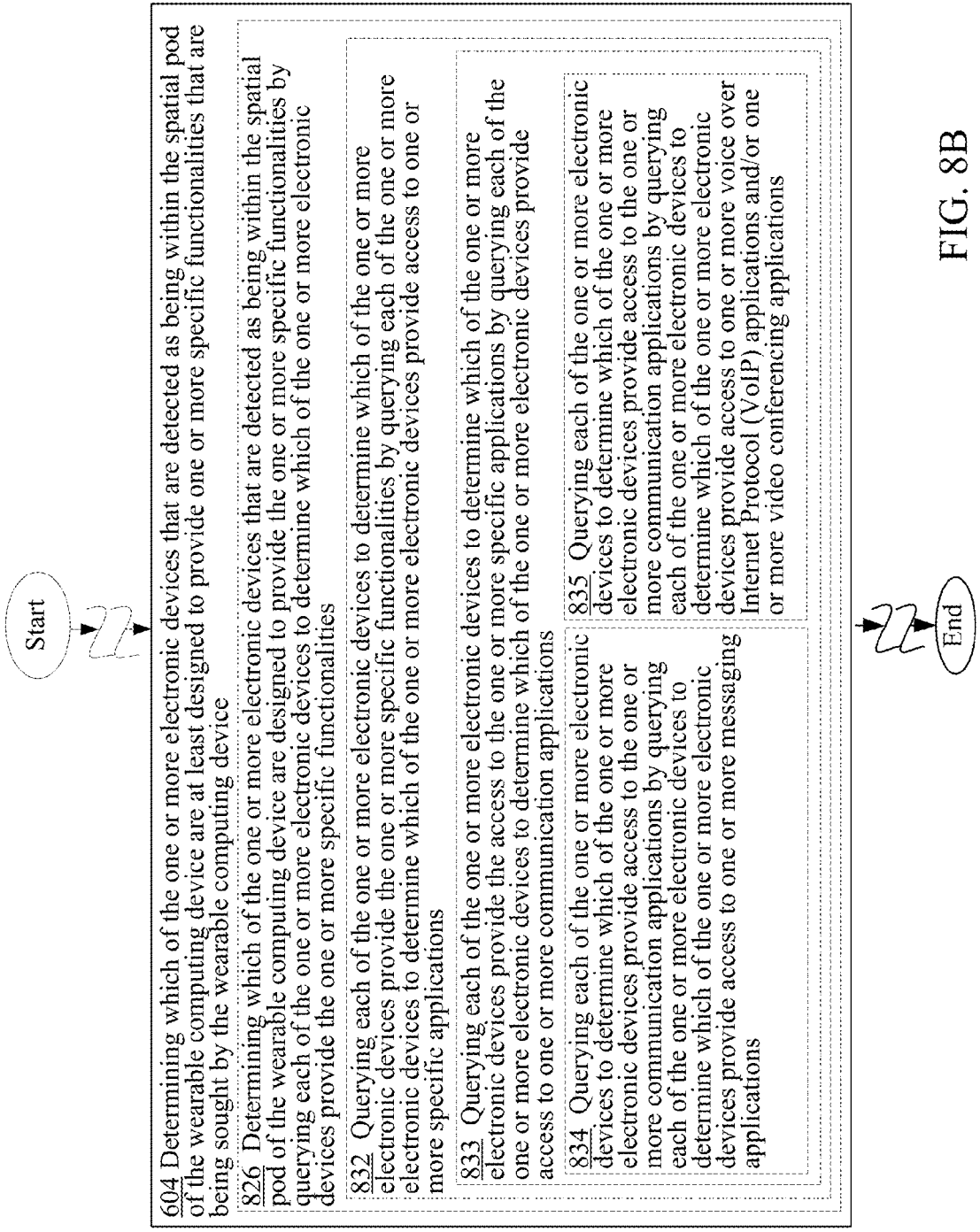
FIG. 8B is a high-level logic flowchart of a process depicting alternate implementations of the functionally designed device determining operation 604 of FIG. 6.
Figure 8C:
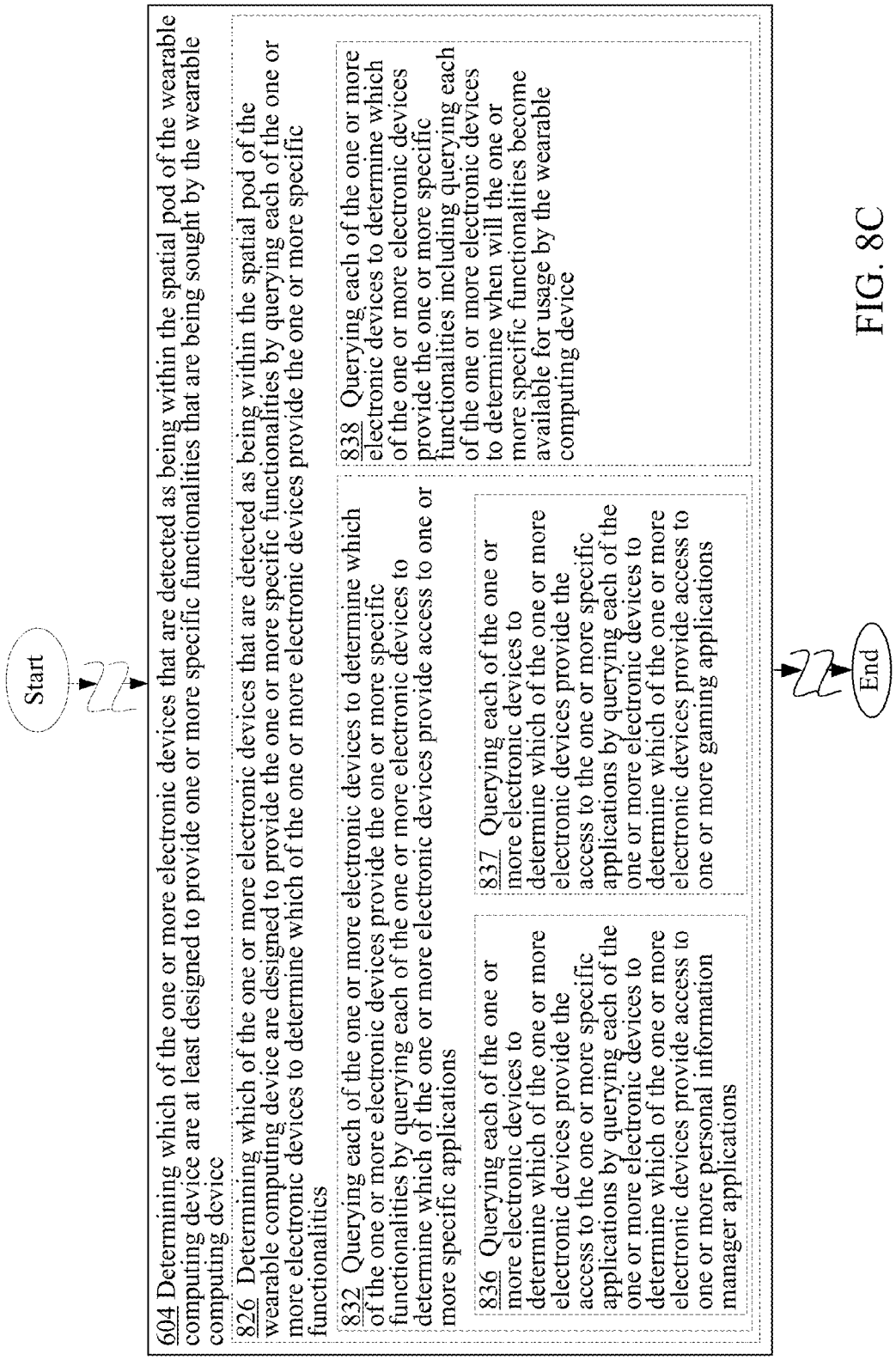
FIG. 8C is a high-level logic flowchart of a process depicting alternate implementations of the functionally designed device determining operation 604 of FIG. 6.

As further illustrated in FIGS. 8A, 8B, and 8C, operation 826 may be implemented in a variety of different ways in various alternative implementations. For example, in some implementations, operation 826 may include or involve an operation 827 for querying each of the one or more electronic devices to determine which of the one or more electronic devices provide the one or more specific functionalities by querying each of the one or more electronic devices to determine which of the one or more electronic devices provide one or more communication functionalities to communicate beyond the spatial pod. For instance, the functionality querying module 506 of the wearable computing device 10* of FIG. 4A or 4B querying each of the one or more electronic devices to determine which of the one or more electronic devices provide the one or more specific functionalities by querying each of the one or more electronic devices to determine which of the one or more electronic devices (e.g., one or more external linking devices 20* and/or one or more other wearable computing devices 11*) provide one or more communication functionalities (e.g., Wi-Fi functionalities, cellular network communication functionalities, Ethernet functionalities, and so forth) to communicate beyond (e.g., to outside of) the spatial pod 50.

In some implementations, operation 827 may further include or involve an operation 828 for querying each of the one or more electronic devices to determine which of the one or more electronic devices provide one or more communication functionalities to communicate beyond the spatial pod by querying each of the one or more electronic devices to determine which of the one or more electronic devices provide one or more communication functionalities to link with one or more Wi-Fi networks, one or more cellular networks, one or more public switched networks, one or more local area networks, one or more wide area networks, one or more metropolitan area networks, and/or one or more satellite networks. For instance, the functionality querying module 506 of the wearable computing device 10* of FIG. 4A or 4B querying each of the one or more electronic devices to determine which of the one or more electronic devices provide one or more communication functionalities to communicate beyond the spatial pod 50 by querying each of the one or more electronic devices to determine which of the one or more electronic devices (e.g., one or more external linking devices 20*) provide one or more communication functionalities to link with one or more Wi-Fi (Wireless Fidelity) networks, one or more cellular networks, one or more public switched networks, one or more local area networks (LANs), one or more wide area networks (WANs), one or more metropolitan area networks (MANs), and/or one or more satellite networks.

In some alternative implementations, operation 827 may alternatively include or involve an operation 829 for querying each of the one or more electronic devices to determine which of the one or more electronic devices provide one or more communication functionalities to communicate beyond the spatial pod by querying each of the one or more electronic devices to determine which of the one or more electronic devices provide at least one of an Ethernet link, a wireless link, a fiber optical link, a satellite link, and/or a free space optical link to communicate beyond the spatial pod. For instance, the functionality querying module 506 of the wearable computing device 10* of FIG. 4A or 4B querying each of the one or more electronic devices to determine which of the one or more electronic devices provide one or more communication functionalities to communicate beyond the spatial pod 50 by querying each of the one or more electronic devices to determine which of the one or more electronic devices (e.g., one or more external linking devices 20*) provide at least one of an Ethernet link, a wireless link, a fiber optical link, a satellite link, and/or a free space optical link to communicate beyond the spatial pod 50.

In various implementations, operation 826 may include or involve an operation 830 for querying each of the one or more electronic devices to determine which of the one or more electronic devices provide the one or more specific functionalities by querying each of the one or more electronic devices to determine which of the one or more electronic devices provide one or more global positioning system (GPS) functionalities. For instance, the functionality querying module 506 of the wearable computing device 10* of FIG. 4A or 4B querying each of the one or more electronic devices to determine which of the one or more electronic devices provide the one or more specific functionalities by querying each of the one or more electronic devices to determine which of the one or more electronic devices provide one or more global positioning system (GPS) functionalities. Note that for purposes of this description, references to a global positioning system or GPS may be in reference to satellite-based navigation system as well as to other types of navigation systems such as those that use signals from cellular towers and applying triangulation techniques in order to ascertain their locations.

In the same or alternative implementations, operation 826 may additionally or alternatively include an operation 831 for querying each of the one or more electronic devices to determine which of the one or more electronic devices provide the one or more specific functionalities by querying each of the one or more electronic devices to determine which of the one or more electronic devices provide one or more sensor functionalities. For instance, the functionality querying module 506 of the wearable computing device 10* of FIG. 4A or 4B querying each of the one or more electronic devices to determine which of the one or more electronic devices provide the one or more specific functionalities by querying each of the one or more electronic devices to determine which of the one or more electronic devices provide one or more sensor functionalities (e.g., optical functionalities, audio functionalities, accelerometers, and so forth).

Turning now to FIG. 8B, in some implementations, operation 826 may include an operation 832 for querying each of the one or more electronic devices to determine which of the one or more electronic devices provide the one or more specific functionalities by querying each of the one or more electronic devices to determine which of the one or more electronic devices provide access to one or more specific applications. For instance, the functionality querying module 506 of the wearable computing device 10* of FIG. 4A or 4B querying each of the one or more electronic devices to determine which of the one or more electronic devices provide the one or more specific functionalities by querying each of the one or more electronic devices (e.g., one or more external linking devices 20\* and/or one or more other wearable computing devices 11\*) to determine which of the one or more electronic devices provide access to one or more specific applications (e.g., one or more specific applications that are compatible with one or more applications being executed by the wearable computing device 10\* or one or more specific applications not possessed by the wearable computing device 10\* or one or more specific applications that facilitates the one or more specific functionalities being sought by the wearable computing device 10\*).

As further illustrated in FIG. 8B, in some implementations, operation 832 may further include or involve an operation 833 for querying each of the one or more electronic devices to determine which of the one or more electronic devices provide the access to the one or more specific applications by querying each of the one or more electronic devices to determine which of the one or more electronic devices provide access to one or more communication applications. For instance, the functionality querying module 506 of the wearable computing device 10\* of FIG. 4A or 4B querying each of the one or more electronic devices to determine which of the one or more electronic devices provide the access to the one or more specific applications by querying each of the one or more electronic devices (e.g., one or more external linking devices 20\* and/or one or more other wearable computing devices 11\*) to determine which of the one or more electronic devices provides access to one or more communication applications.

In some cases, operation 833 may, in turn, further include or involve an operation 834 for querying each of the one or more electronic devices to determine which of the one or more electronic devices provide access to the one or more communication applications by querying each of the one or more electronic devices to determine which of the one or more electronic devices provide access to one or more messaging applications. For instance, the functionality querying module 506 of the wearable computing device 10\* of FIG. 4A or 4B querying each of the one or more electronic devices to determine which of the one or more electronic devices provide access to the one or more communication applications by querying each of the one or more electronic devices (e.g., one or more external linking devices 20\* and/or one or more other wearable computing devices 11\*) to determine which of the one or more electronic devices provide access to one or more messaging applications (e.g., email applications, instant messaging applications, text messaging applications, and so forth).

In the same or alternative implementations, operation 833 may additionally or alternative include an operation 835 for querying each of the one or more electronic devices to determine which of the one or more electronic devices provide access to the one or more communication applications by querying each of the one or more electronic devices to determine which of the one or more electronic devices provide access to one or more voice over Internet Protocol (VoIP) applications and/or one or more video conferencing applications. For instance, the functionality querying module 506 of the wearable computing device 10\* of FIG. 4A or 4B querying each of the one or more electronic devices to determine which of the one or more electronic devices provide access to the one or more communication applications by querying each of the one or more electronic devices (e.g., one or more external linking devices 20\* and/or one or more other wearable computing devices 11\*) to determine which of the one or more electronic devices provide access to one or more voice over Internet Protocol (VoIP) applications and/or one or more video conferencing applications.

In some implementations operation 832 may include an operation 836 for querying each of the one or more electronic devices to determine which of the one or more electronic devices provide the access to the one or more specific applications by querying each of the one or more electronic devices to determine which of the one or more electronic devices provide access to one or more personal information manager applications as illustrated in FIG. 8C. For instance, the functionality querying module 506 of the wearable computing device 10\* of FIG. 4A or 4B querying each of the one or more electronic devices to determine which of the one or more electronic devices provide the access to the one or more specific applications by querying each of the one or more electronic devices to determine which of the one or more electronic devices provide access to one or more personal information manager applications (e.g., Microsoft Outlook).

In the same or alternative implementations, operation 832 may include an operation 837 for querying each of the one or more electronic devices to determine which of the one or more electronic devices provide the access to the one or more specific applications by querying each of the one or more electronic devices to determine which of the one or more electronic devices provide access to one or more gaming applications. For instance, the functionality querying module 506 of the wearable computing device 10\* of FIG. 4A or 4B querying each of the one or more electronic devices to determine which of the one or more electronic devices provide the access to the one or more specific applications by querying each of the one or more electronic devices to determine which of the one or more electronic devices provide access to one or more gaming applications.

As further illustrated in FIG. 8C, operation 826 in some implementations, may include an operation 838 for querying each of the one or more electronic devices to determine which of the one or more electronic devices provide the one or more specific functionalities including querying each of the one or more electronic devices to determine when will the one or more specific functionalities become available for usage by the wearable computing device. For instance, the functionality querying module 506 of the wearable computing device 10\* of FIG. 4A or 4B querying each of the one or more electronic devices to determine which of the one or more electronic devices provide the one or more specific functionalities including querying each of the one or more electronic devices to determine when will the one or more specific functionalities become available for usage by the wearable computing device 10\*. Such determinations may be particularly useful when, for example, multiple nearby electronic devices provides the same functionalities and a determination is to be made as which of the multiple nearby electronic devices should be used for obtaining the one or more specific functionalities. That is, in many instances, it may be desirable to obtain, by the wearable computing device 10\*, the one or more specific functionalities as soon as possible. Thus, it may be desirable to determine which nearby electronic devices provide the earliest access/availability to the one or more specific functionalities.

Figure 8D:
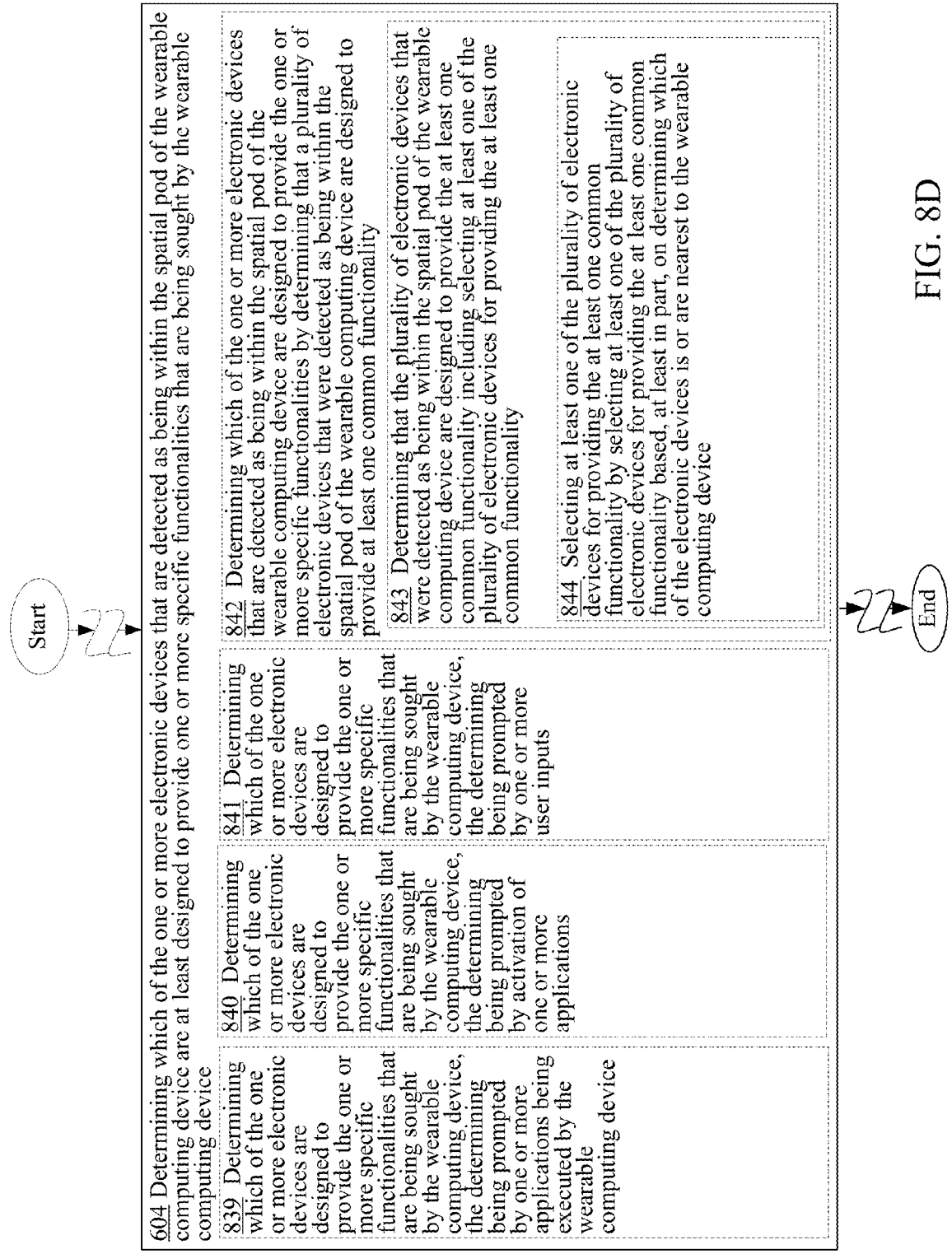
FIG. 8D is a high-level logic flowchart of a process depicting alternate implementations of the functionally designed device determining operation 604 of FIG. 6.

Turning now to FIG. 8D, in various implementations, the functionally designed device determining operation 604 of FIG. 6 may actually include an operation 839 for determining which of the one or more electronic devices are designed to provide the one or more specific functionalities that are being sought by the wearable computing device, the determining being prompted by one or more applications being executed by the wearable computing device. For instance, the functionally designed device ascertaining module 104\* of the wearable computing device 10\* of FIG. 4A or 4B determining or ascertaining which of the one or more electronic devices that are detected as being within the spatial pod 50 of the wearable computing device 10\* are designed to provide the one or more specific functionalities (e.g., GPS functionalities) that are being sought by the wearable computing device 10\*, the determining or ascertaining being prompted by one or more applications (e.g., one or more applications that rely on GPS provided data) being executed by the wearable computing device 10\*.

In some implementations, the functionally designed device determining operation 604 may include an operation 840 for determining which of the one or more electronic devices are designed to provide the one or more specific functionalities that are being sought by the wearable computing device, the determining being prompted by activation of one or more applications. For instance, the functionally designed device ascertaining module 104\* of the wearable computing device 10\* of FIG. 4A or 4B determining or ascertaining which of the one or more electronic devices that are detected as being within the spatial pod 50 of the wearable computing device 10\* are designed to provide the one or more specific functionalities (e.g., optical camera designed to capture visual images of hand gestures) that are being sought by the wearable computing device 10\*, the determining being prompted by activation of one or more applications (e.g., an application that can be controlled/manipulated based on data indicating hand gestures).

In some implementations, the functionally designed device determining operation 604 may include an operation 841 for determining which of the one or more electronic devices are designed to provide the one or more specific functionalities that are being sought by the wearable computing device, the determining being prompted by one or more user inputs. For instance, the functionally designed device ascertaining module 104\* of the wearable computing device 10\* of FIG. 4A or 4B determining or ascertaining which of the one or more electronic devices that are detected as being within the spatial pod 50 of the wearable computing device 10\* are designed to provide the one or more specific functionalities (e.g., access to the Internet) that are being sought by the wearable computing device 10\*, the determining being prompted by one or more user inputs (e.g., user clicking the "send" icon for sending an email or text message).

In some cases, the functionally designed device determining operation 604 may include an operation 842 for determining which of the one or more electronic devices that are detected as being within the spatial pod of the wearable computing device are designed to provide the one or more specific functionalities by determining that a plurality of electronic devices that were detected as being within the spatial pod of the wearable computing device are designed to provide at least one common functionality. For instance, the functionally designed device ascertaining module 104\* of the wearable computing device 10\* of FIG. 4A or 4B determining which of the one or more electronic devices that are detected as being within the spatial pod 50 of the wearable computing device 10\* are designed to provide the one or more specific functionalities by determining or ascertaining that a plurality of electronic devices that were detected as being within the spatial pod 50 of the wearable computing device 10\* are designed to provide at least one common or same functionality (e.g., Wi-Fi capabilities).

In some implementations, operation 842 may further include an operation 843 for determining that the plurality of electronic devices that were detected as being within the spatial pod of the wearable computing device are designed to provide the at least one common functionality including selecting at least one of the plurality of electronic devices for providing the at least one common functionality. For instance, the functionally designed device ascertaining module 104\* including the device designating module 508 (see FIG. 5B) of the wearable computing device 10\* of FIG. 4A or 4B determining that the plurality of electronic devices that were detected as being within the spatial pod 50 of the wearable computing device 10\* are designed to provide the at least one common functionality including selecting (e.g., designating), by the device designating module 508, at least one of the plurality of electronic devices for providing the at least one common functionality (e.g., communication capabilities beyond the spatial pod 50 of the wearable computing device 10\*, audio and/or visual sensor functionalities, GPS functionalities, and so forth). The selection or designation of the at last one election device from the plurality of electronic devices for providing the at least one common functionality may be based on one or more factors.

For example, in some cases, operation 843 may include or involve an operation 844 for selecting at least one of the plurality of electronic devices for providing the at least one common functionality by selecting at least one of the plurality of electronic devices for providing the at least one common functionality based, at least in part, on determining which of the electronic devices is or are nearest to the wearable computing device. For instance, the device designating module 508 including the nearest device ascertaining module 510 (see FIG. 5B) of the wearable computing device 10\* of FIG. 4A or 4B selecting at least one of the plurality of electronic devices for providing the at least one common functionality when the device designating module 508 selects or designates at least one of the plurality of electronic devices for providing the at least one common functionality based, at least in part, on the nearest device ascertaining module 510 determining (e.g., ascertaining) which of the electronic devices is or are nearest to the wearable computing device 10\*. The determination of which of the electronic devices is or are nearest to the wearable computing device 10\* may be implemented in a number of different ways in various alternative implementations.

For example, in some implementations (see operation 710), the wearable computing device 10\* may transmit, for example, incrementally increasing or decreasing levels of low-power wireless signals (e.g., via directional or omnidirectional antenna) designed to solicit responsive signals from one or more electronic devices that detects reception of the low-power signals, and monitoring by the wearable computing device 10\* for the responsive signals from the one or more electronic devices after each transmission of low-power wireless signals at each incremental level of low-power. That is, low-power wireless signals will only be detectable above background noise for a limited range, which can be predetermined. For instance, initially transmitting by the wearable computing device 10\* a low-power 0.1 milliwatt wireless signal (via directional or omnidirectional antenna) for soliciting responding signals from any electronic device that detects the low-power 0.1 milliwatt wireless signal, and then monitoring for the responding signals following the transmission of the low-power 0.1 milliwatt wireless signal. The wearable computing device 10\* may then repeat this operation of transmitting low-power wireless signals and monitoring for responding signals by transmitting increasingly higher levels of low power wireless signals (e.g., 0.2 milliwatt wireless signals, 0.3 milliwatt wireless signals, and so forth) and monitoring for responding signals following each transmission of signals at each level of transmission power.

Figure 8E:
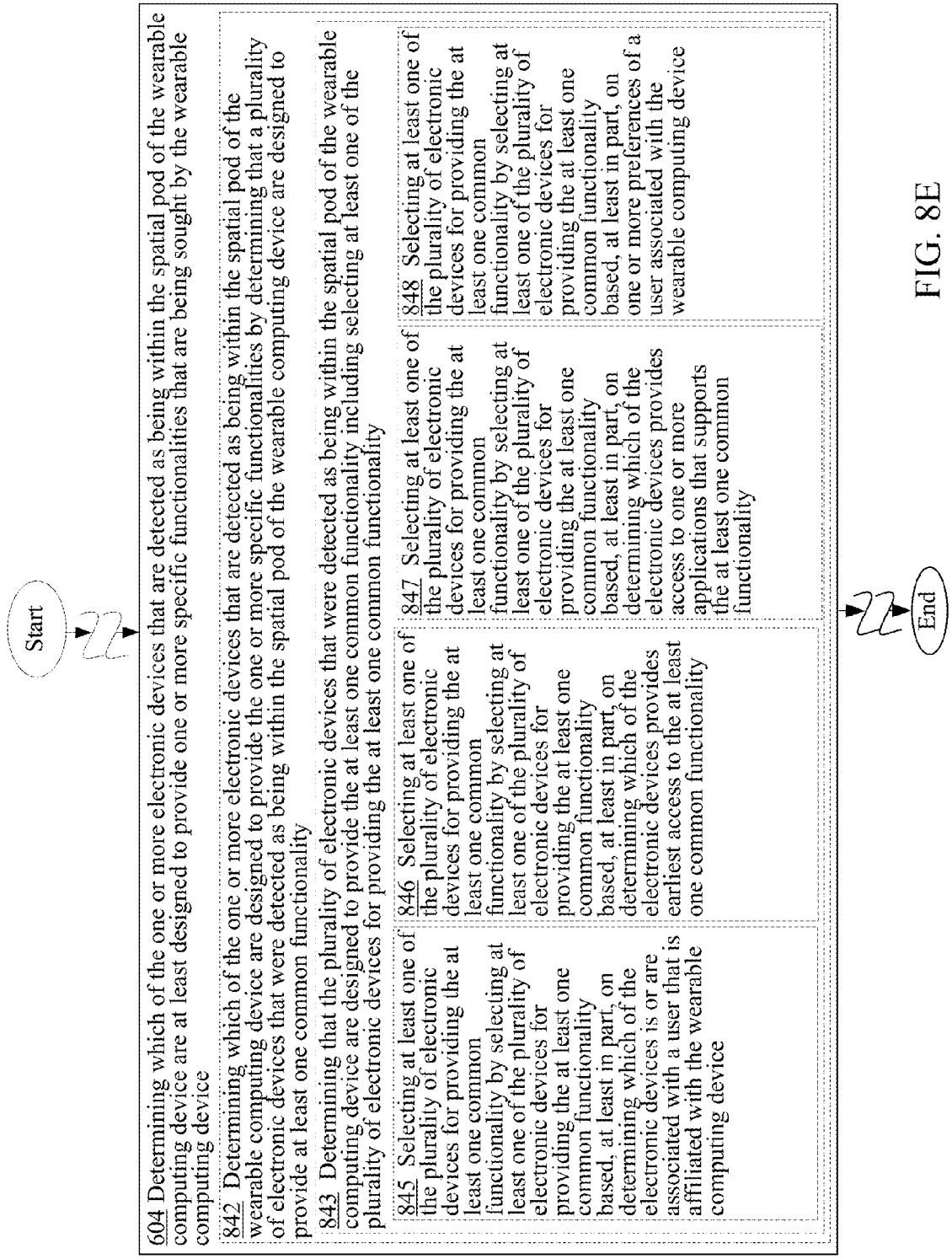
FIG. 8E is a high-level logic flowchart of a process depicting alternate implementations of the functionally designed device determining operation 604 of FIG. 6.

In the same or alternative implementations, operation 843 may include or involve an operation 845 for selecting at least one of the plurality of electronic devices for providing the at least one common functionality by selecting at least one of the plurality of electronic devices for providing the at least one common functionality based, at least in part, on determining which of the electronic devices is or are associated with a user that is affiliated with the wearable computing device as illustrated in FIG. 8E. For instance, the device designating module 508 including the user associated device ascertaining module 512 (see FIG. 5B) of the wearable computing device 10* of FIG. 4A or 4B selecting at least one of the plurality of electronic devices for providing the at least one common functionality when the device designating module 508 selects or designates at least one of the plurality of electronic devices for providing the at least one common functionality based, at least in part, on the user associated device ascertaining module 512 determining or ascertaining which of the electronic devices is or are associated with a user that is affiliated with the wearable computing device 10*. In some cases, a user may be affiliated with the wearable computing device 10* when the user is registered (e.g., log-in access) with the wearable computing device 10* or currently has access or possession of the wearable computing device 10*.

In the same or alternative implementations, operation 843 may include or involve an operation 846 for selecting at least one of the plurality of electronic devices for providing the at least one common functionality by selecting at least one of the plurality of electronic devices for providing the at least one common functionality based, at least in part, on determining which of the electronic devices provides earliest access to the at least one common functionality. For instance, the device designating module 508 including the earliest functionality providing device ascertaining module 514 (see FIG. 5B) of the wearable computing device 10* of FIG. 4A or 4B selecting at least one of the plurality of electronic devices for providing the at least one common functionality when the device designating module 508 selects or designates at least one of the plurality of electronic devices for providing the at least one common functionality based, at least in part, on the earliest functionality providing device ascertaining module 514 determining or ascertaining which of the electronic devices provides earliest access to the at least one common functionality. That is, there are many instances where specific functionalities of electronic devices may not be available at any moment in time because they may currently be used by another user, device, and/or application.

In the same or alternative implementations, operation 843 may include or involve an operation 847 for selecting at least one of the plurality of electronic devices for providing the at least one common functionality by selecting at least one of the plurality of electronic devices for providing the at least one common functionality based, at least in part, on determining which of the electronic devices provides access to one or more applications that supports the at least one common functionality. For instance, the device designating module 508 including the supporting application providing device ascertaining module 516 (see FIG. 5B) of the wearable computing device 10* of FIG. 4A or 4B selecting at least one of the plurality of electronic devices for providing the at least one common functionality when the device designating module 508 selects or designates at least one of the plurality of electronic devices for providing the at least one common functionality based, at least in part, on the supporting application providing device ascertaining module 516 determining which of the electronic devices provides access to one or more applications (e.g., email or instant messaging application, or a particular Internet browser) that supports the at least one common functionality (e.g., access to the Internet).

In the same or different implementations, operation 843 may additionally or alternatively include an operation 848 for selecting at least one of the plurality of electronic devices for providing the at least one common functionality by selecting at least one of the plurality of electronic devices for providing the at least one common functionality based, at least in part, on one or more preferences of a user associated with the wearable computing device. For instance, the device designating module 508 of the wearable computing device 10* of FIG. 4A or 4B selecting at least one of the plurality of electronic devices for providing the at least one common functionality by selecting at least one of the plurality of electronic devices for providing the at least one common functionality based, at least in part, on one or more preferences of a user associated with the wearable computing device 10* (e.g., a user who has log-in access or possession of the wearable computing device 10*). That is, in some cases, a user may prefer that certain electronic devices be used in order to provide certain selective functionalities.

Figure 9A:
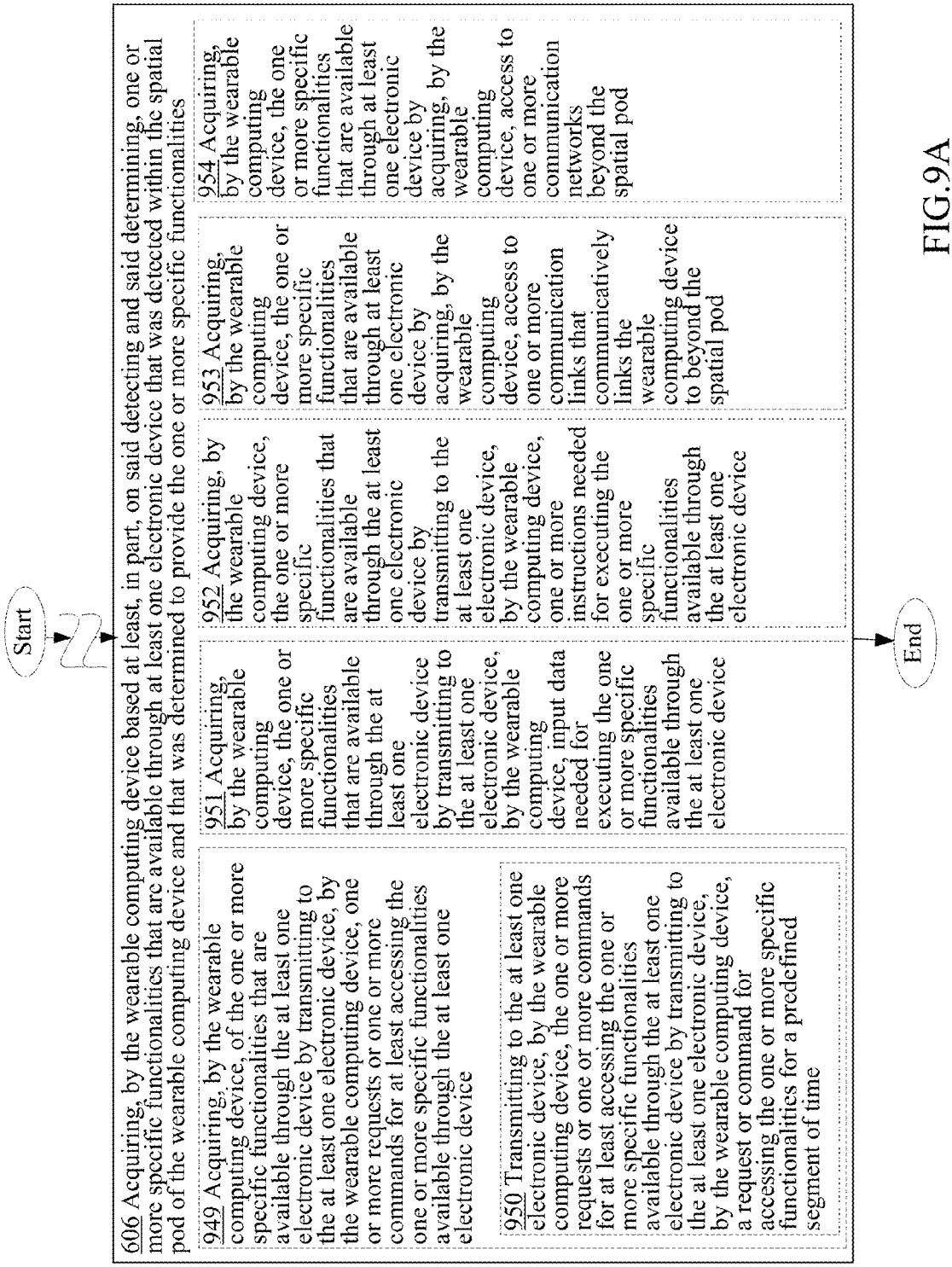
FIG. 9A is a high-level logic flowchart of a process depicting alternate implementations of the functionality acquiring operation 606 of FIG. 6.

Referring back to the functionality acquiring operation 606 of FIG. 6, the functionality acquiring operation 606 similar to the nearby device detecting operation 602 and the functionally designed device determining operation 604 of FIG. 6 may be executed in a number of different ways in various alternative embodiments as illustrated in FIGS. 9A, 9B, 9C, 9D, and 9E. In some implementations, for example, the functionality acquiring operation 606 may include an operation 949 for acquiring, by the wearable computing device, of the one or more specific functionalities that are available through the at least one electronic device by transmitting to the at least one electronic device, by the wearable computing device, one or more requests or one or more commands for at least accessing the one or more specific functionalities available through the at least one electronic device as illustrated in FIG. 9A. For instance, the functionality obtaining module 106* including the request/command relaying module 516 (see FIG. 5C) of the wearable computing device 10* of FIG. 4A or 4B acquiring the one or more specific functionalities that are available through the at least one electronic device by having the request/command relaying module 516 transmit to the at least one electronic device (e.g., an external linking device 20* or another wearable computing device 11*) one or more requests or one or more commands for at least accessing the one or more specific functionalities (e.g., communication functionality beyond the spatial pod 50 of the wearable computing device 10*, GPS functionality, and so forth) available through the at least one electronic device.

In some cases, operation 949 may actually include or involve an operation 950 for transmitting to the at least one electronic device, by the wearable computing device, the one or more requests or one or more commands for at least accessing the one or more specific functionalities available through the at least one electronic device by transmitting to the at least one electronic device, by the wearable computing device, a request or command for accessing the one or more specific functionalities for a predefined segment of time. For instance, the request/command relaying module 516 of the wearable computing device 10* of FIG. 4A or 4B transmitting to the at least one electronic device the one or more requests or one or more commands for at least accessing the one or more specific functionalities available through the at least one electronic device by transmitting to the at least one electronic device a request or command for accessing the one or more specific functionalities for a predefined segment of time.

In the same or alternative implementations, the functionality acquiring operation 606 may include an operation 951 for acquiring, by the wearable computing device, the one or more specific functionalities that are available through the at least one electronic device by transmitting to the at least one electronic device, by the wearable computing device, input data needed for executing the one or more specific functionalities available through the at least one electronic device. For instance, the functionality obtaining module 106* including the input data relaying module 518 (see FIG. 5C) of the wearable computing device 10* of FIG. 4A or 4B acquiring or obtaining the one or more specific functionalities that are available through the at least one electronic device by having the input data relaying module 518 transmit to the at least one electronic device input data (e.g., audio or textual message, user commands, user preferences, and so forth) needed for executing the one or more specific functionalities (e.g., email functionalities including Internet access functionalities, gaming functionalities, and so forth) available through the at least one electronic device.

In the same or alternative implementations, the functionality acquiring operation 606 may include an operation 952 for acquiring, by the wearable computing device, the one or more specific functionalities that are available through the at least one electronic device by transmitting to the at least one electronic device, by the wearable computing device, one or more instructions needed for executing the one or more specific functionalities available through the at least one electronic device. For instance, the functionality obtaining module 106* including the instruction relaying module 520 (see FIG. 5C) of the wearable computing device 10* of FIG. 4A or 4B acquiring or obtaining the one or more specific functionalities that are available through the at least one electronic device by having the instruction relaying module 520 transmit to the at least one electronic device one or more instructions (e.g., gaming instructions, emailing instructions such as "send" instructions, and so forth) needed for executing the one or more specific functionalities available through the at least one electronic device.

In the same or alternative implementations, the functionality acquiring operation 606 may include an operation 953 for acquiring, by the wearable computing device, the one or more specific functionalities that are available through at least one electronic device by acquiring, by the wearable computing device, access to one or more communication links that communicatively links the wearable computing device to beyond the spatial pod. For instance, the functionality obtaining module 106* of the wearable computing device 10* of FIG. 4A or 4B acquiring the one or more specific functionalities that are available through at least one electronic device by acquiring or obtaining access to one or more communication links (e.g., Wi-Fi links, cellular network links, and so forth) that communicatively links the wearable computing device 10* to beyond (e.g., outside) the spatial pod 50.

In the same or alternative implementations, the functionality acquiring operation 606 may include an operation 954 for acquiring, by the wearable computing device, the one or more specific functionalities that are available through at least one electronic device by acquiring, by the wearable computing device, access to one or more communication networks beyond the spatial pod. For instance, the functionality obtaining module 106* of the wearable computing device 10* of FIG. 4A or 4B acquiring the one or more specific functionalities that are available through at least one electronic device by acquiring or obtaining access to one or more communication networks (e.g., WLAN, PAN, WAN, MAN, cellular network, and so forth) beyond the spatial pod 50.

Figure 9B:
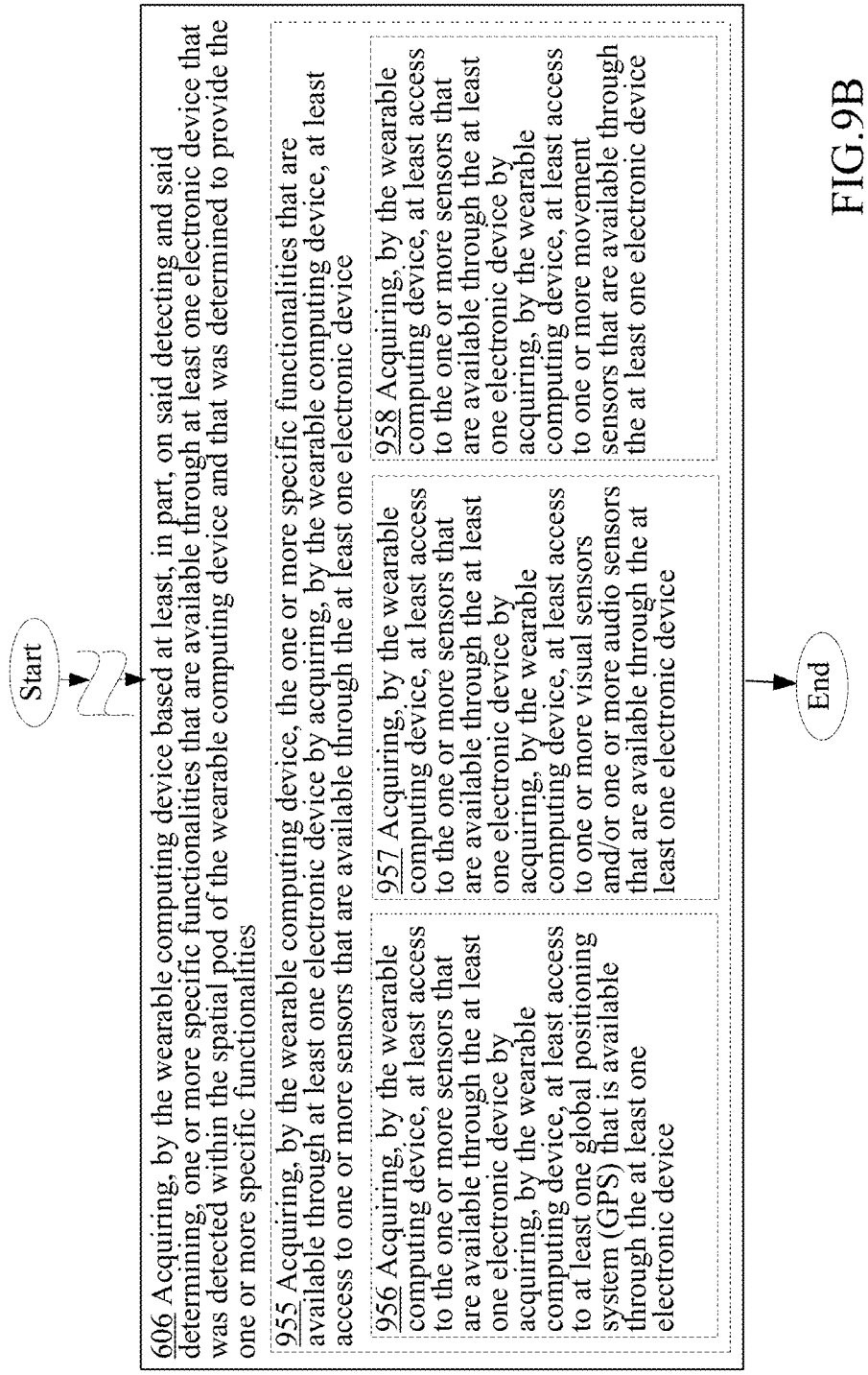
FIG. 9B is a high-level logic flowchart of a process depicting alternate implementations of the functionality acquiring operation 606 of FIG. 6.

In the same or alternative implementations, the functionality acquiring operation 606 may include an operation 955 for acquiring, by the wearable computing device, the one or more specific functionalities that are available through at least one electronic device by acquiring, by the wearable computing device, at least access to one or more sensors that are available through the at least one electronic device as illustrated in FIG. 9B. For instance, the functionality obtaining module 106* of the wearable computing device 10* of FIG. 4A or 4B acquiring the one or more specific functionalities that are available through at least one electronic device by acquiring or obtaining at least access to one or more sensors that are available through the at least one electronic device (e.g., one or more sensors that are integrated into the at least one electronic device such as another wearable computing device 11* or an external linking device 20*). In some embodiments, obtaining access to the one or more sensors may be accomplished by receiving or obtaining data from the one or more sensors.

As further illustrated in FIG. 9B, operation 955 may actually include or involve one or more additional operations including, in some cases, an operation 956 for acquiring, by the wearable computing device, at least access to the one or more sensors that are available through the at least one electronic device by acquiring, by the wearable computing device, at least access to at least one global positioning system (GPS) that is available through the at least one electronic device. For instance, the functionality obtaining module 106* of the wearable computing device 10* of FIG. 4A or 4B acquiring at least access to the one or more sensors that are available through the at least one electronic device by acquiring or obtaining at least access to at least one GPS that is available through the at least one electronic device (e.g., an external linking device 20* such as a Smartphone or another wearable computing device 11*). In some embodiments, obtaining access to the GPS may be accomplished by receiving or obtaining locational data from the one or more GPS.

In the same or alternative implementations, operation 955 may include an operation 957 for acquiring, by the wearable computing device, at least access to the one or more sensors that are available through the at least one electronic device by acquiring, by the wearable computing device, at least access to one or more visual sensors and/or one or more audio sensors that are available through the at least one electronic device. For instance, the functionality obtaining module 106* of the wearable computing device 10* of FIG. 4A or 4B acquiring at least access to the one or more sensors that are available through the at least one electronic device by acquiring or obtaining at least access to one or more visual sensors (e.g., cameras) and/or one or more audio sensors (e.g., microphones) that are available through the at least one electronic device (e.g., an external linking device 20* such as a Smartphone or another wearable computing device 11*). In some embodiments, obtaining access to the one or more visual sensors and/or audio sensors may be accomplished by receiving or obtaining visual and/or audio data from the one or more visual sensors and/or one or more audio sensors.

In the same or alternative implementations, operation 955 may include an operation 958 for acquiring, by the wearable computing device, at least access to the one or more sensors that are available through the at least one electronic device by acquiring, by the wearable computing device, at least access to one or more movement sensors that are available through the at least one electronic device. For instance, the functionality obtaining module 106* of the wearable computing device 10\* of FIG. 4A or 4B acquiring at least access to the one or more sensors that are available through the at least one electronic device by acquiring or obtaining at least access to one or more movement sensors (e.g., accelerometers, inertia sensors, and so forth) that are available through the at least one electronic device (e.g., computing bracelet 16—see FIG. 2C). In some embodiments, obtaining access to the one or more movement sensors may be accomplished by receiving or obtaining movement data from the one or more movement sensors.

Figure 9C:
FIG. 9C is a high-level logic flowchart of a process depicting alternate implementations of the functionality acquiring operation 606 of FIG. 6.

Turning now to FIG. 9C, in some implementations, the functionality acquiring operation 606 may include an operation 959 for acquiring, by the wearable computing device, the one or more specific functionalities that are available through at least one electronic device by acquiring, by the wearable computing device, at least access to one or more applications available through the at least one electronic device. For instance, the functionality obtaining module 106\* of the wearable computing device 10\* of FIG. 4A or 4B acquiring the one or more specific functionalities that are available through at least one electronic device by acquiring or obtaining at least access to one or more applications (e.g., computer software) available through the at least one electronic device. A variety of applications may be accessed through operation 959 in various alternative implementations. In various embodiments, acquiring or obtaining access to the one or more applications may be by using or executing of the one or more applications including receiving obtaining results of executing the one or more applications.

For example, in some implementations, operation 959 may actually include or involve an operation 960 for acquiring, by the wearable computing device, at least access to the one or more applications available through the at least one electronic device by acquiring, by the wearable computing device, at least access to one or more communication applications available through the at least one electronic device. For instance, the functionality obtaining module 106\* of the wearable computing device 10\* of FIG. 4A or 4B acquiring at least access to the one or more applications available through the at least one electronic device by acquiring at least access to one or more communication applications available through the at least one electronic device.

In some cases, operation 960 may further include an operation 961 for acquiring, by the wearable computing device, at least access to the one or more communication applications available through the at least one electronic device by acquiring, by the wearable computing device, at least access to one or more messaging applications available through the at least one electronic device. For instance, the functionality obtaining module 106\* of the wearable computing device 10\* of FIG. 4A or 4B acquiring at least access to the one or more communication applications available through the at least one electronic device by acquiring or obtaining at least access to one or more messaging applications (e.g., email applications, instant messaging applications, text messaging applications, and so forth) available through the at least one electronic device.

In the same or alternative implementations, operation 960 may include an operation 962 for acquiring, by the wearable computing device, at least access to the one or more communication applications available through the at least one electronic device by acquiring, by the wearable computing device, at least access to one or more voice over Internet Protocol (VoIP) applications and/or one or more video conferencing applications available through the at least one electronic device. For instance, the functionality obtaining module 106\* of the wearable computing device 10\* of FIG. 4A or 4B acquiring at least access to the one or more communication applications available through the at least one electronic device by acquiring or obtaining at least access to one or more voice over Internet Protocol (VoIP) applications and/or one or more video conferencing applications available through the at least one electronic device (e.g., an external linking device 20\* or another wearable computing device 11\*).

In various implementations, operation 959 may additionally or alternatively include an operation 963 for acquiring, by the wearable computing device, at least access to the one or more applications available through the at least one electronic device by acquiring, by the wearable computing device, at least access to one or more personal information manager applications available through the at least one electronic device. For instance, the functionality obtaining module 106\* of the wearable computing device 10\* of FIG. 4A or 4B acquiring at least access to the one or more applications available through the at least one electronic device by acquiring or obtaining at least access to one or more personal information manager applications (e.g., Microsoft Outlook) available through the at least one electronic device.

In the same or alternative implementations, operation 959 may include an operation 964 for acquiring, by the wearable computing device, at least access to the one or more applications available through the at least one electronic device by acquiring, by the wearable computing device, at least access to one or more gaming applications available through the at least one electronic device. For instance, the functionality obtaining module 106\* of the wearable computing device 10\* of FIG. 4A or 4B acquiring at least access to the one or more applications available through the at least one electronic device by acquiring or obtaining at least access to one or more gaming applications available through the at least one electronic device (e.g., an external linking device 20\* such as a Smartphone or a laptop or desktop computer).

Figure 9D:
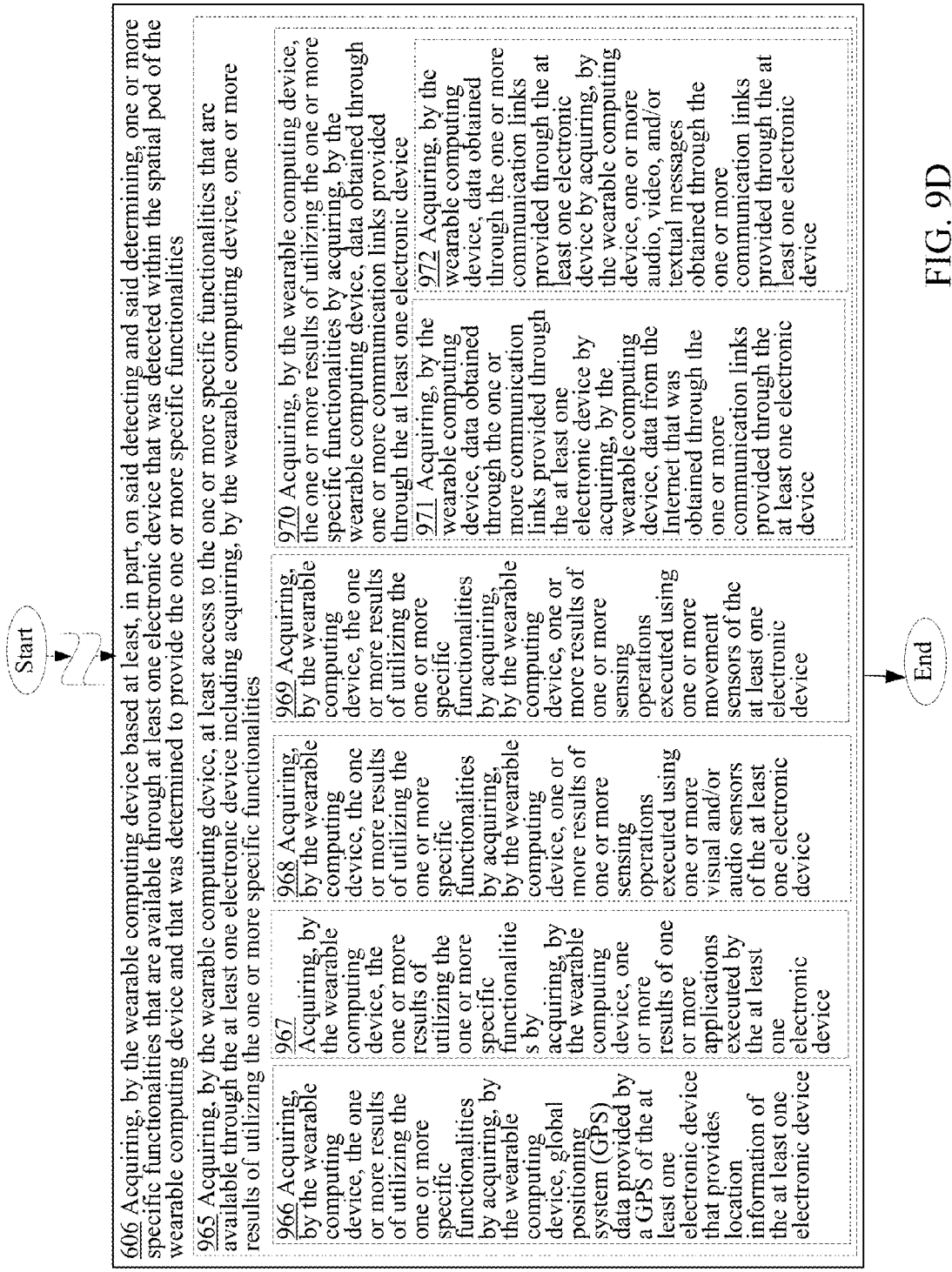
FIG. 9D is a high-level logic flowchart of a process depicting alternate implementations of the functionality acquiring operation 606 of FIG. 6.

Referring now to FIG. 9D, in some implementations, the functionality acquiring operation 606 may include an operation 965 for acquiring, by the wearable computing device, at least access to the one or more specific functionalities that are available through the at least one electronic device including acquiring, by the wearable computing device, one or more results of utilizing the one or more specific functionalities. For instance, the functionality obtaining module 106\* including the result obtaining module 522 (see FIG. 5C) of the wearable computing device 10\* of FIG. 4A or 4B acquiring at least access to the one or more specific functionalities that are available through the at least one electronic device including acquiring or obtaining, by the result obtaining module 522, of one or more results of utilizing the one or more specific functionalities. Various types of results may be obtained through operation 965 in various alternative implementations.

For example, in various implementations operation 965 may include an operation 966 for acquiring, by the wearable computing device, the one or more results of utilizing the one or more specific functionalities by acquiring, by the wearable computing device, global positioning system (GPS) data provided by a GPS of the at least one electronic device that provides location information of the at least one electronic device. For instance, the result obtaining module 522 of the wearable computing device 10\* of FIG. 4A or 4B acquiring the one or more results of utilizing the one or more specific functionalities by acquiring or obtaining GPS data provided by a GPS of the at least one electronic device that provides location information of the at least one electronic device.

In the same or alternative implementations, operation 965 may additionally or alternatively include or involve an operation 967 for acquiring, by the wearable computing device, the one or more results of utilizing the one or more specific functionalities by acquiring, by the wearable computing device, one or more results of one or more applications executed by the at least one electronic device. For instance, the result obtaining module 522 of the wearable computing device 10* of FIG. 4A or 4B acquiring the one or more results of utilizing the one or more specific functionalities by acquiring or obtaining one or more results of one or more applications (e.g., communication applications, gaming applications, personal information manager application, and so forth) executed by the at least one electronic device.

In the same or alternative implementations, operation 965 may additionally or alternatively include or involve an operation 968 for acquiring, by the wearable computing device, the one or more results of utilizing the one or more specific functionalities by acquiring, by the wearable computing device, one or more results of one or more sensing operations executed using one or more visual and/or audio sensors of the at least one electronic device. For instance, the result obtaining module 522 of the wearable computing device 10* of FIG. 4A or 4B acquiring the one or more results of utilizing the one or more specific functionalities by acquiring one or more results (e.g., visual images of hand gestures) of one or more sensing operations executed using one or more visual and/or audio sensors of the at least one electronic device (e.g., another wearable computing device 11*).

In the same or alternative implementations, operation 965 may additionally or alternatively include or involve an operation 969 for acquiring, by the wearable computing device, the one or more results of utilizing the one or more specific functionalities by acquiring, by the wearable computing device, one or more results of one or more sensing operations executed using one or more movement sensors of the at least one electronic device. For instance, the result obtaining module 522 of the wearable computing device 10* of FIG. 4A or 4B acquiring the one or more results of utilizing the one or more specific functionalities by acquiring or obtaining one or more results of one or more sensing operations executed using one or movement sensors (e.g., accelerometers) of the at least one electronic device.

In the same or alternative implementations, operation 965 may additionally or alternatively include or involve an operation 970 for acquiring, by the wearable computing device, the one or more results of utilizing the one or more specific functionalities by acquiring, by the wearable computing device, data obtained through one or more communication links provided through the at least one electronic device. For instance, the result obtaining module 522 of the wearable computing device 10* of FIG. 4A or 4B acquiring the one or more results of utilizing the one or more specific functionalities by acquiring or obtaining data (e.g., news data, consumable media such as a movie or music, and so forth) obtained through one or more communication links (e.g., Wi-Fi links and/or Ethernet links) provided through the at least one electronic device.

In some cases, operation 970 may further include or involve an operation 971 for acquiring, by the wearable computing device, data obtained through the one or more communication links provided through the at least one electronic device by acquiring, by the wearable computing device, data from the Internet that was obtained through the one or more communication links provided through the at least one electronic device. For instance, the result obtaining module 522 of the wearable computing device 10* of FIG. 4A or 4B acquiring data provided through the one or more communication links provided through the at least one electronic device by acquiring or obtaining data (e.g., news, email, VoIP calls, and so forth) from the Internet that was obtained through the one or more communication links provided through the at least one electronic device.

In the same or alternative implementations, operation 970 may additionally or alternatively include an operation 972 for acquiring, by the wearable computing device, data obtained through the one or more communication links provided through the at least one electronic device by acquiring, by the wearable computing device, one or more audio, video, and/or textual messages obtained through the one or more communication links provided through the at least one electronic device. For instance, the result obtaining module 522 of the wearable computing device 10* of FIG. 4A or 4B acquiring data provided through the one or more communication links provided through the at least one electronic device by acquiring or obtaining one or more audio, video, and/or textual messages obtained through the one or more communication links provided through the at least one electronic device.

Figure 9E:
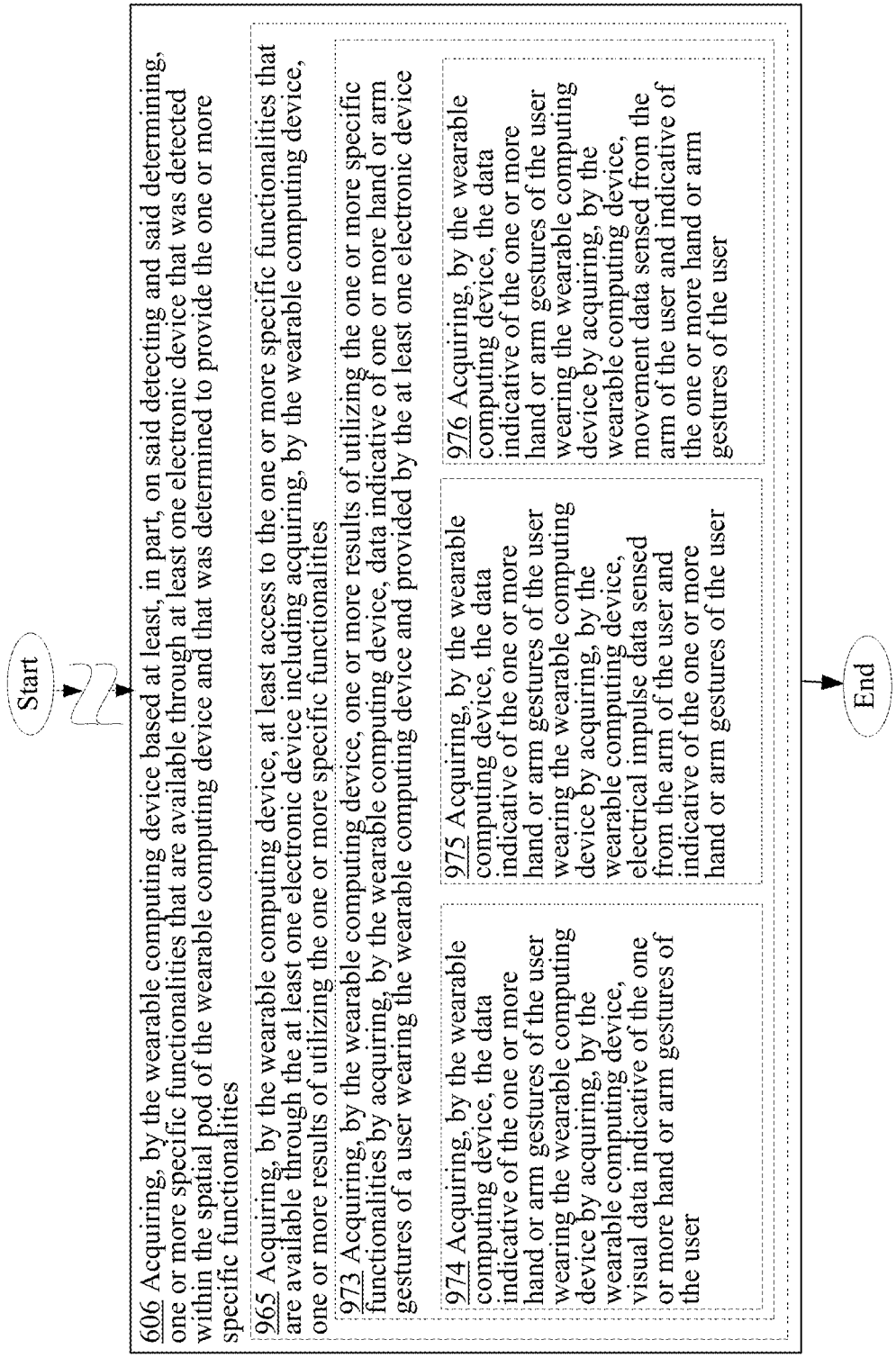
FIG. 9E is a high-level logic flowchart of a process depicting alternate implementations of the functionality acquiring operation 606 of FIG. 6.

In the same or alternative implementations, operation 965 may additionally or alternatively include or involve an operation 973 for acquiring, by the wearable computing device, one or more results of utilizing the one or more specific functionalities by acquiring, by the wearable computing device, data indicative of one or more hand or arm gestures of a user wearing the wearable computing device and provided by the at least one electronic device as illustrated in FIG. 9E. For instance, the result obtaining module 522 of the wearable computing device 10* of FIG. 4A or 4B acquiring one or more results of utilizing the one or more specific functionalities by acquiring or obtaining data (e.g., visual data or electrical impulse data obtained from an arm of the user) indicative of one or more hand or arm gestures of a user wearing the wearable computing device 10* (e.g., computing watch 14) and provided by the at least one electronic device (e.g., computing glasses 12 or computing bracelet 16).

In some implementations, operation 973 may further include or involve an operation 974 for acquiring, by the wearable computing device, the data indicative of the one or more hand or arm gestures of the user wearing the wearable computing device by acquiring, by the wearable computing device, visual data indicative of the one or more hand or arm gestures of the user. For instance, the result obtaining module 522 of the wearable computing device 10* of FIG. 4A or 4B acquiring the data indicative of the one or more hand or arm gestures of the user wearing the wearable computing device 10* by acquiring or obtaining visual data indicative of the one or more hand or arm gestures of the user.

In the same or alternative implementations, operation 973 may include or involve an operation 975 for acquiring, by the wearable computing device, the data indicative of the one or more hand or arm gestures of the user wearing the wearable computing device by acquiring, by the wearable computing device, electrical impulse data sensed from the arm of the user and indicative of the one or more hand or arm gestures of the user. For instance, the result obtaining module 522 of the wearable computing device 10* of FIG. 4A or 4B acquiring the data indicative of the one or more hand or arm gestures of the user wearing the wearable computing device 10* by acquiring or obtaining electrical impulse data sensed from the arm of the user and indicative of the one or more hand or arm gestures of the user.

In the same or alternative implementations, operation 973 may include or involve an operation 976 for acquiring, by the wearable computing device, the data indicative of the one or more hand or arm gestures of the user wearing the wearable computing device by acquiring, by the wearable computing device, movement data sensed from the arm of the user and indicative of the one or more hand or arm gestures of the user. For instance, the result obtaining module 522 of the wearable computing device 10\* of FIG. 4A or 4B acquiring the data indicative of the one or more hand or arm gestures of the user wearing the wearable computing device by acquiring or obtaining movement data sensed from the arm of the user and indicative of the one or more hand or arm gestures of the user.

Figure 10:
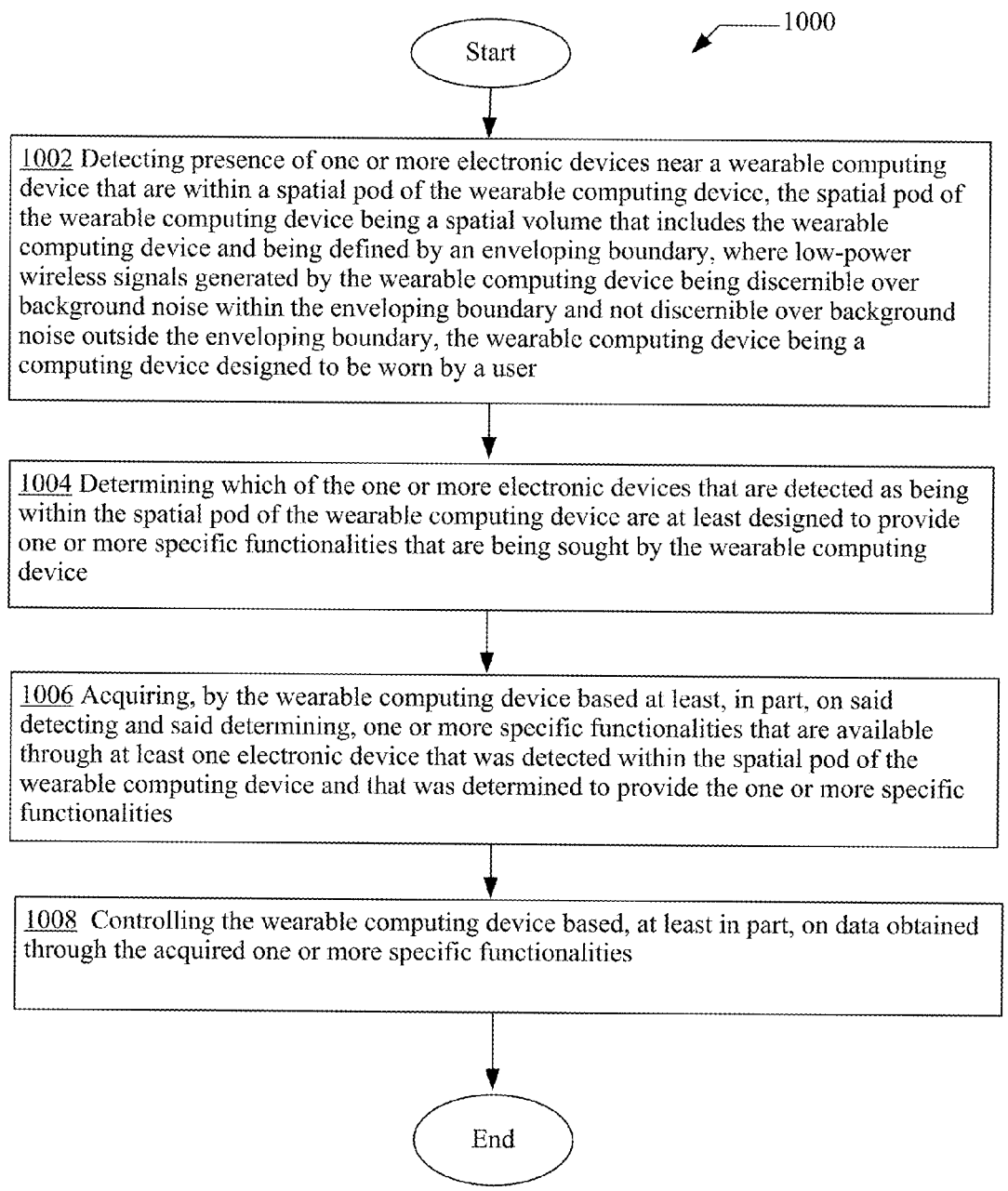
FIG. 10 is a high-level logic flowchart of a process, e.g., operational flow 1000, according to some embodiments.

Turning now to FIG. 10 illustrating another operational flow 1000. Operational flow 1000 includes certain operations that mirror the operations included in operational flow 600 of FIG. 6. These operations include a nearby device detecting operation 1002, a functionally designed device determining operation 1004, and a functionality acquiring operation 1006 that corresponds to and mirror the nearby device detecting operation 602, the functionally designed device determining operation 604, and the functionality acquiring operation 606, respectively, of FIG. 6.

In addition, operational flow 1000 further includes a device controlling operation 1008 for controlling the wearable computing device based, at least in part, on data obtained through the acquired one or more specific functionalities. For instance, the device operating module 108\* of the wearable computing device 10\* of FIG. 4A or 4B controlling (e.g., operating) the wearable computing device 10\* based, at least in part, on data obtained or received through the acquired one or more specific functionalities (e.g., visual sensing functionalities that captured hand gestures of a user).

Figure 11A:
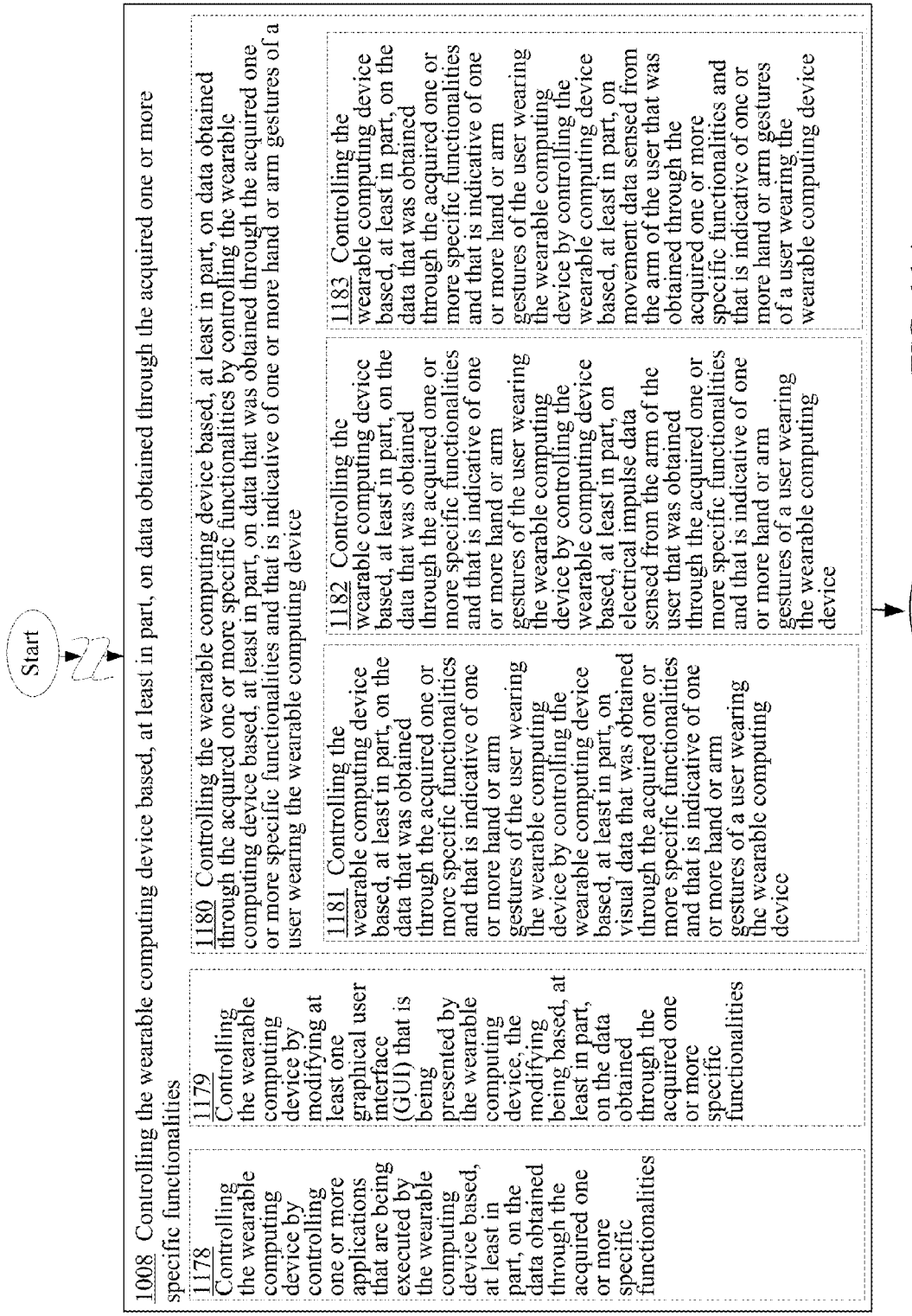
FIG. 11A is a high-level logic flowchart of a process depicting alternate implementations of the device controlling operation 1008 of FIG. 10.
Figure 11B:
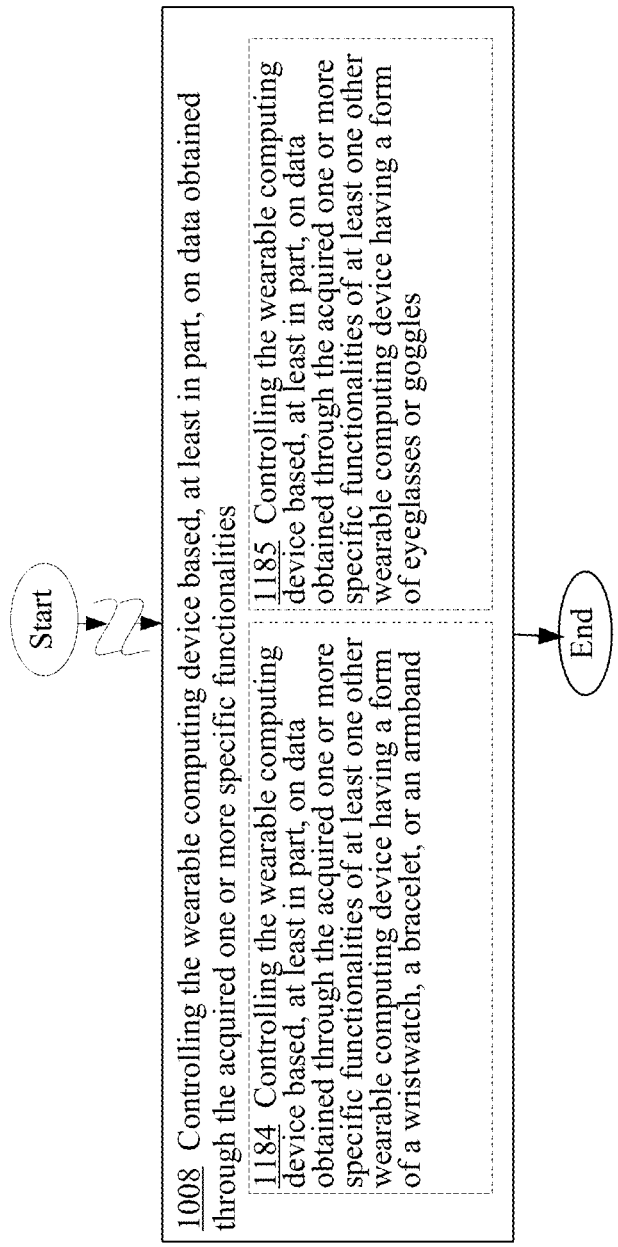
FIG. 11B is a high-level logic flowchart of a process depicting alternate implementations of the device controlling operation 1008 of FIG. 10.

As illustrated in FIGS. 11A and 11B, operation 1008 may be implemented in a number of different ways in various alternative implementations. For example, in some implementations, the device controlling operation 1008 may include an operation 1178 for controlling the wearable computing device by controlling one or more applications that are being executed by the wearable computing device based, at least in part, on the data obtained through the acquired one or more specific functionalities. For instance, the device operating module 108\* including the application operating module 530 (see FIG. 5D) of the wearable computing device 10\* of FIG. 4A or 4B controlling the wearable computing device when the application operating module 530 controls or operates one or more applications (e.g., communication applications such as a messaging application, gaming applications, personal information manager application, and so forth) that are being executed by the wearable computing device 10\* based, at least in part, on the data obtained through the acquired one or more specific functionalities.

In the same or alternative implementations, the device controlling operation 1008 may include an operation 1179 for controlling the wearable computing device by modifying at least one graphical user interface (GUI) that is being presented by the wearable computing device, the modifying being based, at least in part, on the data obtained through the acquired one or more specific functionalities. For instance, the device operating module 108\* including the GUI manipulating module 532 (see FIG. 5D) of the wearable computing device 10\* of FIG. 4A or 4B controlling the wearable computing device when the GUI manipulating module 532 modifies or manipulates at least one GUI that is being presented by the wearable computing device 10\*, the modifying or manipulating being based, at least in part, on the data obtained or received through the acquired one or more specific functionalities. For example, if the data obtained through the acquired one or more specific functionalities is news data with hyperlinks, then the GUI manipulating module 532 modifies a GUI to display the received news including the hyperlinks.

In the same or alternative implementations, the device controlling operation 1008 may include an operation 1180 for controlling the wearable computing device based, at least in part, on data obtained through the acquired one or more specific functionalities by controlling the wearable computing device based, at least in part, on data that was obtained through the acquired one or more specific functionalities and that is indicative of one or more hand or arm gestures of a user wearing the wearable computing device. For instance, the device operating module 108\* including the hand/arm gesture based operating module 534 (see FIG. 5D) of the wearable computing device 10\* of FIG. 4A or 4B controlling the wearable computing device 10\* based, at least in part, on data obtained through the acquired one or more specific functionalities when the hand/arm gesture based operating module 534 controls or operates the wearable computing device 10\* based, at least in part, on data (e.g., image data of hand or arm movements) that was obtained or received through the acquired one or more specific functionalities and that is indicative of one or more hand or arm gestures of a user wearing the wearable computing device 10\*.

As further illustrated in FIG. 11A, operation 1180 may include one or more additional operations in various alternative implementations including, in some implementations, an operation 1181 for controlling the wearable computing device based, at least in part, on the data that was obtained through the acquired one or more specific functionalities and that is indicative of one or more hand or arm gestures of the user wearing the wearable computing device by controlling the wearable computing device based, at least in part, on visual data that was obtained through the acquired one or more specific functionalities and that is indicative of one or more hand or arm gestures of a user wearing the wearable computing device. For instance, the hand/arm gesture based operating module 534 including the visual data based operating module 536 (see FIG. 5D) of the wearable computing device 10\* of FIG. 4A or 4B controlling the wearable computing device 10\* based, at least in part, on the data that was obtained through the acquired one or more specific functionalities and that is indicative of one or more hand or arm gestures of the user wearing the wearable computing device when the visual data based operating module 536 controls or operates the wearable computing device 10\* based, at least in part, on visual data (e.g., image data) that was obtained or received through the acquired one or more specific functionalities (e.g., one or more cameras) and that is indicative of one or more hand or arm gestures of a user wearing the wearable computing device 10\*.

In the same or different implementations, operation 1080 may additionally or alternatively include an operation 1182 for controlling the wearable computing device based, at least in part, on the data that was obtained through the acquired one or more specific functionalities and that is indicative of one or more hand or arm gestures of the user wearing the wearable computing device by controlling the wearable computing device based, at least in part, on electrical impulse data sensed from the arm of the user that was obtained through the acquired one or more specific functionalities and that is indicative of one or more hand or arm gestures of a user wearing the wearable computing device. For instance, the hand/arm gesture based operating module 534 including the electrical impulse data based operating module 538 (see FIG. 5D) of the wearable computing device 10\* of FIG. 4A or 4B controlling the wearable computing device 10\* based, at least in part, on the data that was obtained through the acquired one or more specific functionalities and that is indicative of one or more hand or arm gestures of the user wearing the wearable computing device 10* when the electrical impulse data based operating module 536 controls (e.g., operates) the wearable computing device 10* based, at least in part, on electrical impulse data sensed from the arm of the user that was obtained or received through the acquired one or more specific functionalities (e.g., sensors, such as myoelectric sensors, that may be disposed on an arm of the user that can sense electrical impulses generated by muscle activities) and that is indicative of one or more hand or arm gestures of a user wearing the wearable computing device 10*.

In the same or alternative implementations, operation 1180 may additionally or alternatively include an operation 1183 for controlling the wearable computing device based, at least in part, on the data that was obtained through the acquired one or more specific functionalities and that is indicative of one or more hand or arm gestures of the user wearing the wearable computing device by controlling the wearable computing device based, at least in part, on movement data sensed from the arm of the user that was obtained through the acquired one or more specific functionalities and that is indicative of one or more hand or arm gestures of a user wearing the wearable computing device 10*. For instance, the hand/arm gesture based operating module 534 including the movement data based operating module 539 (see FIG. 5D) of the wearable computing device 10* of FIG. 4A or 4B controlling the wearable computing device 10* based, at least in part, on the data that was obtained through the acquired one or more specific functionalities and that is indicative of one or more hand or arm gestures of the user wearing the wearable computing device 10* when the movement data based operating module 539 controls (e.g., operates) the wearable computing device 10* based, at least in part, on movement data sensed from the arm of the user that was obtained or received through the acquired one or more specific functionalities (e.g., motion/movement sensors such as accelerometer, inertia sensor, and so forth that may be disposed on the arm of a user) and that is indicative of one or more hand or arm gestures of a user wearing the wearable computing device 10*.

Turning now to FIG. 11B, in some implementations, the device controlling operation 1008 of FIG. 10 may include an operation 1184 for controlling the wearable computing device based, at least in part, on data obtained through the acquired one or more specific functionalities of at least one other wearable computing device having a form of a wristwatch, a bracelet, or an armband. For instance, the device operating module 108* of the wearable computing device 10* of FIG. 4A or 4B controlling the wearable computing device 10* based, at least in part, on data obtained or received through the acquired one or more specific functionalities of at least one other wearable computing device 11* having a form of a wristwatch, a bracelet, or an armband.

In some implementations, the device controlling operation 1008 may include an operation 1185 for controlling the wearable computing device based, at least in part, on data obtained through the acquired one or more specific functionalities of at least one other wearable computing device having a form of eyeglasses or goggles. For instance, the device operating module 108* of the wearable computing device 10* of FIG. 4A or 4B controlling the wearable computing device 10* based, at least in part, on data obtained or received through the acquired one or more specific functionalities of at least one other wearable computing device 10* having a form of eyeglasses or goggles.

Figure 12:
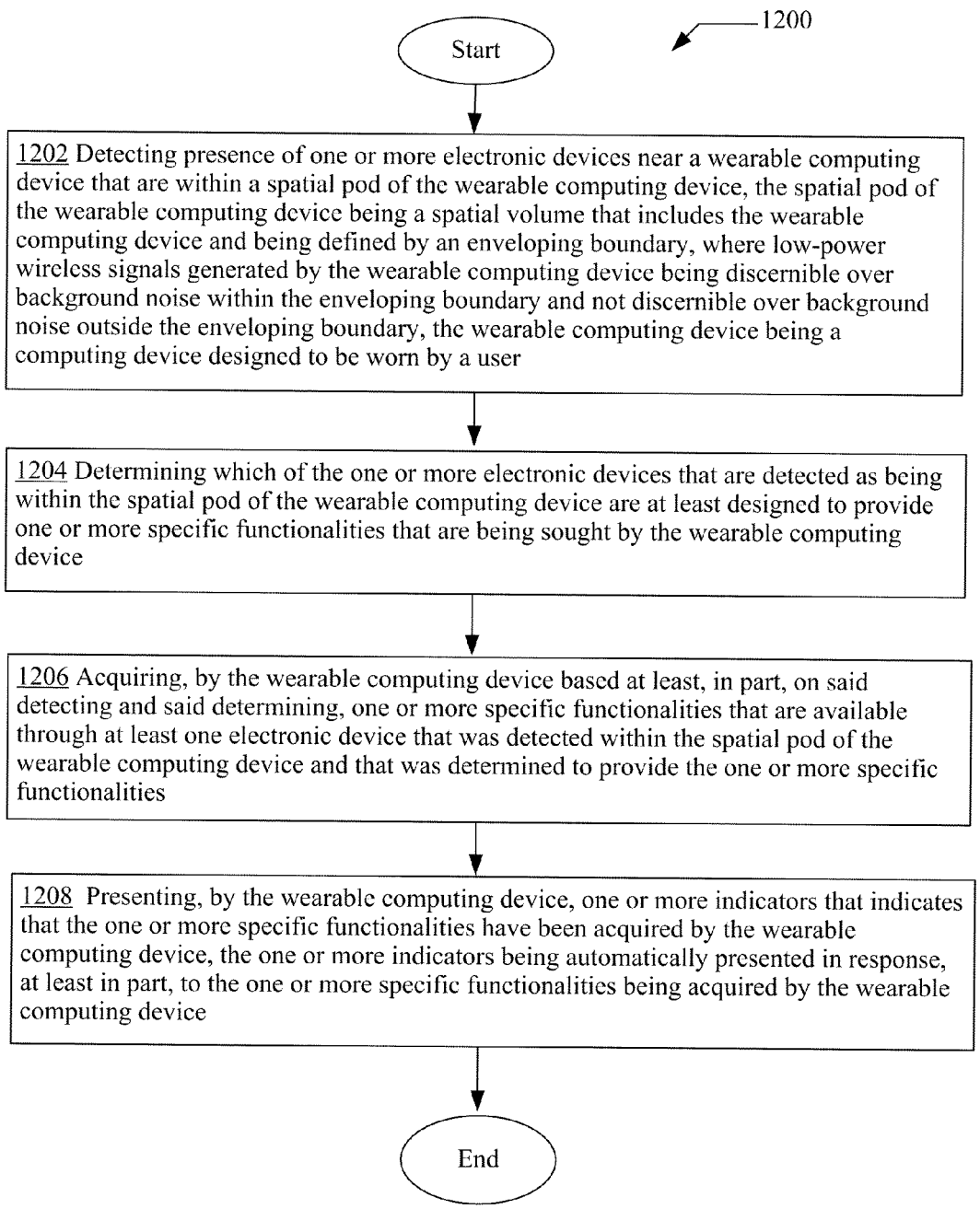
FIG. 12 is a high-level logic flowchart of a process, e.g., operational flow 1200, according to some embodiments.

Turning now to FIG. 12 illustrating another operational flow 1200. Operational flow 1200 includes certain operations that mirror the operations included in operational flow 600 of FIG. 6. These operations include a nearby device detecting operation 1202, a functionally designed device determining operation 1204, and a functionality acquiring operation 1206 that corresponds to and mirrors the nearby device detecting operation 602, the functionally designed device determining operation 604, and the functionality acquiring operation 606, respectively, of FIG. 6.

In addition, operational flow 1200 further includes an indicator presenting operation 1208 for presenting, by the wearable computing device, one or more indicators that indicate that the one or more specific functionalities have been acquired by the wearable computing device, the one or more indicators being presented in response, at least in part, to the one or more specific functionalities being acquired by the wearable computing device. For instance, the indicator providing module 110* of the wearable computing device 10* of FIG. 4A or 4B presenting (providing) one or more indicators (e.g., visual indicators as presented through a display and/or audio indicators) that indicate that the one or more specific functionalities have been acquired by the wearable computing device 10*, the one or more indicators being presented in response, at least in part, to the one or more specific functionalities (e.g., GPS capabilities, communication capabilities beyond the spatial pod 50, and so forth) being acquired by the wearable computing device 10*.

As further illustrated in FIG. 13, the indicator presenting operation 1208 may be implemented in a number of different ways in various alternative implementations. For example, in some implementations, the indicator presenting operation 1208 may include an operation 1387 for presenting, by the wearable computing device, the one or more indicators that indicates that the one or more specific functionalities have been acquired by the wearable computing device by audibly and/or visually presenting the one or more indicators. For instance, the indicator providing module 110* of the wearable computing device 10* of FIG. 4A or 4B presenting the one or more indicators that indicates that the one or more specific functionalities have been acquired by the wearable computing device 10* by audibly and/or visually presenting or providing the one or more indicators (e.g., presenting via one or more speakers and/or via a LED (light emitting-diode display) or see-through display).

In the same or different implementations, the indicator presenting operation 1208 may include an operation 1388 for presenting, by the wearable computing device, the one or more indicators that indicates that the one or more specific functionalities have been acquired by the wearable computing device by presenting one or more icons that directly or indirectly indicates that the one or more specific functionalities have been acquired by the wearable computing device. For instance, the indicator providing module 110* including the icon providing module 540 (see FIG. 5E) of the wearable computing device 10* of FIG. 4A or 4B presenting the one or more indicators that indicates that the one or more specific functionalities have been acquired by the wearable computing device 10* when the icon providing module 540 presents or provides one or more icons that directly or indirectly indicates that the one or more specific functionalities have been acquired by the wearable computing device 10*.

As further illustrated in FIG. 13, in some implementations operation 1388 may further include an operation 1389 for presenting the one or more icons that directly or indirectly indicates that the one or more specific functionalities have been acquired by the wearable computing device by presenting one or more icons in one or more particular formats that indicates availability for execution of one or more applications in response, at least in part, to the one or more specific functionalities being acquired by the wearable computing device, the one or more applications being one or more applications that are not executable without availability of the one or more specific functionalities. For instance, the icon providing module 540 of the wearable computing device 10\* of FIG. 4A or 4B presenting the one or more icons that directly or indirectly indicates that the one or more specific functionalities have been acquired by the wearable computing device 10\* by presenting one or more icons (e.g., icon 306*d* of FIG. 3D in one or more particular formats that indicates availability for execution of one or more applications in response, at least in part, to the one or more specific functionalities being acquired by the wearable computing device 10\*, the one or more applications being one or more applications that are not executable without availability of the one or more specific functionalities. For example, icon 306*d* of FIG. 3D being displayed in a format (e.g., bolded) that indicates that an application (e.g., local weather) is functional (e.g., as a result of GPS functionality and/or Internet access becoming available) and as opposed to icon 306*c* of FIG. 3C, which is in a format that indicates that the application is disabled.

In the same or alternative implementations, operation 1388 may additionally or alternatively include an operation 1390 for presenting the one or more icons that directly or indirectly indicates that the one or more specific functionalities have been acquired by the wearable computing device by presenting one or more icons that indicates that sensor functionalities are available through the wearable computing device, the one or more icons being automatically presented upon the one or more sensor functionalities becoming available through the wearable computing device. For instance, the icon providing module 540 of the wearable computing device 10\* of FIG. 4A or 4B presenting the one or more icons that directly or indirectly indicates that the one or more specific functionalities have been acquired by the wearable computing device 10\* by presenting one or more icons that indicates that sensor functionalities (e.g., GPS, cameras, microphones, and so forth) are available through the wearable computing device 10\*, the one or more icons being automatically presented upon the one or more sensor functionalities becoming available through the wearable computing device 10\*.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
   detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user;
   determining which of the one or more electronic devices that are detected as being within the spatial pod of the wearable computing device are at least designed to provide one or more specific functionalities that are being sought by the wearable computing device; and
   acquiring, by the wearable computing device based at least, in part, on said detecting and said determining, one or more specific functionalities that are available through at least one electronic device that was detected within the spatial pod of the wearable computing device and that was determined to provide the one or more specific functionalities.

2. A computationally-implemented system, comprising:
   means for detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user;
   means for determining which of the one or more electronic devices that are detected as being within the spatial pod of the wearable computing device are at least designed to provide one or more specific functionalities that are being sought by the wearable computing device; and
   means for acquiring, by the wearable computing device based at least, in part, on said means for detecting and said means for determining, one or more specific functionalities that are available through at least one electronic device that was detected within the spatial pod of the wearable computing device and that was determined to provide the one or more specific functionalities.

3. The computationally-implemented system of claim 2, wherein said means for detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user comprises:
   means for detecting presence of the one or more electronic devices near the wearable computing device that are within the spatial pod of the wearable computing device by transmitting, via the wearable computing device, one or more low-power wireless signals to solicit one or more responding wireless signals from one or more electronic devices that detect the one or more low-power wireless signals and monitoring at the wearable computing device for reception of the one or more responding wireless signals generated by the one or more electronic devices in response to the one or more electronic devices detecting the one or more low-power wireless signals.

4. The computationally-implemented system of claim 3, wherein said means for detecting presence of the one or more electronic devices near the wearable computing device that are within the spatial pod of the wearable computing device by transmitting, via the wearable computing device, one or more low-power wireless signals to solicit one or more responding wireless signals from one or more electronic devices that detect the one or more low-power wireless signals and monitoring at the wearable computing device for reception of the one or more responding wireless signals generated by the one or more electronic devices in response to the one or more electronic devices detecting the one or more low-power wireless signals comprises:
   means for transmitting, via the wearable computing device, the one or more low-power wireless signals to solicit the one or more responding wireless signals from the one or more electronic devices that detects the one or more low-power wireless signals by transmitting, via the wearable computing device, less than 0.7 milliwatt wireless signals to solicit the one or more responding wireless signals from the one or more electronic devices.

5. The computationally-implemented system of claim 3, wherein said means for detecting presence of the one or more electronic devices near the wearable computing device that are within the spatial pod of the wearable computing device by transmitting, via the wearable computing device, one or more low-power wireless signals to solicit one or more responding wireless signals from one or more electronic devices that detect the one or more low-power wireless signals and monitoring at the wearable computing device for reception of the one or more responding wireless signals generated by the one or more electronic devices in response to the one or more electronic devices detecting the one or more low-power wireless signals comprises:

means for transmitting, via the wearable computing device, the one or more low-power wireless signals to solicit the one or more responding wireless signals from the one or more electronic devices that detects the one or more low-power wireless signals by transmitting, via the wearable computing device, one or more low-power signals having one or more frequencies from the 60 GHz band to solicit the one or more responding wireless signals from the one or more electronic devices.

6. The computationally-implemented system of claim 3, wherein said means for detecting presence of the one or more electronic devices near the wearable computing device that are within the spatial pod of the wearable computing device by transmitting, via the wearable computing device, one or more low-power wireless signals to solicit one or more responding wireless signals from one or more electronic devices that detect the one or more low-power wireless signals and monitoring at the wearable computing device for reception of the one or more responding wireless signals generated by the one or more electronic devices in response to the one or more electronic devices detecting the one or more low-power wireless signals comprises:

means for transmitting, via the wearable computing device, the one or more low-power wireless signals to solicit the one or more responding wireless signals from the one or more electronic devices that detects the one or more low-power wireless signals and monitoring at the wearable computing device for reception of the one or more responding wireless signals generated by the one or more electronic devices by transmitting the one or more low-power wireless signals through a directional antenna and monitoring at the wearable computing device for reception of the one or more responding wireless signals through the directional antenna.

7. The computationally-implemented system of claim 6, wherein said means for transmitting, via the wearable computing device, the one or more low-power wireless signals to solicit the one or more responding wireless signals from the one or more electronic devices that detects the one or more low-power wireless signals and monitoring at the wearable computing device for reception of the one or more responding wireless signals generated by the one or more electronic devices by transmitting the one or more low-power wireless signals through a directional antenna and monitoring at the wearable computing device for reception of the one or more responding wireless signals through the directional antenna comprises:

means for transmitting the one or more low-power wireless signals through the directional antenna and monitoring at the wearable computing device for reception of the one or more responding wireless signals through the directional antenna by transmitting the one or more low-power wireless signals through a metamaterial antenna and monitoring at the wearable computing device for reception of the one or more responding wireless signals through the metamaterial antenna.

8. The computationally-implemented system of claim 2, wherein said means for detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user comprises:

means for detecting the presence of one or more electronic devices near the wearable computing device that are within the spatial pod of the wearable computing device by detecting within the spatial pod of the wearable computing device presence of one or more other wearable computing devices.

9. The computationally-implemented system of claim 2, wherein said means for detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user comprises:

means for detecting the presence of the one or more electronic devices within the spatial pod of the wearable computing device, the spatial pod of the wearable computing device being a spatial volume that includes the wearable computing device and being defined by an enveloping boundary, where less than 0.7 milliwatt wireless signals generated by the wearable computing device being discernible over background noise within the enveloping boundary and not discernible over background noise outside the enveloping boundary.

10. The computationally-implemented system of claim 2, wherein said means for determining which of the one or more electronic devices that are detected as being within the spatial pod of the wearable computing device are at least designed to provide one or more specific functionalities that are being sought by the wearable computing device comprises:

means for determining which of the one or more electronic devices that are detected as being within the spatial pod of the wearable computing device are designed to provide the one or more specific functionalities by querying each of the one or more electronic devices to determine which of the one or more electronic devices provide the one or more specific functionalities.

11. The computationally-implemented system of claim 10, wherein said means for determining which of the one or more electronic devices that are detected as being within the spatial pod of the wearable computing device are designed to provide the one or more specific functionalities by querying each of the one or more electronic devices to determine which of the one or more electronic devices provide the one or more specific functionalities comprises:

means for querying each of the one or more electronic devices to determine which of the one or more electronic devices provide the one or more specific functionalities by querying each of the one or more electronic devices to determine which of the one or more electronic devices provide one or more communication functionalities to communicate beyond the spatial pod.

12. The computationally-implemented system of claim 10, wherein said means for determining which of the one or more electronic devices that are detected as being within the spatial pod of the wearable computing device are designed to provide the one or more specific functionalities by querying each of the one or more electronic devices to determine which of the one or more electronic devices provide the one or more specific functionalities comprises:

means for querying each of the one or more electronic devices to determine which of the one or more electronic devices provide the one or more specific functionalities by querying each of the one or more electronic devices to determine which of the one or more electronic devices provide one or more global positioning system (GPS) functionalities.

13. The computationally-implemented system of claim 10, wherein said means for determining which of the one or more electronic devices that are detected as being within the spatial pod of the wearable computing device are designed to provide the one or more specific functionalities by querying each of the one or more electronic devices to determine which of the one or more electronic devices provide the one or more specific functionalities comprises:

means for querying each of the one or more electronic devices to determine which of the one or more electronic devices provide the one or more specific functionalities by querying each of the one or more electronic devices to determine which of the one or more electronic devices provide one or more sensor functionalities.

14. The computationally-implemented system of claim 10, wherein said means for determining which of the one or more electronic devices that are detected as being within the spatial pod of the wearable computing device are designed to provide the one or more specific functionalities by querying each of the one or more electronic devices to determine which of the one or more electronic devices provide the one or more specific functionalities comprises:

means for querying each of the one or more electronic devices to determine which of the one or more electronic devices provide the one or more specific functionalities by querying each of the one or more electronic devices to determine which of the one or more electronic devices provide access to one or more specific applications.

15. The computationally-implemented system of claim 14, wherein said means for querying each of the one or more electronic devices to determine which of the one or more electronic devices provide the one or more specific functionalities by querying each of the one or more electronic devices to determine which of the one or more electronic devices provide access to one or more specific applications comprises:

means for querying each of the one or more electronic devices to determine which of the one or more electronic devices provide the access to the one or more specific applications by querying each of the one or more electronic devices to determine which of the one or more electronic devices provide access to one or more communication applications.

16. The computationally-implemented system of claim 10, wherein said means for determining which of the one or more electronic devices that are detected as being within the spatial pod of the wearable computing device are designed to provide the one or more specific functionalities by querying each of the one or more electronic devices to determine which of the one or more electronic devices provide the one or more specific functionalities comprises:

means for querying each of the one or more electronic devices to determine which of the one or more electronic devices provide the one or more specific functionalities including querying each of the one or more electronic devices to determine when will the one or more specific functionalities become available for usage by the wearable computing device.

17. The computationally-implemented system of claim 2, wherein said means for determining which of the one or more electronic devices that are detected as being within the spatial pod of the wearable computing device are at least designed to provide one or more specific functionalities that are being sought by the wearable computing device comprises:

means for determining which of the one or more electronic devices that are detected as being within the spatial pod of the wearable computing device are designed to provide the one or more specific functionalities by determining that a plurality of electronic devices that were detected as being within the spatial pod of the wearable computing device are designed to provide at least one common functionality.

18. The computationally-implemented system of claim 17, wherein said means for determining which of the one or more electronic devices that are detected as being within the spatial pod of the wearable computing device are designed to provide the one or more specific functionalities by determining that a plurality of electronic devices that were detected as being within the spatial pod of the wearable computing device are designed to provide at least one common functionality comprises:

means for determining that the plurality of electronic devices that were detected as being within the spatial pod of the wearable computing device are designed to provide the at least one common functionality including selecting at least one of the plurality of electronic devices for providing the at least one common functionality.

19. The computationally-implemented system of claim 18, wherein said means for determining that the plurality of electronic devices that were detected as being within the spatial pod of the wearable computing device are designed to provide the at least one common functionality including selecting at least one of the plurality of electronic devices for providing the at least one common functionality comprises:

means for selecting at least one of the plurality of electronic devices for providing the at least one common functionality by selecting at least one of the plurality of electronic devices for providing the at least one common functionality based, at least in part, on determining which of the electronic devices is or are nearest to the wearable computing device.

20. The computationally-implemented system of claim 18, wherein said means for determining that the plurality of electronic devices that were detected as being within the spatial pod of the wearable computing device are designed to provide the at least one common functionality including selecting at least one of the plurality of electronic devices for providing the at least one common functionality comprises:

means for selecting at least one of the plurality of electronic devices for providing the at least one common functionality by selecting at least one of the plurality of electronic devices for providing the at least one common functionality based, at least in part, on determining which of the electronic devices provides earliest access to the at least one common functionality.

21. The computationally-implemented system of claim 18, wherein said means for determining that the plurality of electronic devices that were detected as being within the spatial pod of the wearable computing device are designed to provide the at least one common functionality including selecting at least one of the plurality of electronic devices for providing the at least one common functionality comprises:

means for selecting at least one of the plurality of electronic devices for providing the at least one common functionality by selecting at least one of the plurality of electronic devices for providing the at least one common functionality based, at least in part, on determining which of the electronic devices provides access to one or more applications that supports the at least one common functionality.

22. The computationally-implemented system of claim 2, wherein said means for acquiring, by the wearable computing device based at least, in part, on said means for detecting and said means for determining, one or more specific functionalities that are available through at least one electronic device that was detected within the spatial pod of the wearable computing device and that was determined to provide the one or more specific functionalities comprises:

means for acquiring, by the wearable computing device, of the one or more specific functionalities that are available through the at least one electronic device by transmitting to the at least one electronic device, by the wearable computing device, one or more requests or one or more commands for at least accessing the one or more specific functionalities available through the at least one electronic device.

23. The computationally-implemented system of claim 2, wherein said means for acquiring, by the wearable computing device based at least, in part, on said means for detecting and said means for determining, one or more specific functionalities that are available through at least one electronic device that was detected within the spatial pod of the wearable computing device and that was determined to provide the one or more specific functionalities comprises:

means for acquiring, by the wearable computing device, the one or more specific functionalities that are available through the at least one electronic device by transmitting to the at least one electronic device, by the wearable computing device, input data needed for executing the one or more specific functionalities available through the at least one electronic device.

24. The computationally-implemented system of claim 2, wherein said means for acquiring, by the wearable computing device based at least, in part, on said means for detecting and said means for determining, one or more specific functionalities that are available through at least one electronic device that was detected within the spatial pod of the wearable computing device and that was determined to provide the one or more specific functionalities comprises:

means for acquiring, by the wearable computing device, the one or more specific functionalities that are available through at least one electronic device by acquiring, by the wearable computing device, access to one or more communication networks beyond the spatial pod.

25. The computationally-implemented system of claim 2, wherein said means for acquiring, by the wearable computing device based at least, in part, on said means for detecting and said means for determining, one or more specific functionalities that are available through at least one electronic device that was detected within the spatial pod of the wearable computing device and that was determined to provide the one or more specific functionalities comprises:

means for acquiring, by the wearable computing device, the one or more specific functionalities that are available through at least one electronic device by acquiring, by the wearable computing device, at least access to one or more sensors that are available through the at least one electronic device.

26. The computationally-implemented system of claim 25, wherein said means for acquiring, by the wearable computing device, the one or more specific functionalities that are available through at least one electronic device by acquiring, by the wearable computing device, at least access to one or more sensors that are available through the at least one electronic device comprises:

means for acquiring, by the wearable computing device, at least access to the one or more sensors that are available through the at least one electronic device by acquiring, by the wearable computing device, at least access to at least one global positioning system (GPS) that is available through the at least one electronic device.

27. The computationally-implemented system of claim 25, wherein said means for acquiring, by the wearable computing device, the one or more specific functionalities that are available through at least one electronic device by acquiring, by the wearable computing device, at least access to one or more sensors that are available through the at least one electronic device comprises:

means for acquiring, by the wearable computing device, at least access to the one or more sensors that are available through the at least one electronic device by acquiring, by the wearable computing device, at least access to one or more visual sensors and/or one or more audio sensors that are available through the at least one electronic device.

28. The computationally-implemented system of claim 25, wherein said means for acquiring, by the wearable computing device, the one or more specific functionalities that are available through at least one electronic device by acquiring, by the wearable computing device, at least access to one or more sensors that are available through the at least one electronic device comprises:

means for acquiring, by the wearable computing device, at least access to the one or more sensors that are available through the at least one electronic device by acquiring, by the wearable computing device, at least access to one or more movement sensors that are available through the at least one electronic device.

29. The computationally-implemented system of claim 2, wherein said means for acquiring, by the wearable computing device based at least, in part, on said means for detecting and said means for determining, one or more specific functionalities that are available through at least one electronic device that was detected within the spatial pod of the wearable computing device and that was determined to provide the one or more specific functionalities comprises:

means for acquiring, by the wearable computing device, the one or more specific functionalities that are available through at least one electronic device by acquiring, by the wearable computing device, at least access to one or more applications available through the at least one electronic device.

30. The computationally-implemented system of claim 29, wherein said means for acquiring, by the wearable computing device, the one or more specific functionalities that are available through at least one electronic device by acquiring, by the wearable computing device, at least access to one or more applications available through the at least one electronic device comprises:

means for acquiring, by the wearable computing device, at least access to the one or more applications available through the at least one electronic device by acquiring, by the wearable computing device, at least access to one or more communication applications available through the at least one electronic device.

31. The computationally-implemented system of claim 29, wherein said means for acquiring, by the wearable computing device, the one or more specific functionalities that are available through at least one electronic device by acquiring, by the wearable computing device, at least access to one or more applications available through the at least one electronic device comprises:
   means for acquiring, by the wearable computing device, at least access to the one or more applications available through the at least one electronic device by acquiring, by the wearable computing device, at least access to one or more gaming applications available through the at least one electronic device.

32. The computationally-implemented system of claim 2, wherein said means for acquiring, by the wearable computing device based at least, in part, on said detecting and said determining, one or more specific functionalities that are available through at least one electronic device that was detected within the spatial pod of the wearable computing device and that was determined to provide the one or more specific functionalities comprises:
   means for acquiring, by the wearable computing device, at least access to the one or more specific functionalities that are available through the at least one electronic device including acquiring, by the wearable computing device, one or more results of utilizing the one or more specific functionalities.

33. The computationally-implemented system of claim 32, wherein said means for acquiring, by the wearable computing device, at least access to the one or more specific functionalities that are available through the at least one electronic device including acquiring, by the wearable computing device, one or more results of utilizing the one or more specific functionalities comprises:
   means for acquiring, by the wearable computing device, the one or more results of utilizing the one or more specific functionalities by acquiring, by the wearable computing device, global positioning system (GPS) data provided by a GPS of the at least one electronic device that provides location information of the at least one electronic device.

34. The computationally-implemented system of claim 32, wherein said means for acquiring, by the wearable computing device, at least access to the one or more specific functionalities that are available through the at least one electronic device including acquiring, by the wearable computing device, one or more results of utilizing the one or more specific functionalities comprises:
   means for acquiring, by the wearable computing device, the one or more results of utilizing the one or more specific functionalities by acquiring, by the wearable computing device, one or more results of one or more sensing operations executed using one or more visual and/or audio sensors of the at least one electronic device.

35. The computationally-implemented system of claim 32, wherein said means for acquiring, by the wearable computing device, at least access to the one or more specific functionalities that are available through the at least one electronic device including acquiring, by the wearable computing device, one or more results of utilizing the one or more specific functionalities comprises:
   means for acquiring, by the wearable computing device, the one or more results of utilizing the one or more specific functionalities by acquiring, by the wearable computing device, one or more results of one or more sensing operations executed using one or more movement sensors of the at least one electronic device.

36. The computationally-implemented system of claim 32, wherein said means for acquiring, by the wearable computing device, at least access to the one or more specific functionalities that are available through the at least one electronic device including acquiring, by the wearable computing device, one or more results of utilizing the one or more specific functionalities comprises:
   means for acquiring, by the wearable computing device, the one or more results of utilizing the one or more specific functionalities by acquiring, by the wearable computing device, data obtained through one or more communication links provided through the at least one electronic device.

37. The computationally-implemented system of claim 32, wherein said means for acquiring, by the wearable computing device, at least access to the one or more specific functionalities that are available through the at least one electronic device including acquiring, by the wearable computing device, one or more results of utilizing the one or more specific functionalities comprises:
   means for acquiring, by the wearable computing device, one or more results of utilizing the one or more specific functionalities by acquiring, by the wearable computing device, data indicative of one or more hand or arm gestures of a user wearing the wearable computing device and provided by the at least one electronic device.

38. The computationally-implemented system of claim 2, further comprising:
   means for controlling the wearable computing device based, at least in part, on data obtained through the acquired one or more specific functionalities.

39. The computationally-implemented system of claim 38, wherein said means for controlling the wearable computing device based, at least in part, on data obtained through the acquired one or more specific functionalities comprises:
   means for controlling the wearable computing device by modifying at least one graphical user interface (GUI) that is being presented by the wearable computing device, the modifying being based, at least in part, on the data obtained through the acquired one or more specific functionalities.

40. The computationally-implemented system of claim 38, wherein said means for controlling the wearable computing device based, at least in part, on data obtained through the acquired one or more specific functionalities comprises:
   means for controlling the wearable computing device based, at least in part, on data obtained through the acquired one or more specific functionalities by controlling the wearable computing device based, at least in part, on data that was obtained through the acquired one or more specific functionalities and that is indicative of one or more hand or arm gestures of a user wearing the wearable computing device.

41. The computationally-implemented system of claim 2, further comprising:
   means for presenting, by the wearable computing device, one or more indicators that indicate that the one or more specific functionalities have been acquired by the wearable computing device, the one or more indicators being presented in response, at least in part, to the one or more specific functionalities being acquired by the wearable computing device.

42. A system, comprising:
- circuitry for detecting presence of one or more electronic devices near a wearable computing device that are within a spatial pod of the wearable computing device, the spatial pod of the wearable computing device being a spatial volume that includes the wearable computing device and being defined by an enveloping boundary, where low-power wireless signals generated by the wearable computing device being discernible over background noise within the enveloping boundary and not discernible over background noise outside the enveloping boundary, the wearable computing device being a computing device designed to be worn by a user;
- circuitry for determining which of the one or more electronic devices that are detected as being within the spatial pod of the wearable computing device are at least designed to provide one or more specific functionalities that are being sought by the wearable computing device; and
- circuitry for acquiring, by the wearable computing device based at least, in part, on said detecting and said determining, one or more specific functionalities that are available through at least one electronic device that was detected within the spatial pod of the wearable computing device and that was determined to provide the one or more specific functionalities.

* * * * *